US007020635B2

(12) United States Patent
Hamilton et al.

(10) Patent No.: US 7,020,635 B2
(45) Date of Patent: Mar. 28, 2006

(54) SYSTEM AND METHOD OF SECURE ELECTRONIC COMMERCE TRANSACTIONS INCLUDING TRACKING AND RECORDING THE DISTRIBUTION AND USAGE OF ASSETS

(75) Inventors: Dave Hamilton, Newbury Park, CA (US); John Brinkman, Simi Valley, CA (US); John Longawa, Thousand Oaks, CA (US); Charles Corris Randall, Winnetka, CA (US); Rob Rampley, Woodland Hills, CA (US); Marcus Ryle, Westlake Village, CA (US)

(73) Assignee: Line 6, INC, Agoura Hills, CA (US)

( * ) Notice: Subject to any disclaimer, the term of this patent is extended or adjusted under 35 U.S.C. 154(b) by 699 days.

(21) Appl. No.: 10/051,871

(22) Filed: Jan. 16, 2002

(65) Prior Publication Data

US 2003/0115150 A1     Jun. 19, 2003

Related U.S. Application Data

(63) Continuation-in-part of application No. 09/990,532, filed on Nov. 21, 2001.

(51) Int. Cl.
*G21C 17/60* (2006.01)
(52) U.S. Cl. .......................................... 705/51; 705/52
(58) Field of Classification Search ............ 705/51–53, 705/56–59; 713/200; 709/229
See application file for complete search history.

(56) References Cited

U.S. PATENT DOCUMENTS

| 5,410,598 A | * | 4/1995 | Shear ........................... 705/53 |
| 5,583,308 A | | 12/1996 | Owen |
| 5,629,980 A | * | 5/1997 | Stefik et al. ................... 705/54 |
| 5,638,443 A | * | 6/1997 | Stefik et al. ................... 705/54 |
| 5,638,513 A | * | 6/1997 | Ananda ........................ 705/55 |
| 5,690,496 A | | 11/1997 | Kennedy |
| 5,789,689 A | | 8/1998 | Doidic et al. |
| 5,825,883 A | * | 10/1998 | Archibald et al. ............. 705/53 |

(Continued)

FOREIGN PATENT DOCUMENTS

JP           2002232604 A     *   8/2002

OTHER PUBLICATIONS

Tom Sheldon, Encyclopedia of Networking, Electronic Edition, pp. 324-329, Osborne/McGraw-Hill, 1998.

(Continued)

*Primary Examiner*—Salvatore Cangialosi
(74) *Attorney, Agent, or Firm*—Blakely, Sokoloff Taylor & Zafman LLP

(57) ABSTRACT

Disclosed is a system and method that tracks the usage of rented digital assets. A server includes an asset database that stores a digital asset, the title of the digital asset, and a server usage count for the digital asset. The computing device stores a rented digital asset and further stores an asset usage count list that includes the title of the rented digital asset and a usage count that indicates the amount of usage of the rented digital asset by the computing device. The server uploads the asset usage count list from the computing device and matches the title of the rented digital asset from the asset usage count list with the title of the same digital asset stored in the asset database. Further, the server adds the usage count of the rented digital asset to the server usage count for the digital asset in the asset database.

30 Claims, 43 Drawing Sheets

U.S. PATENT DOCUMENTS

| | | | |
|---|---|---|---|
| 5,905,736 A | | 5/1999 | Ronen et al. |
| 5,925,127 A | * | 7/1999 | Ahmad ....................... 713/200 |
| 6,070,171 A | * | 5/2000 | Snyder et al. ................. 705/59 |
| 6,236,971 B1 | * | 5/2001 | Stefik et al. .................. 705/54 |
| 6,426,455 B1 | | 7/2002 | Hasegawa |
| 6,662,231 B1 | * | 12/2003 | Drosset et al. .............. 709/229 |
| 2002/0026865 A1 | | 3/2002 | Akahori |
| 2002/0049679 A1 | * | 4/2002 | Russell et al. ................ 705/59 |

OTHER PUBLICATIONS

Line 6, Amp Farm, The Guitar Recording Plug-In for TDM-Equipped Pro Tools Systems, http://www.sigidesign.com/products/prd_overview.cfm?product_id=1001 & http://a396.g.akamai.net/7/396/1848/7473dc3aa964dc/media.digidesign.com/products/images, 2001.

Line 6, Amp Farm, The Guitar Recording Plug-In for TDM-Equipped Pro Tools Systems, http://www.digidesign.com/products/prd_specs.cfm?product_id=1001, 2001.

e-commerce—a searchEBusiness definition, E-tailing or The Virtual Storefront and the Virtual Mall, http://searchebusiness.techtarget.com/sDefinition/0,,sid19_gci212029,00.html, 2001.

* cited by examiner

Top View

Front View

Back View

SYSTEM AND METHOD OF SECURE ELECTRONIC COMMERCE TRANSACTIONS INCLUDING TRACKING AND RECORDING THE DISTRIBUTION AND USAGE OF ASSETS

This Application is a Continuation-in-Part of U.S. Ser. No. 09/990,532 filed Nov. 21, 2001.

BACKGROUND

1. Field of the Invention

This invention relates to electronic commerce transactions. In particular, the invention relates to a system and method of secure electronic commerce transactions that provides for the tracking and recording of the distribution and usage of assets.

2. Description of Related Art

Today, the term electronic commerce has come to be associated with the buying and selling of tangible assets (e.g. goods), services, and intangible digital assets over the Internet between a business and a connected computer user. Further, electronic commerce also typically involves some method of securing transactions, authorizing payments, and moving money between accounts.

Electronic commerce also involves business-to-business transactions, expanding on the older and more traditional EDI (Electronic Data Interchange) techniques of exchanging purchase orders, invoices, and other documents in electronic form. EDI and other forms of business transactions have been taking place over public and private networks for some time. The financial system literally runs over the telecommunication network. For example, millions of stock market transactions take place everyday using electronic means.

However, what is different with electronic commerce using the Internet, is that these transactions take place over public networks between buyers and sellers who may not have had any previous business relationship. The element of trust is missing and must be established in some way. Thus, electronic transactions need to be secure between the buyer and seller, which today, is not always the case.

Nonetheless, the Internet today has become a gateway for connected users to purchase a wide variety of tangible assets, services, and intangible digital assets. Today, tangible assets such as books, CDs, home appliances, or any type of retail good, can now be purchased from a supplier over the Internet. Moreover, intangible digital assets such as music, videos, movies, multimedia, software, etc. can also increasingly be purchased over the Internet and downloaded to the connected user. With the Internet's 24-hr. availability, global reach, ability to interact and provide custom information and ordering, and multimedia interaction with customers, the use of the Internet is rapidly becoming a multi-billion dollar source of revenue for today's businesses that have a worldwide presence via the Internet.

Desired security features for Internet based electronic commerce transactions include authenticating business transactors, controlling access to resources such as Web pages for registered users, encrypting communications, and, in general ensuring the privacy and effectiveness of transactions. Today, among the most widely used security technologies is the secure sockets layer (SSL), which is built into both of the leading Web browsers. SSL is a transport-level protocol developed by Netscape that provides channel security. With SSL, the client and server use a handshaking technique to agree on the level of security they want to use during a session. Authentication takes place over a secure channel, and all information transmitted during a session is encrypted.

Unfortunately, even with the security features provided by SSL in conjunction with other security features commonly offered by Web-based businesses, proper security is still lacking. For example, often the ability to positively determine whether a transmission is from an authentic source or from someone or something masquerading as that source is often completely lacking in Internet based transactions.

In most of today's Internet based transactions, a customer cannot be uniquely identified and authenticated by a Web-based businesses' server with a high degree of trust. Further, because of a lack of readily available techniques to uniquely identify a customer and to specifically encrypt digital assets (e.g. music, videos, movies, multimedia, software, etc.) for that uniquely identified customer, content owners have been hesitant to provide digital assets directly to potential customers over the Internet or to license digital assets to third party providers who can then provide them to customers over the Internet—due to the fear of unauthorized duplication of the digital asset. Moreover, techniques are not readily available to track and record the purchase, rental, and number of uses of digital assets by a customer, either directly by the content owner, or indirectly by a third party provider. Accordingly, it is difficult for a third party provider to accurately report transactions regarding licensed digital assets to the ultimate content owner for licensing fees (e.g. royalty tracking). This further limits the potential benefit of the Internet to be used to sell and provide digital assets to customers and to provide a secure revenue opportunity for content providers (especially the ultimate content owner (i.e. the copyright holder)).

SUMMARY OF THE INVENTION

The present invention relates to electronic commerce transactions. In particular, the invention relates to a system and method for electronic commerce transactions that provides for tracking the usage of rented digital assets over a computer network.

In one embodiment, the server includes an asset database. The asset database stores a digital asset, the title of the digital asset, and a server usage count for the digital asset. The server is coupled to a computing device through a computer network. The computing device stores a rented digital asset. The computing device further stores an asset usage count list that includes the title of the rented digital asset and a usage count that indicates the amount of usage of the rented digital asset by the computing device.

The server uploads the asset usage count list from the computing device and matches the title of the rented digital asset from the asset usage count list of the computing device with the title of the same digital asset stored in the asset database. Further, the server adds the usage count of the rented digital asset from the asset usage count list of the computing device to the server usage count for the digital asset in the asset database. In this way, the server can determine the amount of usage of rented digital assets by computing devices. The system and method as previously described can be used either directly by a content owner to track the distribution and use of rented digital assets or by a third party provider to track the distribution and use of rented digital assets and further in order to keep an accounting of licensing fees (e.g. royalties) due to the content owner.

BRIEF DESCRIPTION OF THE DRAWINGS

The features and advantages of the present invention will become apparent from the following description of the present invention in which:

FIG. 2b illustrates a typical architecture of the conventional data processing or computer system shown in FIG. 2a.

DETAILED DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
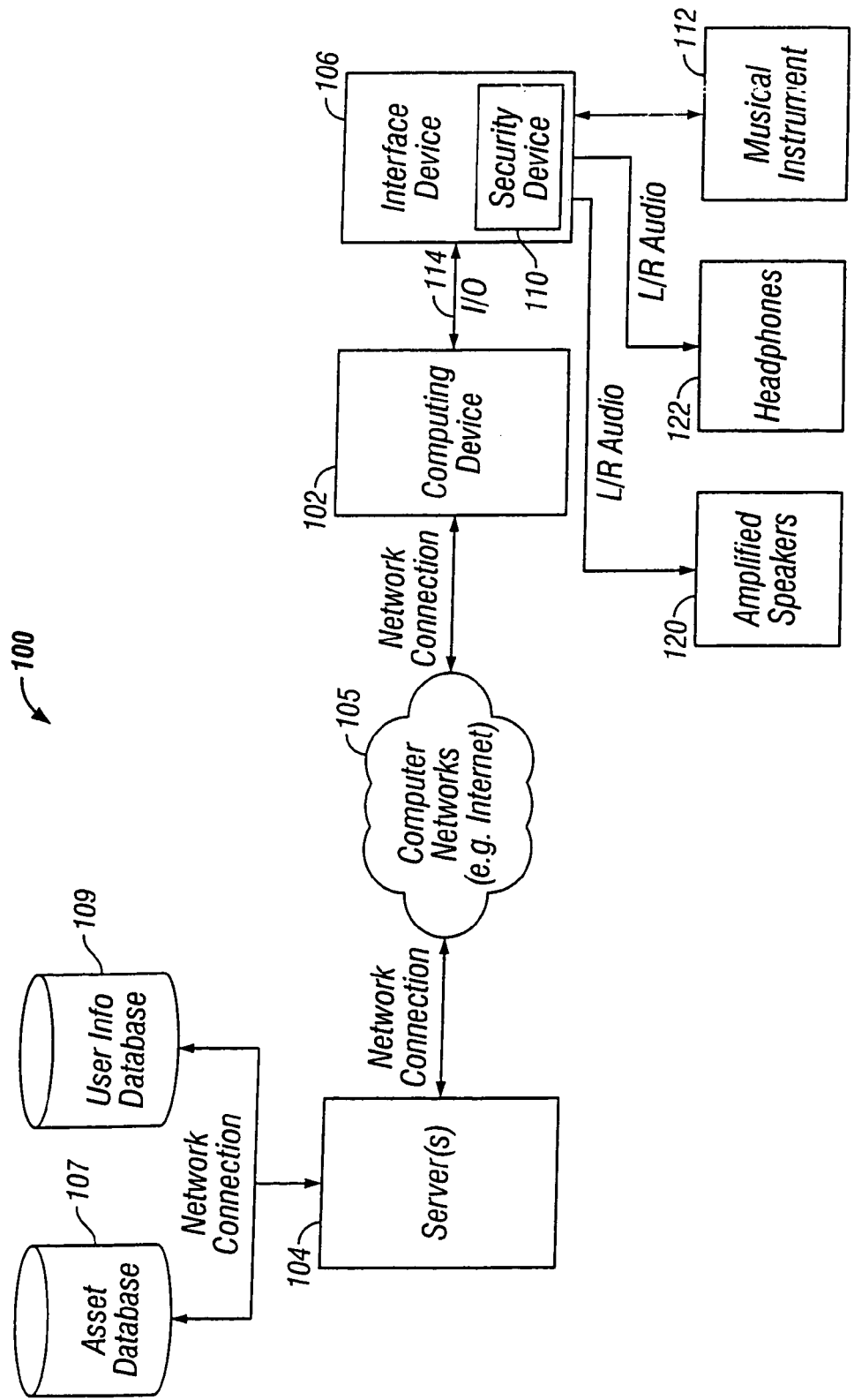
FIG. 1 is a block diagram illustrating an exemplary system to deliver a multimedia presentation of an audio file to a computing device, according to one embodiment of the present invention.

Referring now to FIG. 1, FIG. 1 shows a block diagram illustrating an exemplary system 100 to deliver a multimedia presentation of an audio file to a computing device 102, according to one embodiment of the present invention. One or more servers 104 are coupled to computing device 102 through a computer network (e.g. the Internet) 105. In one embodiment, in response to a user selecting a musical piece at a computing device 102, server 104 transmits a session file associated with the musical piece to the computing device 102 through the computer network (e.g. the Internet) 105. The session file includes a digital audio file and multimedia data. The computing device 102 processes the session file to present the multimedia presentation of the audio file to the user, as will be discussed. The server or server(s) 104 are also coupled through network connections to an asset database 107 that stores session files, and other assets, and a user information database 109 that stores information related to users, as will be discussed.

An interface device 106, including a security device 110, is connected to the computing device 102 and the user's musical instrument 112 (e.g. a guitar). The interface device 106 couples the musical instrument 112 to the computing device 102 over an input/output (I/O) link 114 (e.g. a Universal Serial Bus link) such that the user can play the musical instrument 112 in conjunction with a multimedia presentation of the digital audio file being processed by the computing device 102. Furthermore, the interface device 106 can be connected an analog sound device, such as amplified speakers 120 or headphones 122, to play the audio file associated with selected musical piece along with sound from the user's musical instrument 112, as the user plays along with his or her musical instrument.

More specifically, the interface device 106 performs analog to digital (A/D) conversion of the audio signal from the musical instrument 112 and transmits the digitized audio signal of the musical instrument 112 via I/O link 114 to the computing device 102 where the digitized audio signal of the musical instrument 112 may undergo digital signal processing (DSP) performed by a software module to create a processed digital audio signal of the musical instrument, for example, to tailor it to the audio file of the musical piece that was selected by the user. The computing device 102 creates a mixed digital signal of both the digital audio file and the processed digital signal of the musical instrument, which is transmitted back from the computing device 102 along I/O link 114 to the interface device 106, where the mixed digital signal is converted to analog form (D/A conversion) into a mixed analog audio signal that is outputted through an analog sound device, such as speakers 120 or headphones 122. Thus, a user can play along with the downloaded musical piece, which is presented in a multimedia presentation format on the computing device, to facilitate learning by the user. Moreover, as will be discussed, the user is provided with quick and easy access to a wide variety of musical pieces that they can download from the server 104.

It should be appreciated by those having skill in the network-related arts that computing device 102 and the server(s) 104 may be coupled to the computer network 105 in a variety of ways including through direct or dial-up telephone or other network transmission lines, using a modem pool (not illustrated), or through an additional network and gateway (not illustrated). For example, the computing device 102 can communicate with a server 104 via a link utilizing one or more of the plain old telephone system (POTS), a cellular phone system, cable, Digital Subscriber Line, Integrated Services Digital Network, satellite connection, computer network (e.g. the Internet, a wide area network (WAN), or a local area network (LAN), etc.), or generally any sort of private or public telecommunication system, and combinations thereof. Examples of a transport medium for the links include, but are not limited or restricted to electrical wire, optical fiber, cable including twisted pair, or wireless channels (e.g. radio frequency (RF), terrestrial, satellite, or any other wireless signaling methodology).

More particularly, the computer network 105 is typically a computer network (e.g. the Internet, a wide area network (WAN), or a local area network (LAN), etc.), which is a packetized, packet-switched, connection oriented, etc., network that can utilize Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. The computer network 105 allows the communication of data traffic between the computing device 102 and the server(s) 104 using packets. Data traffic through the network computer 105 may be of any type including audio, text, graphics, video, e-mail, Fax, multimedia, documents, voice, and other generic forms of data. The computer network 105 is typically a data network that may contain switching or routing equipment designed to transfer digital data traffic. It should be appreciated that the FIG. 1 environment is only exemplary and that embodiments of the present invention can be used with any type of telecommunication system and/or computer network, protocols, and combinations thereof. Moreover, the network connections between the server(s) 104 and the asset database 107 and user information database 109 can also be coupled in ways exemplified by the previously described examples.

Figure 2A:
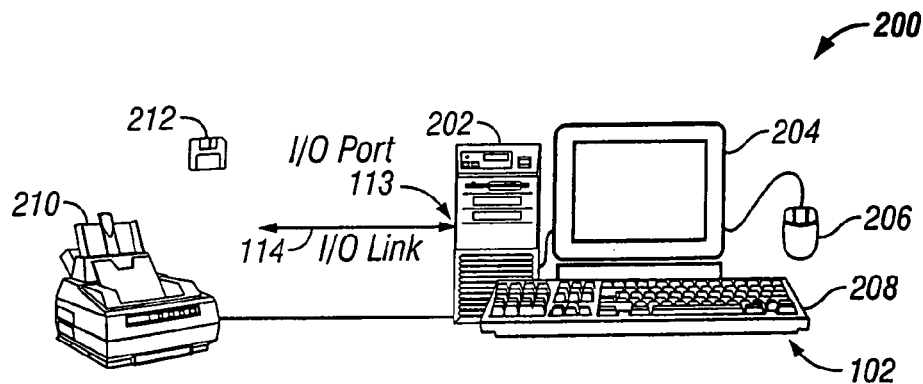
FIG. 2a illustrates a conventional data processing or computer system useable with embodiments of the present invention.

Having briefly described an exemplary network environment in which embodiments of the present invention can be practiced, FIG. 2a illustrates a conventional data processing or computer system 200 useable with embodiments of the present invention. More particularly, FIG. 2a illustrates an example of a general data processing or computing system 200 for use as an exemplary computing device 102 (e.g. personal computer) or server computer system 104, in which various aspects of the present invention may be utilized.

As illustrated, data processing or computer system 200 is comprised of a system unit 202, output devices such as display device 204 and printer 210, and input devices such as keyboard 208, and mouse 206. Data processing system 200 receives data for processing by the manipulation of input devices 208 and 206 or directly from fixed or removable media storage devices such as disk 212 and network connection interfaces (not illustrated). Data processing system 200 then processes data and presents resulting output data via output devices such as display device 204, printer 210, fixed or removable media storage devices like disk 212 or network connection interfaces. It should be appreciated that the computing device 102 can be any sort of computer system or computing device (e.g. personal computer (laptop/desktop), network computer, handheld computing device, server computer, or any other type of computer). Moreover, in the case of the computing device 102, the data processing system 200 includes a serial I/O port 113 (e.g. a USB port) to accommodate input and output data from the interface device 102 through I/O link 114 (e.g. a USB link).

Figure 2B:
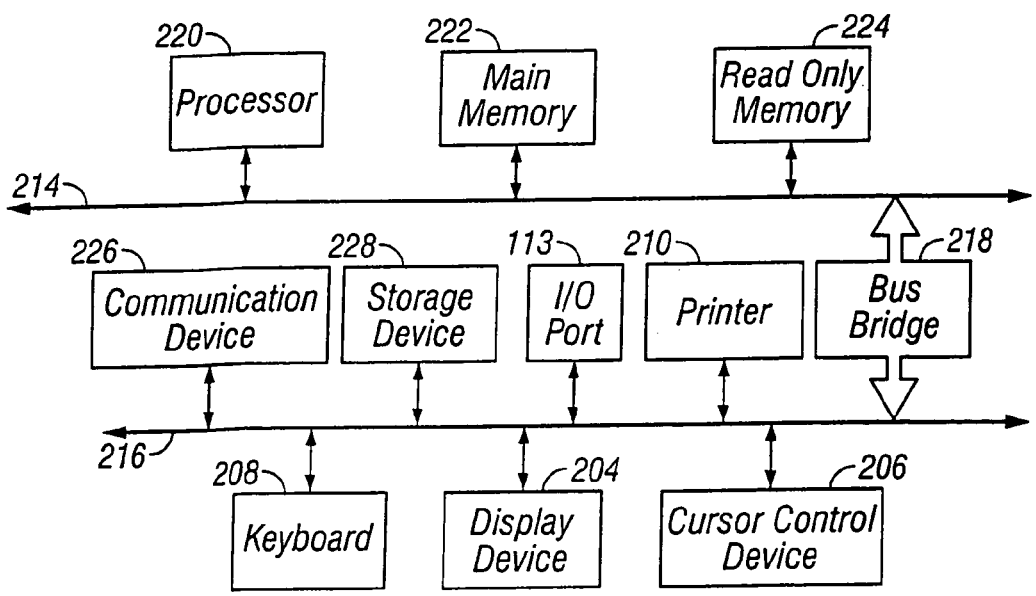

Referring now to FIG. 2b, there is depicted a high-level block diagram of the components of a data processing system 200 such as that illustrated by FIG. 2a. In a conventional computer system, system unit 202 includes a processing device such as processor 220 in communication with main memory 222 which may include various types of cache, random access memory (RAM), or other high-speed dynamic storage devices via a local or system bus 214 or other communication means for communicating data between such devices. The processor processes information in order to implement the functions of the embodiments of the present invention. As illustrative examples, the "processor" may include a central processing unit having any type of architecture such as complex instruction set computers (CISC), reduced instruction set computers (RISC), very long instruction word (VLIW), or hybrid architecture, or a digital signal processor, a microcontroller, a state machine, etc.

Main memory 222 is capable of storing data as well as instructions to be executed by processor 220 and may be used to store temporary variables or other intermediate information during execution of instructions by processor 220. Computer system 200 also comprises a read only memory (ROM) and/or other static storage devices 224 coupled to local bus 214 for storing static information and instructions for processor 220. Examples of non-volatile memory 224 include a hard disk, flash memory, battery-backed random access memory, Read-only-Memory (ROM) and the like whereas volatile main memory 222 includes random access memory (RAM), dynamic random access memory (DRAM) or static random access memory (SRAM), and the like.

System unit 202 of data processing system 200 also features an expansion bus 216 providing communication between various devices and devices attached to the system bus 214 via bus bridge 218. A data storage device 228, such as a magnetic disk 212 or optical disk such as a CD-ROM or DVD and its corresponding drive may be coupled to data processing system 200 for storing data and instructions via expansion bus 216. Computer system 200 can also be coupled via expansion bus 216 to a display device 204, such as a cathode ray tube (CRT) or a liquid crystal display (LCD), for displaying data to a computer user such as generated meeting package descriptions and associated images. Typically, an alphanumeric input device 208, including alphanumeric and other keys, is coupled to bus 216 for communicating information and/or command selections to processor 220. Another type of user input device is cursor control device 206, such as a conventional mouse, trackball, or cursor direction keys for communicating direction information and command selection to processor 220 and for controlling cursor movement on display 204. Moreover, in the case of the computing device 102, the data processing system 200 includes a serial I/O port 113 (e.g. a USB port) to accommodate input and output data from the interface device 106 through serial I/O link 114 (e.g. a USB link).

A communication device 226 is also coupled to bus 216 for accessing remote computers or servers, such as server 104, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 104 via a network infrastructure such as that illustrated in FIG. 1 and described above.

In continuing with the example of the conventional data processing or computer system 200, both the computing device 102 and server 104 may operate under the control of an operating system that is booted into the memory of the device for execution when the device is powered-on or reset. In turn, the operating system controls the execution of one or more software modules or computer programs. These software modules typically include application programs that aid the user in utilizing the computing device 102 and the server 104, and the various functions associated with delivering a multimedia presentation of an audio file to a computing device 102 for display to user, and to allow the user to play a musical instrument in conjunction with the multimedia presentation, as well as, other functions related to security and commerce methods, as will be discussed.

These functions can be implemented as one or more instructions (e.g. code segments), to perform the desired functions of the invention. When implemented in software (e.g. by a software module), the elements of the present invention are the instructions/code segments to perform the necessary tasks. The instructions which when read and executed by a machine or processor (e.g. processor 220), cause the machine or processor to perform the operations necessary to implement and/or use embodiments of the invention. The instructions or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Figure 3A:
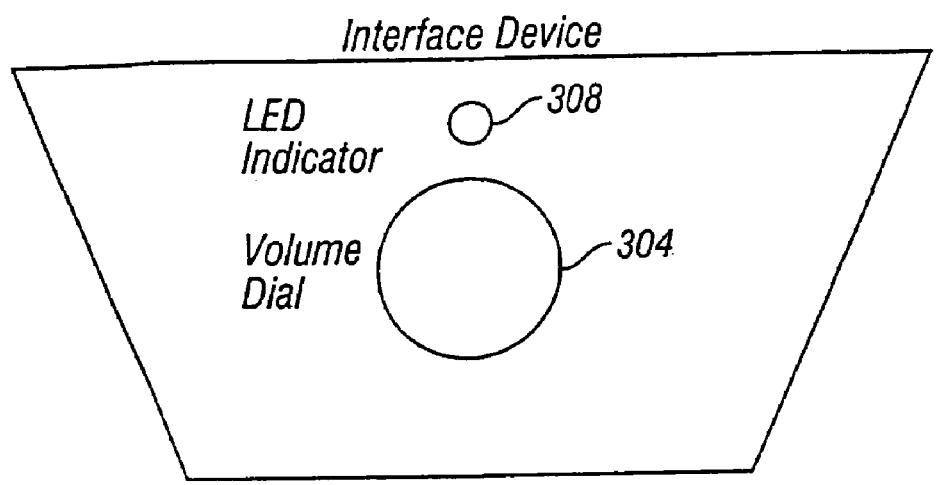
FIG. 3a illustrates a top view of an interface device, according to one embodiment of the present invention.
Figure 3B:
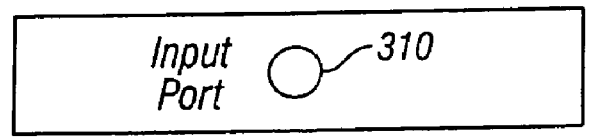
FIG. 3b illustrates a front view of the interface device, according to one embodiment of the present invention.

Turning now to FIG. 3a, FIG. 3a illustrates a top view of an interface device 106, according to one embodiment of the present invention. The interface device 106 couples the musical instrument 112 to the computing device 102 over the input/output (I/O) link 114 such that the user can play a musical instrument 112 in conjunction with a multimedia presentation of the audio file being processed by the computing device 102. As shown in the top view of FIG. 3a, the interface device 106 includes a volume dial or knob 304 to adjust the volume of the musical instrument 112 and the audio file and an LED indicator 308 to indicate interface device operating status (i.e. whether power is on or off). The interface device 106 can include a metal, plastic, or metallized plastic housing to contain the internal electronic components. Turning briefly to FIG. 3b, which illustrates a front view of the interface device 106, according to one embodiment of the invention, the interface device includes an input port 310 to receive an input jack (or other input device) from a musical instrument 112 such that the musical instrument is electrically coupled to the interface device 106.

Figure 3C:
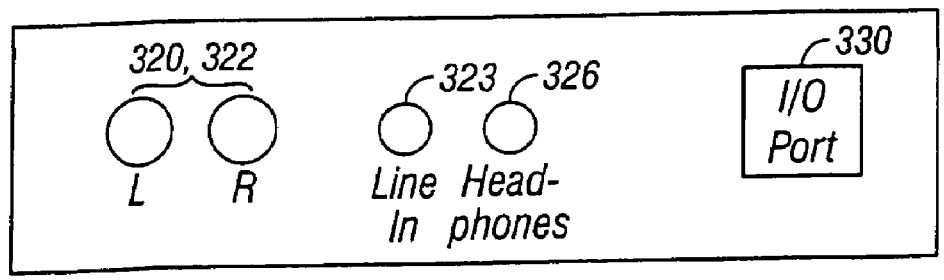
FIG. 3c illustrates a back view of the interface device, according to one embodiment of the present invention.

Referring now to FIG. 3c, FIG. 3c illustrates a back view of the interface device 106, according to one embodiment of the present invention. The interface device 106 includes left and right speaker output ports 320 and 322 that can be used to accept speaker jacks for amplified speakers 120 so that the interface device 106 can be connected to amplified speakers. This allows a user playing his or her musical instrument 112 to hear both the musical instrument as well as an audio file associated with the musical piece being processed by the computing device 102. Furthermore, the interface device 106 includes an additional line in port 323. For example, the additional line in port 323 can be used to support input from a sound card of the computing device 102 such that sounds from games and other software programs from the computing device 102 can simply be routed through the interface device 106 to the speakers 120 or headphones 122.

Also, interface device 106 includes a headphone output port 326 that can be used to accept a headphone jack for headphones 122 to allow the user to listen to his or her musical instrument 112, as well as the audio file, using headphones 122. The interface device 106 further includes a serial I/O port 330 (e.g. a USB port) to accept an I/O connector (e.g. a USB connector) such that the I/O link 114 (e.g. a USB link) can be formed between the interface device 106 and the computing device 102. It should be appreciated that the interface device 106 can also include any number of other input and outputs.

Figures 1, 3D:
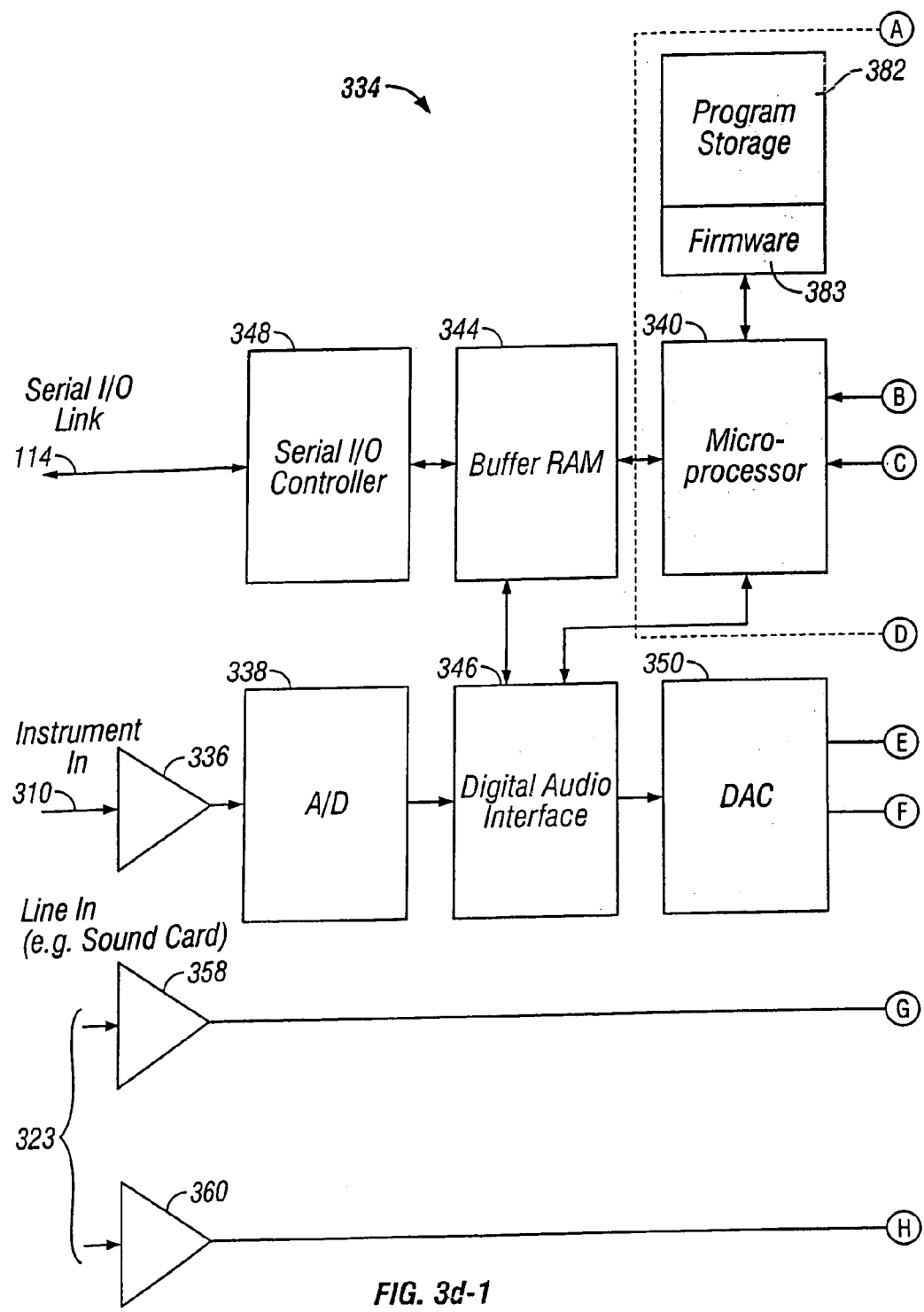
FIG. 3d is a schematic view of the internal components of the interface device, according to one embodiment of the present invention.
Figures 2, 3D:
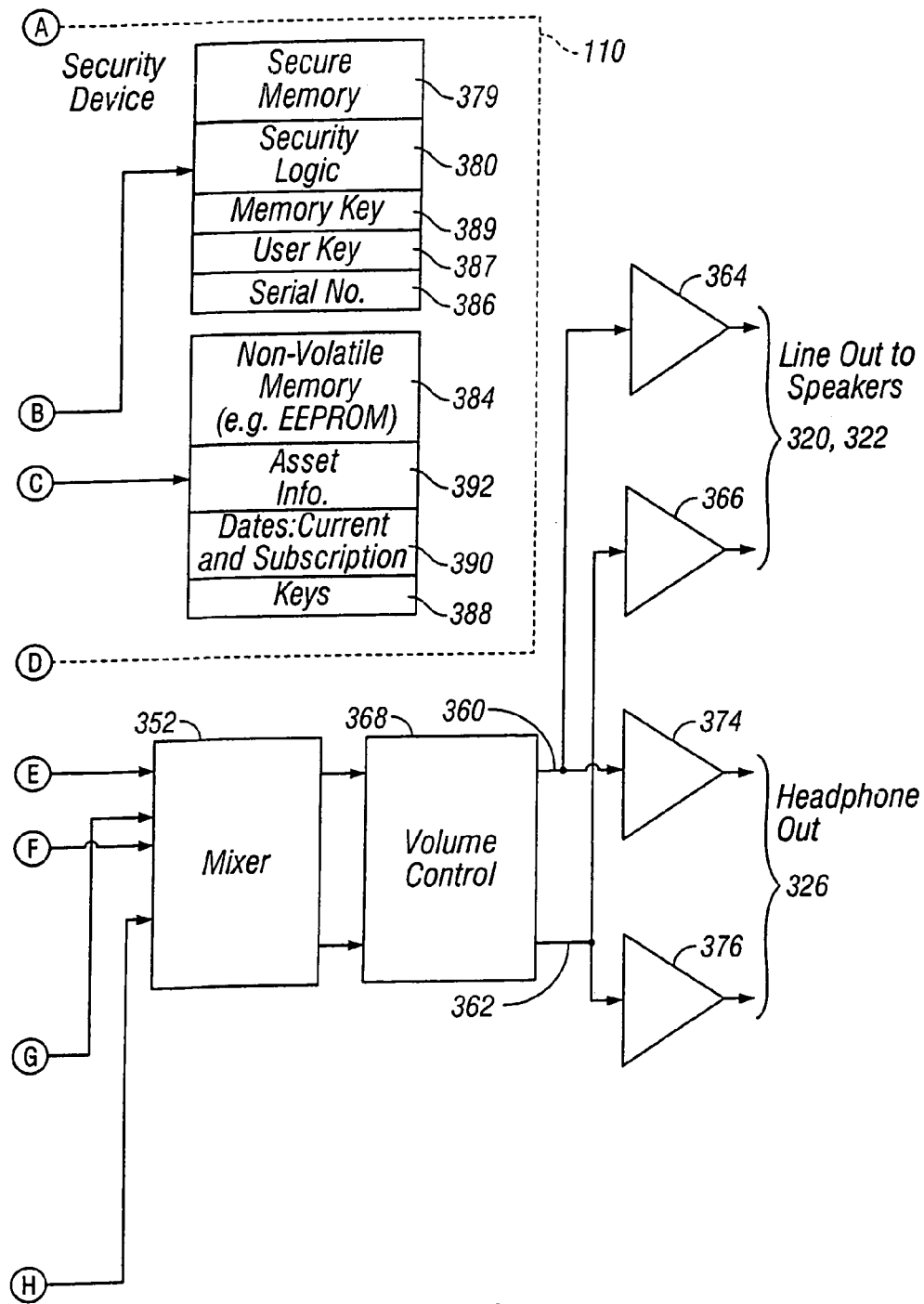

Turning now to FIG. 3d, FIG. 3d is a schematic view of the internal components 334 of the interface device 106, according to one embodiment of the present invention. The interface device 106 includes a microprocessor 340 that controls components of the interface device 106 to perform functions related to A/D and D/A conversion of signals between the musical instrument 112 and the computing device 102, as well as security functions utilizing a security device 110, as will be discussed in more detail later.

As shown in FIG. 3d, the interface device 106 includes an instrument in line from input port 310 that is connected to an amplifier 336. Thus, as an example, an analog audio signal from a musical instrument 112 coming in from input port 310 is amplified by amplifier 336. The amplifier 336 is connected to an analog to digital (A/D) converter 338 such that the amplified analog audio signal is processed by the A/D converter 338 and is converted into a digitized audio signal of the musical instrument.

The microprocessor 340 of the interface device 106 is coupled to components of the security device 110, a buffer RAM 344, and a digital audio interface 346. The microprocessor 340 controls components 334 of the interface device 106 to perform functions related to A/D and D/A conversion of signals between the musical instrument 112 and the computing device 102. The digital audio interface 346 performs conventional functions related to formatting and timing the digitized audio signals. The digital audio interface 346 may include a number of timing clocks to perform these functions. Thus, continuing with the present example, the digitized audio signal of the musical instrument 112 is next formatted by the digital audio interface 346. Further, the digital audio interface 346 is coupled to a buffer RAM 344 that is used to store portions of the digitized audio signal for rate matching.

Moreover, the buffer RAM 344 is connected to the microprocessor 340 and a serial I/O controller 348. The serial I/O controller 348 controls the flow of digital data to and from the computing device 102 along serial I/O link 114. In one example, the serial I/O controller 348 can be a USB controller and the serial I/O link 114 can be a USB link. The digital data controlled by the serial I/O controller 348 can include the digitized audio signal coming directly from the musical instrument 112 which is being sent to the computing device 102 for digital signal processing (DSP) and the mixed digital signal of both the processed digital audio signal of the musical instrument that has undergone DSP by the computing device 102 and the digital audio file associated with selected musical piece coming from the computing device 102. However, it should be appreciated that the digitized signal of the musical instrument does not have to be passed through the computing device 102 for DSP processing and can be passed straight through to the DAC 350 and onto the analog sound device such that the user can still play along with an audio file. The buffer RAM 344 is also used to store the digital audio signal of the musical instrument (pre-DSP processing), the digital audio file, and the mixed digital signal, for conventional purposes, such as rate matching.

The digital audio interface 346 is further connected to a digital to analog converter (DAC) 350. The mixed digital signal of both the processed digital audio signal of the musical instrument and the digital audio file from the computing device 102 are processed by the DAC 350 to convert this mixed digital signal into analog form, i.e. a mixed analog audio signal, such that the mixed analog audio signal can be played back through an analog sound device, such as amplified speakers 120 or headphones 122. However, as previously discussed, it should be appreciated that the digitized signal of the musical instrument does not have to be passed through the computing device 102 for DSP processing and can be passed straight through to the DAC 350 and onto the analog sound device such that the user can still play along with an audio file.

Connected to the outputs of the DAC 350 is a mixer 352. The mixer 352 receives analog audio signal inputs from other line in sources such as the line in port 323, which are amplified by amplifiers 358 and 360, respectively, such that they can also be played through the amplified speakers 120 or headphones 122.

These additional analog audio signal inputs from line in port 323 can be mixed with the analog audio signal of the musical instrument and the audio file or can simply be routed through the interface device to the speakers 120 or headphones 122. For example, the additional line in inputs from line in port 323 can be from a sound card of the computing device 102 such that sounds from games and other software programs from the computing device 102 can simply be routed through the interface device 106 to the speakers 120 or headphones 122. In this way, other software programs can still be used with the interface device 106 hooked up to the computing device 102 (e.g. a personal computer), and the user does not have to reconfigure his or her personal computer system to switch between using the interface device and not using the interface device.

The analog signals from the mixer 352 are then passed through line outs (e.g. left and right) 360 and 362 via speaker ports and 320 and 322 to the amplified speakers 120. Particularly, the analog signals can be amplified by amplifiers 364 and 366 under the control of a volume controller 368, which is in turn controlled by the volume dial 304. Similarly, the analog signals from the mixer 352 are also passed through the line outs 360 and 362 (e.g. left and right) via headphone port 326 to the headphones 122. Likewise, the analog signals can be amplified by amplifiers 374 and 376 under the control of the volume controller 368, which is in turn controlled by the volume dial 304.

Thus, the interface device 106 couples a musical instrument 112 to a computing device 102 over an input/output (I/O) link 114 such that the user can play a musical instrument 112 in conjunction with a multimedia presentation of an audio file being processed by the computing device 102. More specifically, as previously described, the interface device 106 performs analog to digital (A/D) conversion of the audio signal from the musical instrument 112 and transmits the digitized audio signal of the musical instrument via I/O link 114 to the computing device 102 where the digitized audio signal of the musical instrument 112 may undergo digital signal processing (DSP) performed by a software module (e.g. to tailor it to the audio file of the musical piece that was selected by the user). A mixed digital signal of both the digital audio file and the processed digital signal of the musical instrument is transmitted back from the computing device 102 along I/O link 114 to the interface device 106 where the mixed digital signal is converted to analog form (D/A conversion), i.e. a mixed analog audio signal, which is outputted through the speakers 120 or headphones 122. Thus, a user can play along with the downloaded musical piece, which is presented in a multimedia presentation format on the computing device, as will be discussed later, to facilitate learning by the user.

Interface device 106 also includes a security device 110. The security device 110 includes components that can be utilized to uniquely identify the interface device 106 to the server 104 such that access to the server 104 is only granted to a user operating with an authorized interface device. Moreover, the security device 110 in conjunction with the server 104, is used to ensure that audio files are properly encrypted and decrypted such that only a properly authorized interface device 106 can receive and utilize audio files. This protects against unauthorized duplication of licensed material and provides a secure revenue opportunity for content (e.g. audio file) providers.

The security device includes a microprocessor 340, a secure memory 379 having security logic 380, program storage 382 to store security firmware 383, and nonvolatile memory (e.g. EEPROM) 384. Generally, the security firmware 383 when executed by the microprocessor 340 in conjunction with the secure memory 379 and the nonvolatile memory 384, provide for secure operations that allow the server 104 to uniquely identify the interface device 106 and allow the computing device 102 in conjunction with the interface device 106 to decrypt audio files specifically encrypted for use by the authorized interface device 106. The secure memory 379 includes both read-only memory (ROM) and writeable memory, which can be locked and unlocked for reading and writing using the hardware implemented security logic 380.

A unique identifier, such as user key 387, associated with serial number 386 of the interface device 106 is used by the security logic 380 to authenticate the interface device 106 to the server 104. Also, a memory key 389 is used by the security logic 380 to initially unlock the secure memory 379. The serial number 386, user key 387, and memory key 389 are sealed in the secure memory 379 during manufacturing and thereafter can no longer be written over once the secure memory 379 is sealed. The serial number 386, user key 387, and memory key 389 are also stored at the server's user information database 109 so that the server 104 can initially generate a challenge and response to uniquely authenticate the interface device 106 and open and lock the secure memory 379 and the nonvolatile memory 384, as will be discussed in more detail later.

The nonvolatile memory 384 is used as an extension to the secure memory 379. The firmware 383 prevents access to the nonvolatile memory 384 unless the secure memory 379 has also been unlocked. The nonvolatile memory 384 has hardware write protection, which is controlled by the firmware 383. The nonvolatile memory 384 stores keys 388 such as asset encryption keys (e.g. audio file keys) associated with particular purchased assets (e.g. audio files), the current date and subscription dates for certain assets 390, and asset information (e.g. information about assets) 392. It should be appreciated that the serial number 386, the user key 387, the memory key 389, keys 388, the dates 390, the asset information 392 and even the firmware 383 can instead be located or co-located at any of the security device memories: program storage 382, secure memory 379, or nonvolatile memory 384; this particular arrangement being only one embodiment.

As will be discussed in more detail later, the security device 110 in conjunction with the computing device 102 and the server 104, allow the server 104 to uniquely identify the interface device 106 and allow the computing device 102 in conjunction with the interface device 106 to decrypt audio files specifically encrypted for use by the authorized interface device 106, along with many other functions.

Figure 4:
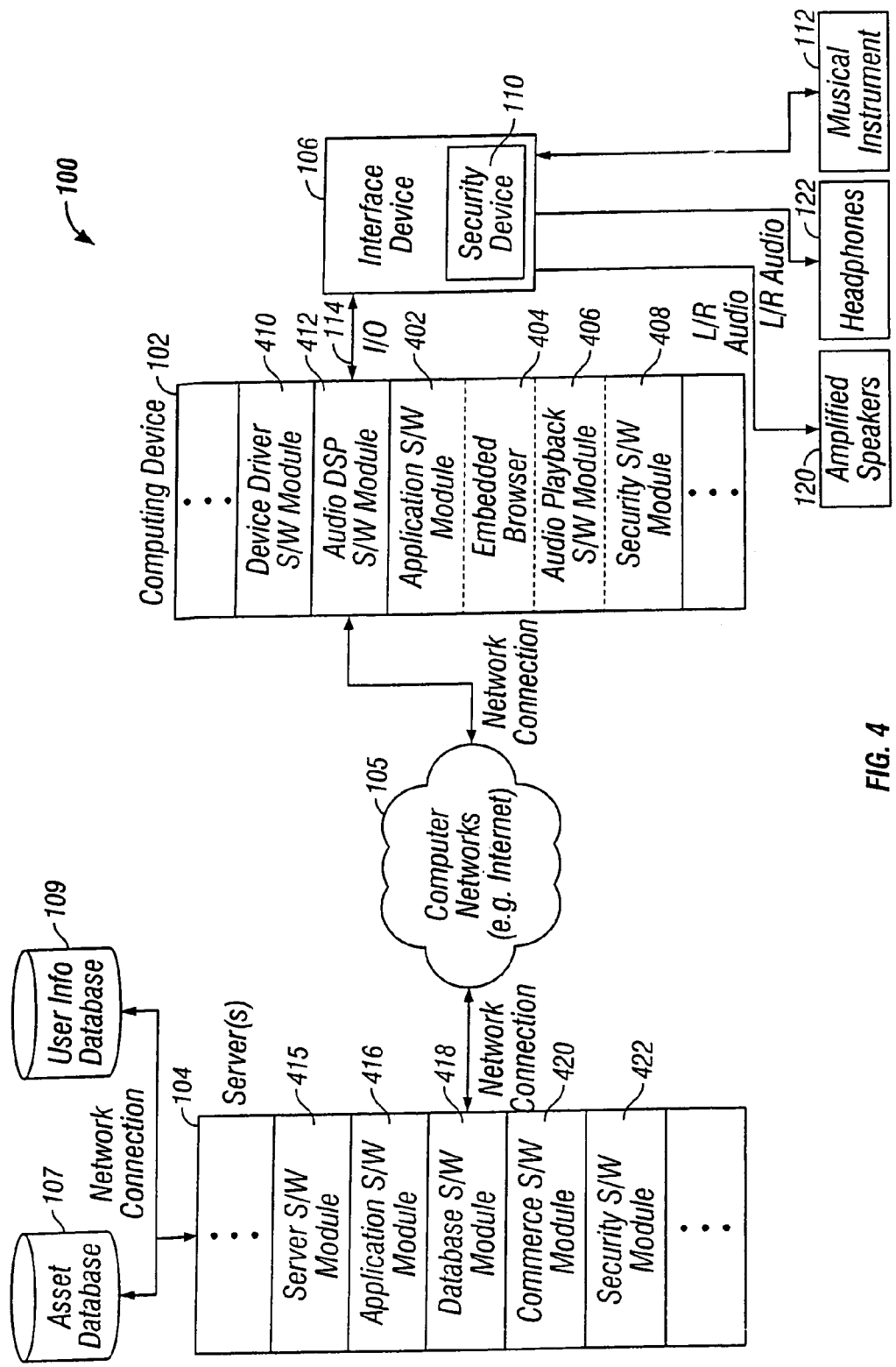
FIG. 4 is a block diagram illustrating a more detailed view of the exemplary system to deliver a multimedia presentation of an audio file to a computing device of FIG. 1, showing typical software modules utilized, according to one embodiment of the present invention.

FIG. 4 is a block diagram illustrating a more detailed view of the exemplary system 100 to deliver a multimedia presentation of an audio file to a computing device 102, showing typical software modules utilized, according to one embodiment of the present invention. Briefly, as previously discussed, server(s) 104 are coupled to computing device 102 through a computer network (e.g. the Internet) 105. Further, an interface device 106 is coupled to the computing device 102 and a musical instrument 112 is coupled to the interface device. In one embodiment, in response to a user selecting the musical piece at a computing device 102, server 104 transmits a session file associated with a musical piece to the computing device 102 through the computer network (e.g. the Internet) 105. The session file includes an audio file and multimedia data. The computing device 102 processes the session file to present the multimedia presentation of the audio file to the user such that a user can play a musical instrument 112 in conjunction with a multimedia presentation of the audio file being processed by the computing device 102.

More particularly, as shown in FIG. 4, the computing device 102 and server 104 each include a plurality of software modules that enable the functions of the embodiments of the present invention. These software modules typically include application programs that aid the user in utilizing the computing device 102 and the server 104, and the various functions associated with delivering a multimedia presentation of an audio file to a computing device 102 for display to user, and to allow the user to play a musical instrument in conjunction with the multimedia presentation, as well as, other functions related to security and commerce methods, as will be discussed. For example, the computing device 102 includes an application software module 402 that further includes an embedded browser 404, an audio playback software module 406, and a security software module 408. Further the computing device 102 includes a device driver software module 410 and an audio DSP software module 412. On the server side, the server 104 includes a server software module 415, an application software module 416, a database software module 418, a commerce software module 420, and a security software module 422.

The application software module 402 of the computing device 102 interfaces and controls the implementation of the embedded browser 404 and all the other software modules (e.g. the audio DSP software module 412, the audio playback software module 406, the device driver software module 410 and the security software module 408) such that the embodiments of the invention related to displaying a multimedia presentation of an audio file to a user to allow the user to play a musical instrument in conjunction with a multimedia presentation, as well as other functions related to security and commerce functions, are properly implemented. In one embodiment, the application software module 402 in conjunction with the embedded browser 404 initially displays a Web page (e.g. a home page) to the user providing the user with a multitude of musical pieces from which to select. The embedded browser 404 is specifically tailored for the application software module 402 and its various functions and can be based on any type of conventionally known browsers such as Microsoft Explorer.

The application software module 402 also causes the display of a control panel graphical interface for a musical instrument 112 that includes settings that define sound characteristics for the musical instrument. The control panel graphical interface also allows the user to set sound characteristics for the musical instrument 112. Further, in response to the multimedia data of the session file for a selected musical piece (e.g. selected by the user) sent to the computing device 102 by the server 104, the application software module 402 sets the settings of the control panel graphical interface to predefined values to model the sound characteristics of the musical instrument associated with the audio file for the musical piece selected by the user. Also, the application software module 402 can play a musical piece selected by the user (e.g. and sent from the server 104 to the computing device 102), that has a track associated with the user's musical instrument removed from the audio file, such that the user can play his or her musical instrument 112 in conjunction with a multimedia presentation of the audio file that does not include the user's musical instrument. Moreover, the application software module 402 processes the multimedia data of the session file to cause the display of music notation associated with the audio file of the musical piece to the user. The display of the multimedia presentation may occur on a display device 204 of the computing device 102 and sound can be routed through the amplified speakers 120 of the interface device 106.

In order to accomplish these functions, the application software module 402 utilizes a conventional device driver software module 410, an audio DSP software module 412, and an audio playback software module 406. The audio DSP software module 412 processes the audio signal of the musical instrument 112 (e.g. utilizing DSP algorithms) such that the user can set the sound characteristics for the musical instrument. As previously described, the audio DSP software module 412 can be utilized by the application software module 402 to set the settings of the control panel graphical interface to predefined values to model the sound characteristics of the musical instrument such that it is properly associated with a musical piece selected by the user. Furthermore, the audio DSP software module 412 combines both the digital audio file and the processed digital audio signal of the musical instrument to create the mixed digital audio signal, previously discussed. Moreover, the application software module 402 controls an audio playback software module 406 to control the transmission of the mixed digital signal of the digital audio file and the digitally processed sound of the musical instrument 112 back to the interface device 106 where it is played back through amplified speakers 120 or headphones 122 to the user. However, the application software module 402 can also control the audio playback software module 406 to control the transmission of only the digital audio file, in the case where the musical instrument is only routed through the interface device 106 and not the computing device 102 for processing. It should be appreciated audio DSP software modules for a variety of different musical instruments are known in the art. For example, general types of DSP software modules that can alter MIDI files are well known (e.g. MIDI SHOP). Also, audio playback software modules that are used to playback audio files and audio signals from musical instruments are also well known.

In one particular embodiment, that will hereinafter be used to describe aspects of the present invention, the application software module 402, the audio DSP software module 412, the Web page the user logs on to, and the control panel graphical interface are directed to support a guitar as the musical instrument 112. In particular, it should be appreciated that DSP algorithms for altering the audio signals from a guitar are known in the art and can be easily implemented in software on the computing device 102. For example, one example of DSP algorithms for altering the audio signals from a guitar to model various amplifiers and speaker cabinet configurations which may be used in the audio DSP software module 412 to implement aspects of the present invention are particularly described in U.S. Pat. No. 5,789,689 entitled "Tube Modeling Programmable Digital Guitar Amplification System", which is hereby incorporated by reference. Moreover, a wide variety of software implemented control panel graphical interfaces for a multitude of different instruments are known, and there are some basic control panel graphical interfaces known for guitars, e.g. AMP FARM includes one type of software implemented control panel graphical interface for a guitar. However, none of them include many of the novel and non-obvious features of the guitar control panel graphical interface to be described in more detail later. Furthermore, the aspects of the security software module 408 of the computing device 102 will also be described in more detail later.

In one embodiment of the present invention, the server 104 includes a server software module 415, an application software module 416, a database software module 418, a commerce software module 420, and a security software module 422. The application software module 416 interfaces and controls the implementation of the server software module 415 and all the other software modules (e.g. the database software module 418, the commerce software module 420, and the security software module 422), at the server 104 such that the embodiments of the invention related to displaying a multimedia presentation of an audio file to a user to allow the user to play a musical instrument in conjunction with the multimedia presentation, as well as other functions related to security and commerce functions, are properly implemented.

At the server 104, the application software module 416 in conjunction with the server software module 415 provides the computing device 102 with the data necessary to implement the functions of the invention, as will be discussed. The server software module 415 can be conventional server software for transmitting and receiving data to and from computing devices 102. For example, using the Hypertext Transfer Protocol (HTTP) and Hypertext Markup Language (HTML) or Extensible Markup Language (XML), the server 104 can communicate with the computing device 102 across the computer network 105 to provide various functions and data to the user. At the computing device 102, utilizing the embedded browser 404, which is part of the application software module 402, or even other browsers such as Netscape™ Navigator™ published by Netscape™ Corporation of Mountain View, Calif., the Internet Explorer™ published by Microsoft™ Corporation of Redmond, Wash., the user interface of America Online™, or any other browser or HTML/XML translator from a well-known supplier, computing device 102 may supply data to, and access processed or unprocessed data from, the server 104.

According to one embodiment of the present invention, as previously discussed, the server software module 415 under the control of the application software module 416 transmits a session file to the computing device 102 through the computer network 105, in response to user selecting a musical piece at the computing device 102. The session file includes an audio file and multimedia data such that the computing device 102 can process the session file to present a multimedia presentation to the user to allow the user to play his or her musical instrument 112 (e.g. a guitar) in conjunction with the multimedia presentation of the audio file. Moreover, as will be discussed, the server software module 415, under the control of the application software module 416, receives and transmits a variety of different types of data to and from the computing device 102 to implement the functions of the invention.

The database software module 418 can be conventional database software, such as MySQL, to control the input and output of data from the asset database 107 and the user information database 109, under the control of the application software module 416, as will be discussed in more detail later. Furthermore, the aspects and functions of the commerce software module 420 and security software module 422 will be discussed in more detail later.

The data communicated between the server 104 and the computing device 102 includes session files having multimedia data and audio files, user information, commerce information to track the purchases and licensing restriction of audio files and other items, security information including encrypted keys and encrypted asset and audio files, multimedia data for the presentation of a Web-site, along with a multitude of other data. Much of the information related to session files, multimedia data, audio files, commerce information, and other assets, as will be discussed, may be stored in the asset database 107. User information including the user's name, email address, home address, computer connection speed, credit card number, subscription information, type of computer, the type of musical preferences the user has, and security information including a user's serial number for his or security device 110, user key, memory key, and other user information, as will be discussed, may be stored in the user information database 109. It will be readily appreciated by those having ordinary skill in the relevant arts that the asset database 107 and user information database 109 may be stored in storage devices including various mass storage devices such as one or more DASD arrays, tape drives, optical drives, or the like, and that the aforementioned information may be stored in any one of a variety of formats or data structures.

In one particular embodiment, that will hereinafter be used to describe some of the aspects of the present invention, the computing device 102, the server 104 and its associated asset and user information databases 107 and 109, and the interface device 106, along with the associate software modules, are used to support a guitar 112 as the musical instrument. However, it should be appreciated by those skilled in the art that the present invention may be used to support any type of musical instrument. Moreover, it should be appreciated that the present invention can also support the case where a microphone is used as the musical instrument and the input audio signal is a human voice such that embodiments of the invention could operate as a virtual karaoke machine. These aspects will be further appreciated after a further reading of the disclosure.

Figure 5A:
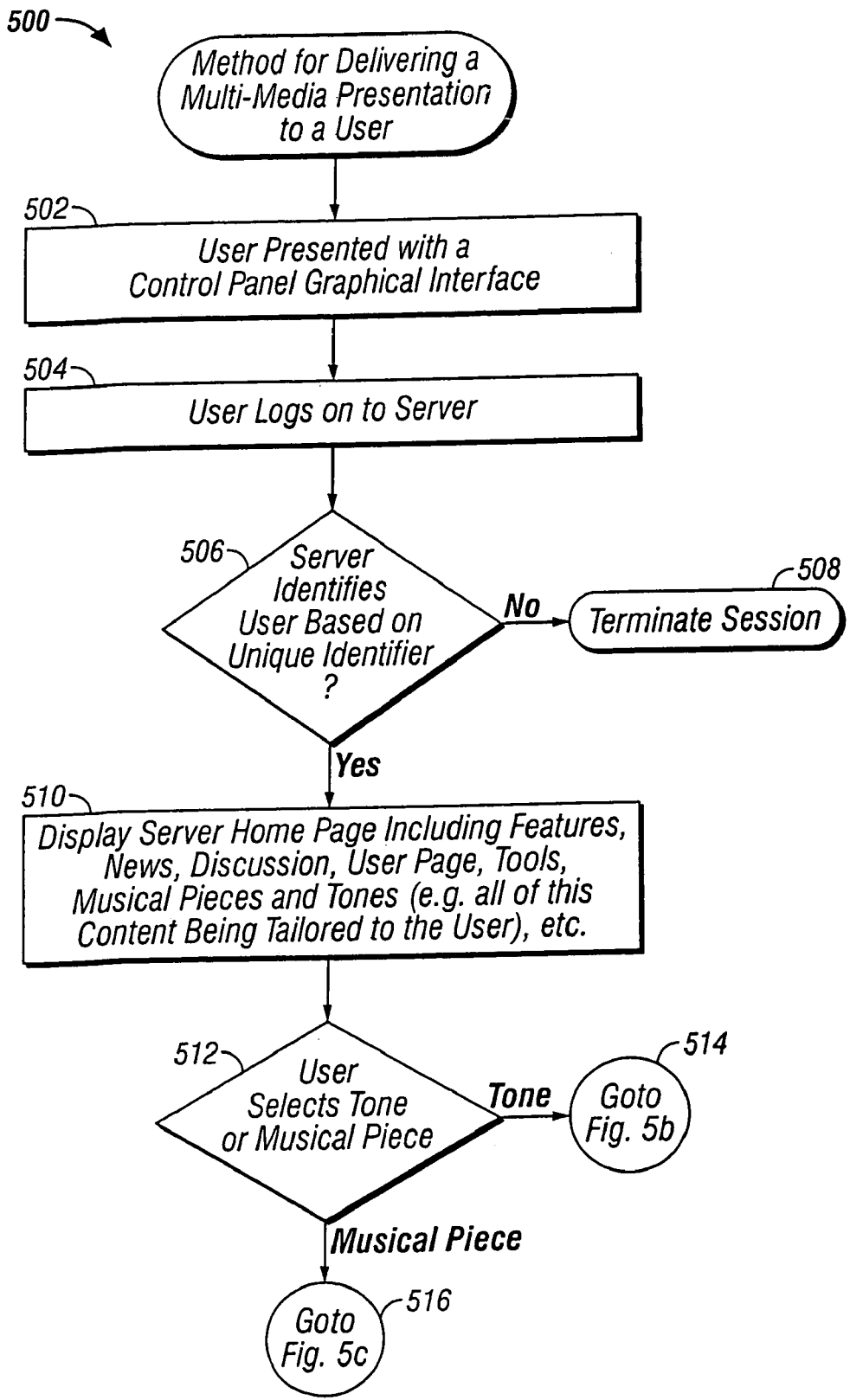
FIG. 5a is a flowchart illustrating a method for delivering a multimedia presentation to user, according to one embodiment of the present invention.
Figure 6A:
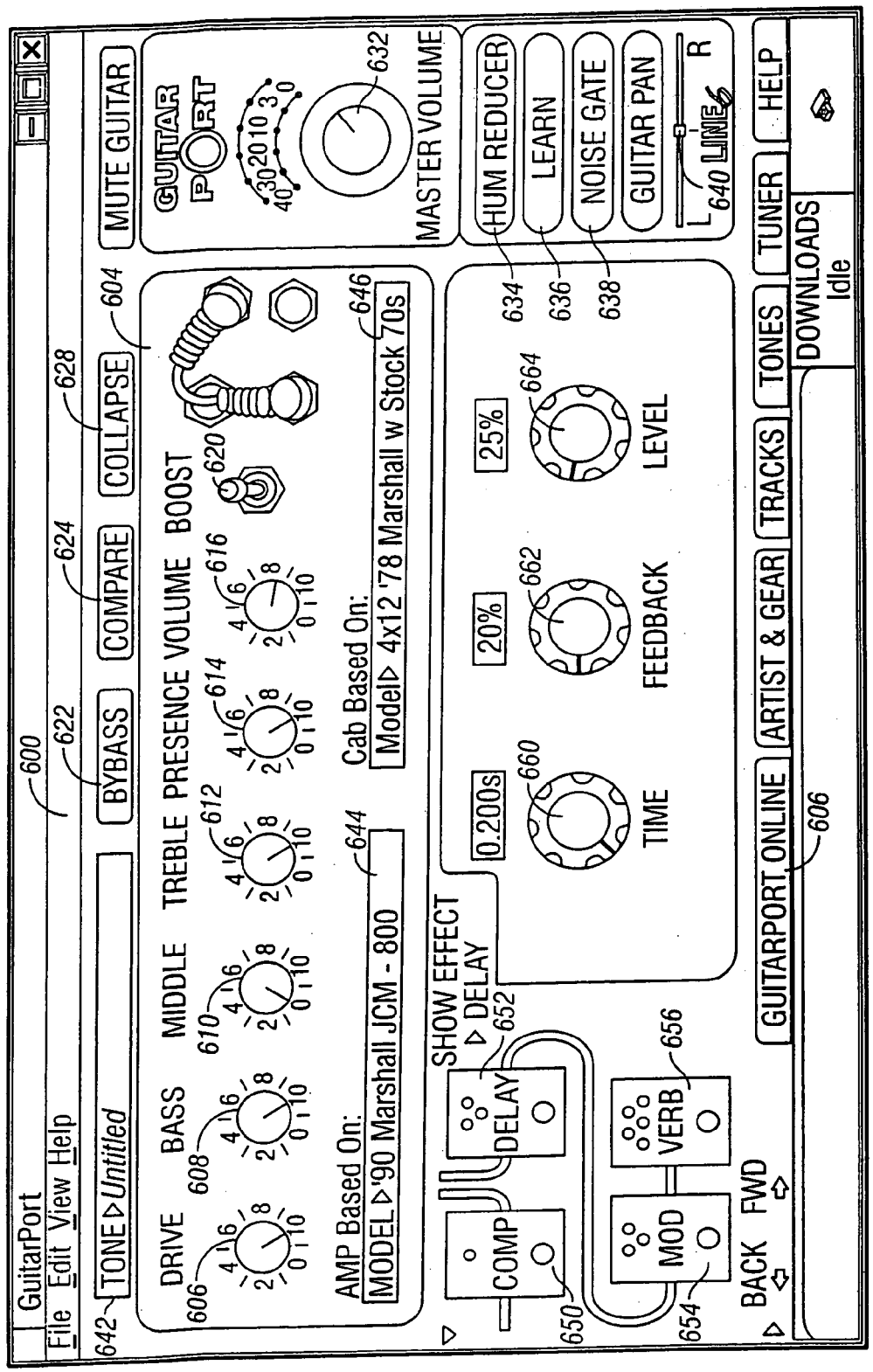
FIG. 6a is a screenshot particularly illustrating the control panel graphical interface for a guitar (e.g. for the embodiment where the musical instrument is a guitar), according to one embodiment of the present invention.

With reference also to FIG. 5a, FIG. 5a is a flowchart illustrating a method 500 for delivering a multimedia presentation to a user, according to one embodiment of the present invention, utilizing the previously described exemplary system 100 of FIG. 4. At block 502, after a user has loaded the application software module 402 onto his or her computing device 102, the application software module 402 presents the user with a control panel graphical interface 600 as shown in FIG. 6a. For example, the control panel graphical interface 600 can be displayed on the display device 204 of the computing device 102. Next, the computing device 102 utilizing the application software module 402 permits the user to log onto the server 104 and to access the server. Thus, the application logs the user onto the server. According to one particular guitar embodiment, to be discussed hereinafter, the server presents the user a Web-site related to guitars, hereinafter termed the GUITARPORT Web-site. Thus, the user is first presented with a GUITARPORT homepage and other GUITARPORT Web pages thereafter.

With reference also to FIG. 6a, logging on to the server 104 can be accomplished by the user selecting the GUITARPORT online button 606. For example, the computing device 102 can contact the server 104 through the computer network (e.g. the Internet) utilizing standard computer network protocols (e.g. TCP/IP). At block 506, the server 104 under the control of the application software module 416 and in conjunction with the security software module 422 identifies the user based on a unique identifier from the security device 110 (e.g. the Serial No. of the interface device 106) to determine whether access to the server 104 should be authorized. These security features will be discussed in more detail later. If the user is not authorized by the server 104, then the session is terminated at block 508. However, if the user is authorized to utilize the server 104, then the method 500 moves on to block 510.

Figure 5B:
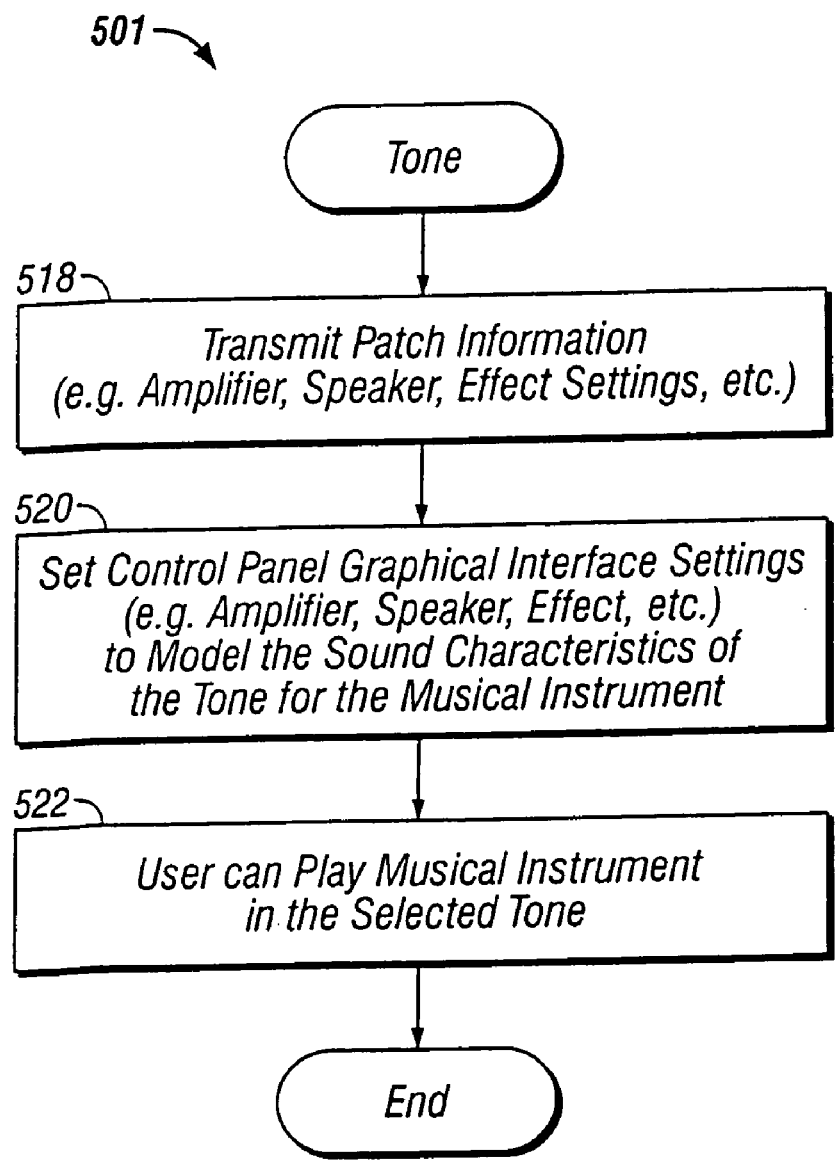
FIG. 5b is a flowchart illustrating a method of providing a tone to a user, according to one embodiment of the present invention.
Figure 5C:
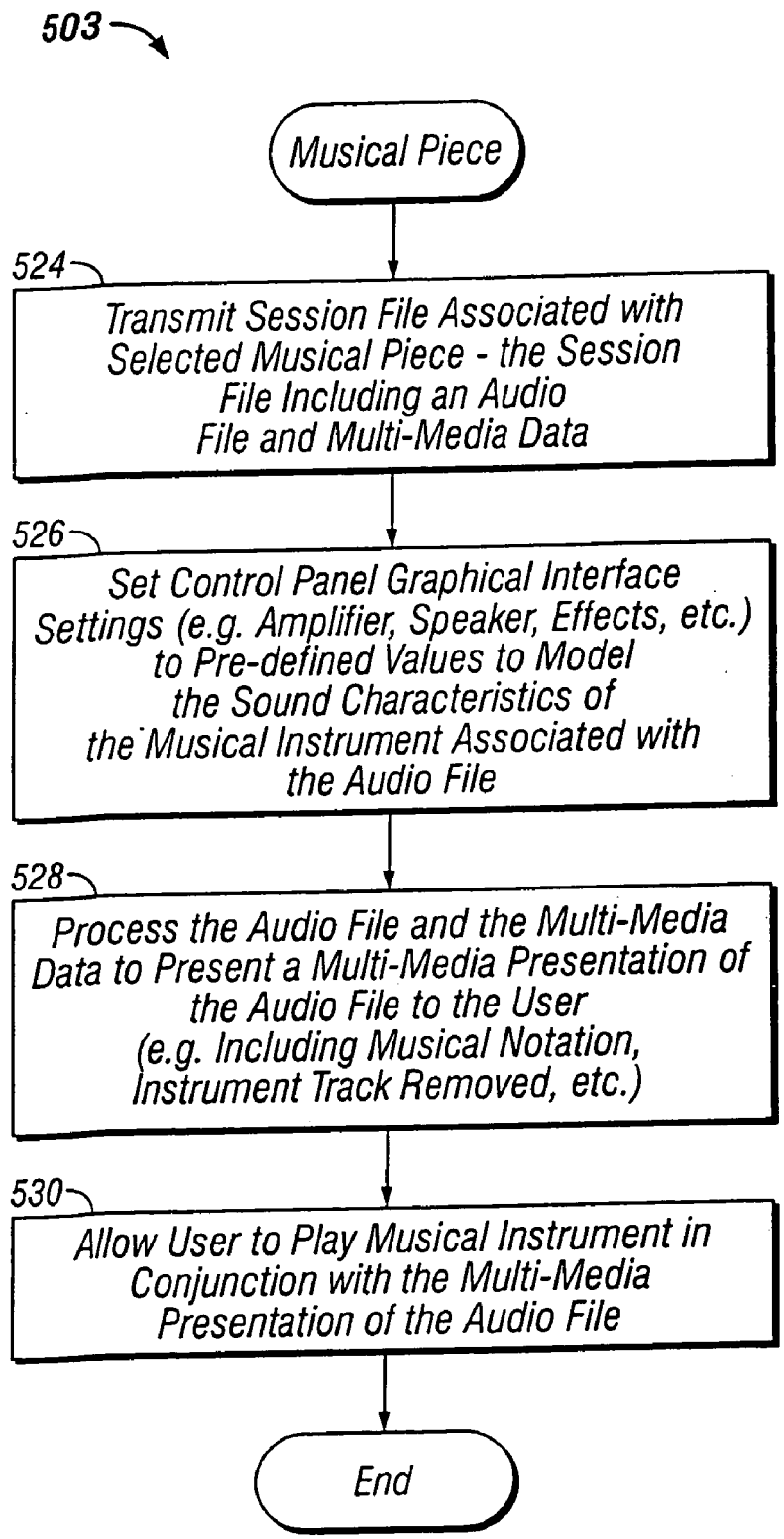
FIG. 5c is a flowchart illustrating a method of providing a musical piece to a user, according to one embodiment of the present invention.
Figures 1, 6B:
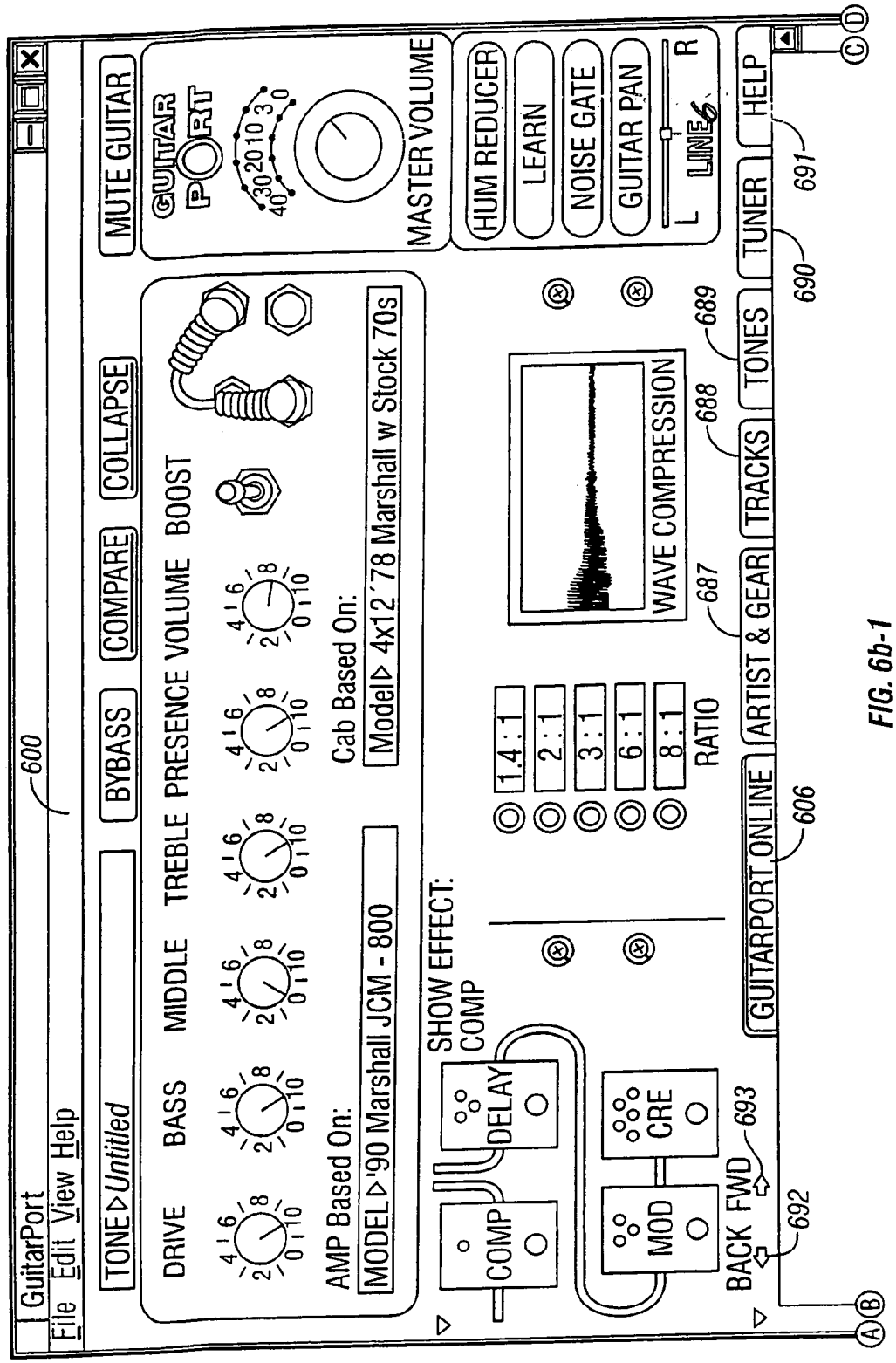
FIG. 6b is a screenshot of the display illustrated to the user when they successfully log on to the server, according to one embodiment of the present invention.
Figures 2, 6B:
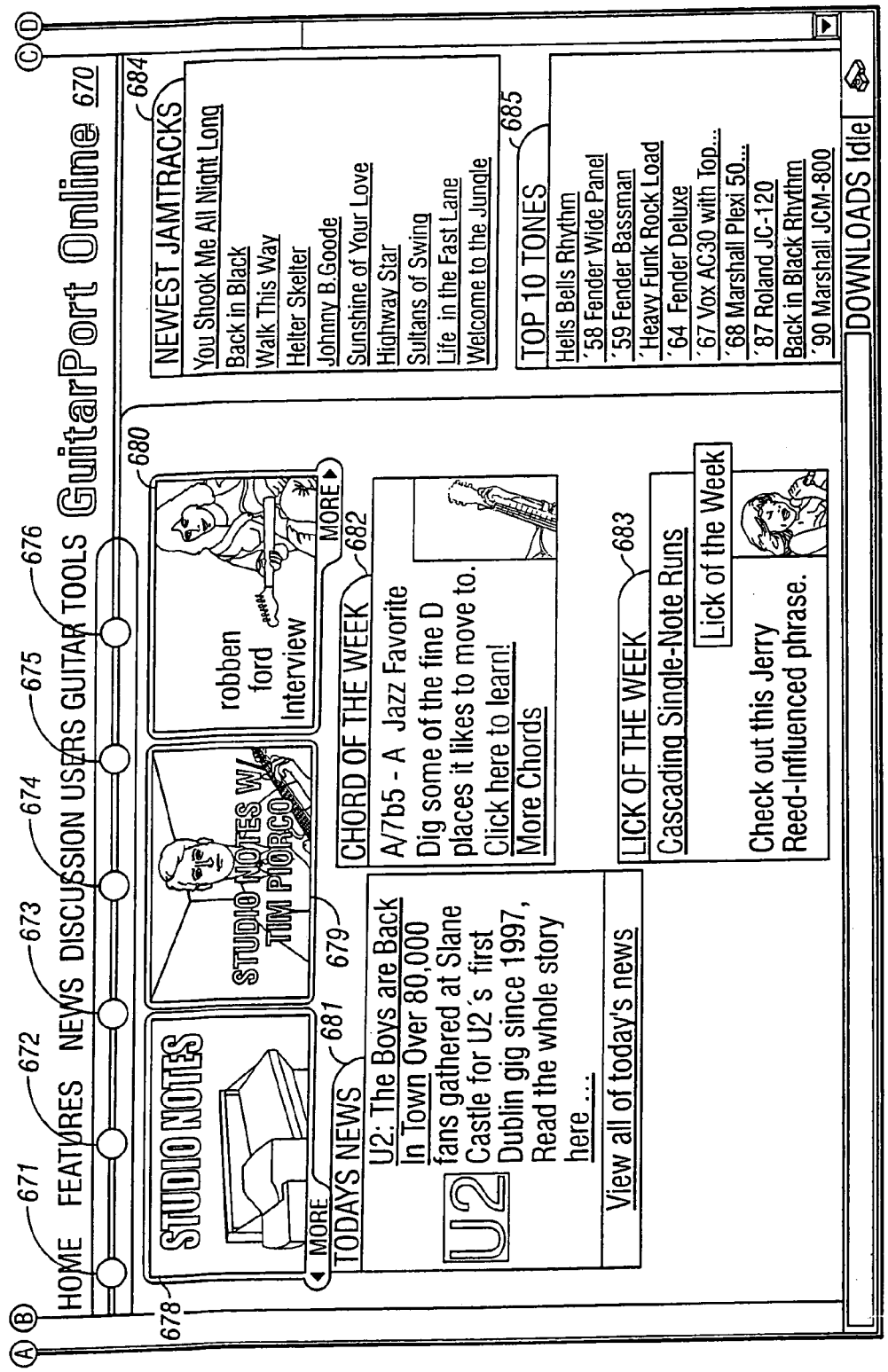

At block 510, the application software module 402 utilizing the embedded browser 404 displays the server the GUITARPORT homepage received from the server 104, as shown in FIG. 6b. The GUITARPORT homepage is initially displayed beneath the guitar control panel graphical interface 600. With reference also to FIG. 6b, the GUITARPORT homepage includes Features, News, Discussion, User Page, Guitar Tools, Musical Pieces (e.g. Newest Jamtracks), and Tones. The GUITARPORT homepage will be particularly discussed later. Moreover, based on user information for the user (e.g. particularly the musical preferences of the user) stored in the user information database 109 at the server 104, the server 104 can particularly tailor the GUITARPORT homepage to fit the musical preferences of the user. For example, if a user prefers rock-and-roll then the Newest Jamtracks (e.g. musical pieces) will be directed towards rock-and-roll musical pieces, as well as, particular rock-and-roll Tones. Further, the other components of the GUITARPORT homepage can also be geared to the user's preference, for example, News, Features, etc. At block 512, the user is allowed to select a Tone or a musical piece (e.g. a Jamtrack). If the user selects a tone then the method 500 proceeds to FIG. 5b at block 514. On the other hand, if the user selects a musical piece (e.g. a Jamtrack) the method 500 proceeds to FIG. 5c at block 516. A Jamtrack is one type of musical piece that can be downloaded from the server 104.

To aid in the explanation of methods of the invention and associated control panel interfaces, some of the control panel graphical interfaces will now be discussed. Referring now to FIG. 6a, FIG. 6a is a screenshot particularly illustrating the control panel graphical interface for a guitar 600. As previously discussed, the application software module 402 generates the control panel graphical interface 600, and in conjunction with the audio DSP software module 412, allows the user to change the settings of the control panel graphical interface (or the settings can be set to predefined settings determined by a session file or a predefined patch) such that the audio DSP software module 412 processes the audio signal from the guitar 112 to match the desired settings. The settings of the control panel graphical interface 600 for a guitar will now be described.

The control panel graphical interface 600 includes a plurality of standard control knobs 604 common to most guitar amplifiers including: a drive control knob 606, a bass control knob 608, a middle control knob 610, a treble control knob 612, a presence control knob 614, and a volume control knob 616. These control knobs are selectable by the user to change the sound of the guitar. The control panel graphical interface 600 further includes a boost switch 620 to increase the power of the audio signal from the guitar. A bypass button 622 when selected turns off the DSP processing such that the straight unprocessed audio signal from the guitar is used. A compare button 624 when selected allows two different control panel graphical interface configurations to be compared side by side. A collapse button 628 when selected reduces the size of the control panel graphical interface 600. A mute guitar button 630 when selected mutes the audio signal from the guitar.

The Master Volume dial 632 controls both the volume of the audio signal of the guitar 112 and the volume of any other audio signals (e.g. from an audio file) currently being processed. Selection of the hum reducer button 634 allows the user to reduce the hum interaction between the guitar 112 and the display device 204. Once the hum reducer button 634 is selected and the learn button 636 is depressed, the computing device 102 measures the hum interaction between the guitar 112 and the display device 204 (e.g. the user can move his or her guitar next to the display device) and DSP processing will compensate for the hum interaction and remove it. The noise gate button 638 when selected attenuates the input audio signal from the guitar, if it is below a threshold level, but does not attenuate the audio signal from the guitar if it is above the threshold level. Thus, the noise gate button 638 may be used to get rid of such things as guitar handling noise. A guitar pan slide 640 may be used to pan the sound of the guitar between the left and right speakers.

Further, as previously discussed, the user may select a tone or a tone may be automatically selected for the user to go along with the musical piece selected by the user. The type of tone selected is showing in the tone field 642. Any number of tones representing amplifier models based on most any type of guitar amplifier (e.g. MARSHALL, FENDER, VOX, ROLAND, etc.), most any type of speaker cabinet, and most any type of effect can be reproduced. For example, tones for the Hells Bells rhythm section by AC/DC, a heavy funk rock lead, a '64 Fender Deluxe, or any other tone may be selected (e.g. see Top 10 Tones 685 (FIG. 6b)) or created by the user. In particular, it should be appreciated that DSP algorithms for altering the audio signals from a guitar 112 are known in the art and can be easily implemented in software on a computing device 102. For example, one example of DSP algorithms for altering the audio signals from a guitar to model various amplifiers and speaker cabinet configurations which may be used in the audio DSP software module 412 to implement aspects of the present invention is particularly described in U.S. Pat. No. 5,789,689 entitled "Tube Modeling Programmable Digital Guitar Amplification System", which is hereby incorporated by reference.

Typically, a tone can be defined by the guitar amplifier, the speaker cabinet, and a number of different effects, as well as other settings. Again the tone can be selected by the user, created by the user, or can be preset to go along with the selected musical piece. The type of guitar amplifier tone being modeled is shown in the amplifier model field 644 (e.g. '90 Marshall JCM-800). The speaker cabinet configuration tone being modeled is shown in the speaker cabinet model field 646 (e.g. 4×12 '78 Marshall with Stock 70s). The speaker cabinet configuration 646 emulates the effects of a speaker cabinet on the amplified guitar sound. Further, a number of a digitally reproduced well known effect boxes are provided by the control panel graphical interface 600 to create tones. Particularly, a compression effect box 650, a delay effect box 652, a modulation effect box 654 (e.g. including chorus, flanger, rotary, tremolo, etc.), and a reverb effect box 656 are provided. Effect boxes are typically found in additional digital audio instrument processors that are coupled to a guitar and a standard amplifier. Also, this particular control panel graphical interface 600 shows that the delay effect box 652 is currently selected and shows specific attributes of the delay effect such as delay time 660, feedback percentage 662, and level percentage 664. Moreover, as previously discussed, a user can log on to the GUITARPORT Web-site by selecting the GUITARPORT online button 606.

Turning now to FIG. 6b, FIG. 6b is a screenshot of the display illustrated to the user when they successfully log on to the server 104, according to one embodiment of the present invention. Particularly, the application software module 402 and the embedded browser 404 display the GUITARPORT homepage 670 received from the server 104, which is located below the control panel graphical interface 600, and in conjunction with the data received from the server 104, perform many of the functions requested by the user. It should be noted that control panel graphical interface 600 is the same as that shown in FIG. 6a, except that in this instance, the compression effects box has been selected and a compression effects window (e.g. allowing for the selection of different compression ratios) is shown.

As shown in FIG. 6b, the GUITARPORT homepage 670 includes a Home button 671, a Features button 672, a News button 673, a Discussion button 674, a Users button 675, and a Guitar Tools button 676. When the home button 671 is selected by a user, the user is returned to the GUITARPORT homepage. Depression of the Features button 672 brings the user to a Features page, which includes such things as interviews with artists, studio notes, and other articles related to the field of music that the user may find useful. Selection of the News button 673 brings the user to a News page that provides news articles related to the field of music and guitars in particular. When the user picks the Discussion button 674, the user is brought to a bulletin board that allows users to post messages (e.g. questions, answers, news, articles, etc.) in any subject but is usually related to music and guitars in particular. Selection of the Users button 675 provides the user with a user page that allows the user to update their user profile (e.g. name, address, type of subscription, musical preferences, etc.). Depression of the Guitar Tools button 676 brings the user to a utility page that provides the user with information related to guitar playing, for example: what is the figuring for a C chord, how do I set up my amplifier, etc. This can be accomplished by frequently asked questions (FAQ) listings, a searchable database, email questions to a guitar technician, etc.

The GUITARPORT homepage can also be populated with selectable icons representing links to new articles, interviews, news, chords, guitar licks, Newest Jamtracks (e.g. musical pieces), and the most popular Tones. For example, FIG. 6b shows selectable Studio Notes icon links 678 and 679, a selectable Interview icon link 680, a selectable Today's News icon link 681, a Chord of the Week icon link 682, and a Lick of the Week icon link 683, as well as, Newest Jamtracks (e.g. musical pieces) links 684, and Tone links 685. Moreover, as previously discussed, the GUITARPORT Web-site can be particularly tailored to a user based on user information (e.g. particularly the musical preferences of the user) stored in the user information database 109 at the server 104. With this information, the server 104 can particularly tailor the GUITARPORT Web-site to fit the musical preferences of the user. For example, if a user prefers rock-and-roll, then the Newest Jamtracks 684 (e.g. musical pieces) will be directed towards rock-and-roll musical pieces as well as particular Tones 685. Further, the other components of the GUITARPORT Web-site can also be geared to the user's preference, for example, Studio Notes, Interviews, News, Chord of the Week, Lick of the Week, etc.

Further, the control panel graphical interface 600 has some selectable buttons that interact with the GUITARPORT Web-site. As shown in FIG. 6b, the GUITARPORT online button 606 to connect to the GUITARPORT Web-site is already depressed. An Artist and Gear button 687 is provided, and when selected, provides a user a list of artists from which they can choose, such that the user can find articles written about the artist providing artist biographies and the type of musical gear that they use. The tracks button 688 when selected, provides the user a list of musical pieces (e.g. Jamtracks) that the user can select. In response to a user selecting a musical piece (e.g. Jamtrack), the server 104 transmits a session file associated with the selected musical piece to the computing device 102 through the computer network (e.g. the Internet) 105. The session file includes an audio file and multimedia data. The computing device 102 processes the session file to present a multimedia presentation of the audio file to the user, as will be discussed. The Tone button 689 when selected, provides the user a list of tones that the user can select. In response to a user selecting a tone, the server 104 transmits patch information (e.g. type of amplifier, speaker cabinet, effect settings, etc.) such that the control panel graphical interface 600 is properly configured and the DSP software module 412 properly processes the guitar signal to emulate the proper tone. However, it should be appreciated that with or without a connection to the GUITARPORT Web-site, the user can utilize previously stored tones and musical pieces (e.g. Jamtracks).

Also, the control panel graphical interface 600 has a tuner button 690 that when selected, allows the computing device to act as a chromatic tuner such that user can tune his guitar. The control panel graphical interface 600 also has a Help button 691 that when selected provides standard Help features to the user. Further, the control panel graphical interface 600 has standard Back and Forward arrows 692 and 693 that allow the user to toggle back and forth through previously visited web pages of the GUITARPORT Web-site.

As previously discussed, if the user selects a Tone then the method 500 proceeds to FIG. 5b (block 514). For example, the user can select one of the Tones provided by selecting the Tones button 689 or one of the Top Tones 685 (e.g. Heavy Funk Rock Lead (FIG. 6b)). Turning to FIG. 5b, FIG. 5b is a flowchart illustrating a method 501 of providing a tone to a user, according to one embodiment of the present invention. In response to a user selecting a tone, the server 104 transmits patch information (e.g. type of amplifier, speaker cabinet, effect settings, etc.) to the computing device 102 (block 518). The application software module 402 sets the control panel graphical interface 600 to the proper configuration to model the sound characteristics of the tone for the musical instrument (e.g. the guitar) (block 520). Further, the DSP software module 412 properly processes the guitar audio signal to emulate the proper tone. Thus, the user can play his or her guitar 112 connected through the interface device 106 to the computing device 102 in the proper tone. For example, patches can represent guitar tones for various recording artists (e.g. Jimi Hendrix, Eric Clapton, Jerry Garcia, Chet Atkins, Robert Cray, etc.) or can be particularly created for the GUITARPORT Web-site to represent various guitar styles—rock, country, jazz, etc.

As previously discussed, if the user selects a musical piece then the method 500 proceeds to FIG. 5c (block 516). For example, the user can select one of the musical pieces (e.g. Jamtracks) provided by selecting the Tracks button 688 or one of the Newest Jamtracks 684 (e.g. Welcome to the Jungle (FIG. 6b)). Turning to FIG. 5c, FIG. 5c is a flowchart illustrating a method 503 of providing a musical piece to a user according to one embodiment of the present invention. Particularly, in response to a user selecting a musical piece (e.g. Jamtrack), the server 104 transmits a session file associated with the selected musical piece (e.g. Jamtrack) to the computing device 102 through the computer network (e.g. the Internet) 105 (block 524). The session file includes an audio file and multimedia data.

Figure 5D:
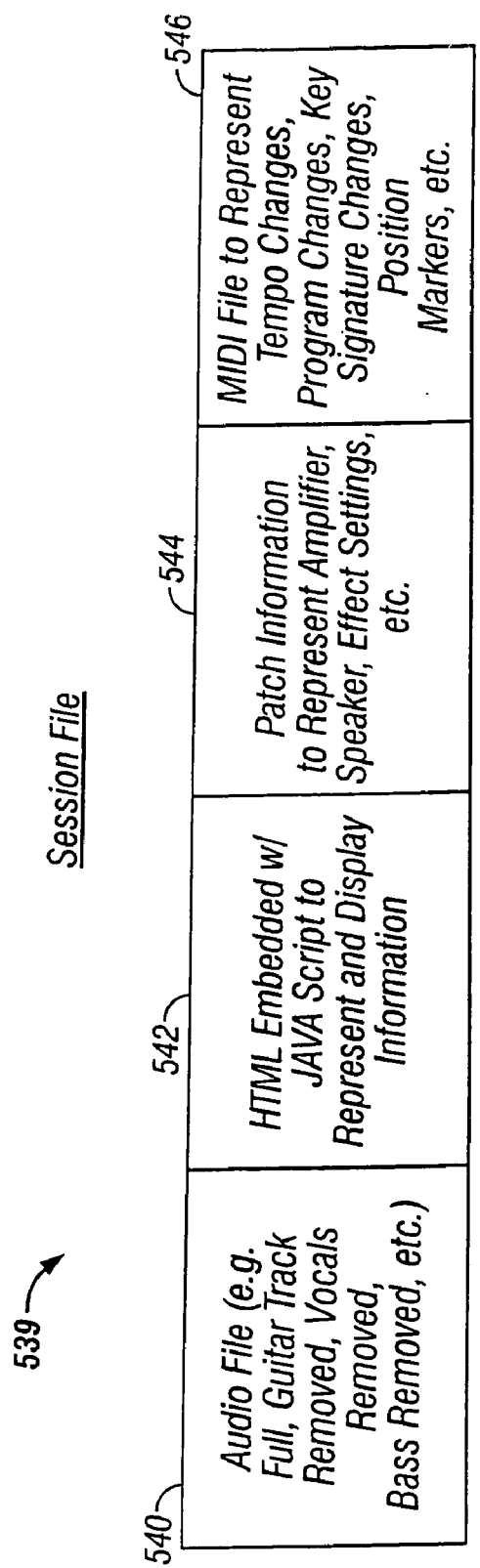
FIG. 5d is a diagram illustrating the contents of a session file, according to one embodiment of the present invention.

Turning briefly to FIG. 5*d*, FIG. 5*d* illustrates the contents of a session file 539, according to one embodiment of the present invention. The session file 539 includes an audio file 540 associated with the musical piece (e.g. Jamtrack). The audio file 540 of the musical piece is typically a song that the user wants to play along with. The audio file 540 can be the full song (i.e. with all the instrument tracks and vocal tracks). Alternatively, the audio file 540 can have one or more tracks removed, for example: one or more guitar tracks can be removed, one or more vocal tracks can be removed, one or more bass tracks can be removed, one or more drum tracks can be removed, etc. For example, as will be discussed, the user can select a musical piece (e.g. Jamtrack) with the guitar track removed such that the audio file 540 is played by the computing device 102 and the interface device 106 (e.g. through the amplified speakers 120), with the guitar track removed, so that the user can play along with the song with the guitar track removed.

Further, the session file 539 has a multimedia block 542, which includes HTML data embedded with JavaScript to represent and display multimedia information to the user. Particularly, with brief reference to FIG. 6*c*, which will be discussed in more detail later, the multimedia data can be processed by the application software module 402 and the embedded browser 404 of the computing device 102 (along with other software modules of the computing device 102) to represent the name of the song or musical piece 601, and the music notation 603 associated with the lead sheet 605, such that the user can play along with the audio file 540 being played. The multimedia data block 542 also includes all the other necessary data to achieve these functions.

The session file 539 also includes a patch block 544 that includes patch information such that the guitar 112 has the proper tone or sound to go along with the associated selected musical piece/audio file 540. The patch information includes the type of amplifier, speaker cabinet, effect settings, etc., such that the guitar settings of the control panel interface 600 are set to go along with the selected musical piece/audio file. The application software module 402 sets the control panel graphical interface 600 to the proper configuration to model the sound characteristics of the tone for the guitar for the particular musical piece/audio file 540. Further, the DSP software module 412 properly processes the guitar signal to emulate the proper tone such that the guitar sound goes along with the musical piece/audio file 540.

Moreover, the session file 539 includes a MIDI file 546 that represents the tempo changes, program changes, key signature changes, position markers, etc., for the selected musical piece/audio file 540. MIDI files are well known in the art. The computing device 102 (e.g. utilizing the application software module 402) interprets the tempo map from the MIDI file during playback to convert the current audio playback position to the corresponding audio file position in the MIDI file for the purpose of determining what events in the MIDI file should occur. Program changes from the MIDI file are used to select patch information 544 to select amplifier, speaker cabinet, and effects settings, etc., for the amplifier controls of the control panel graphical interface 600 that are needed for the particular position in the audio file (e.g. the particular tone for the guitar being emulated using the DSP software module 412). Key signature changes from the MIDI file 546 are used for displaying the current key signature to the user. Markers of the MIDI file 546 are used to cause display events at various points in the musical piece. Each marker in the MIDI file 546 is assigned a text label. The label corresponds to a JavaScript function to be executed when the label is reached.

Figures 1, 6C:
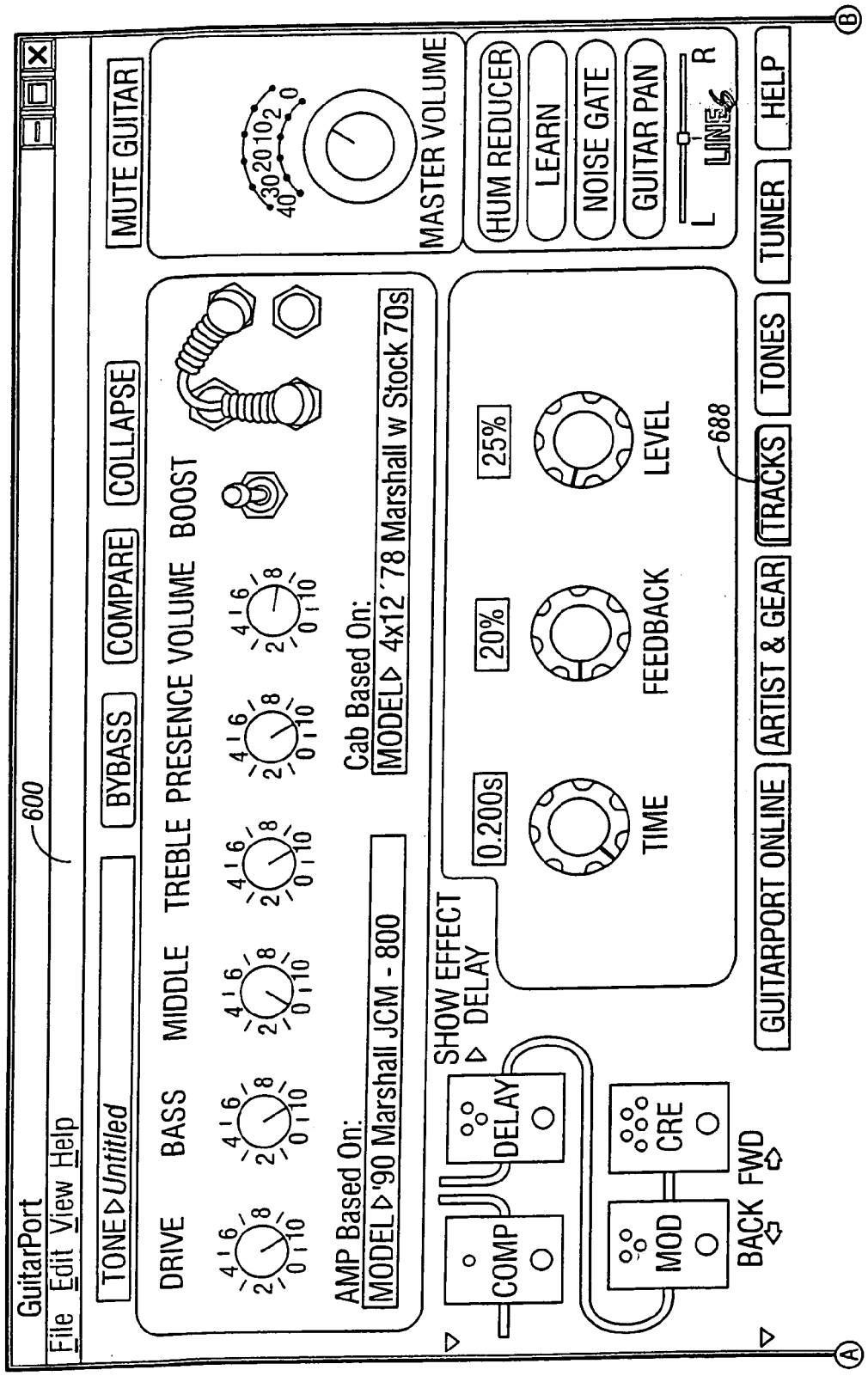
FIG. 6c is a screenshot showing the display illustrated to the user when the user has selected a musical piece (e.g. a Jamtrack), and particularly shows a multimedia presentation (e.g. with music notation) for the selected musical piece such that the user can play his or her guitar in conjunction with the multimedia presentation, according to one embodiment of the present invention.
Figures 2, 6C:
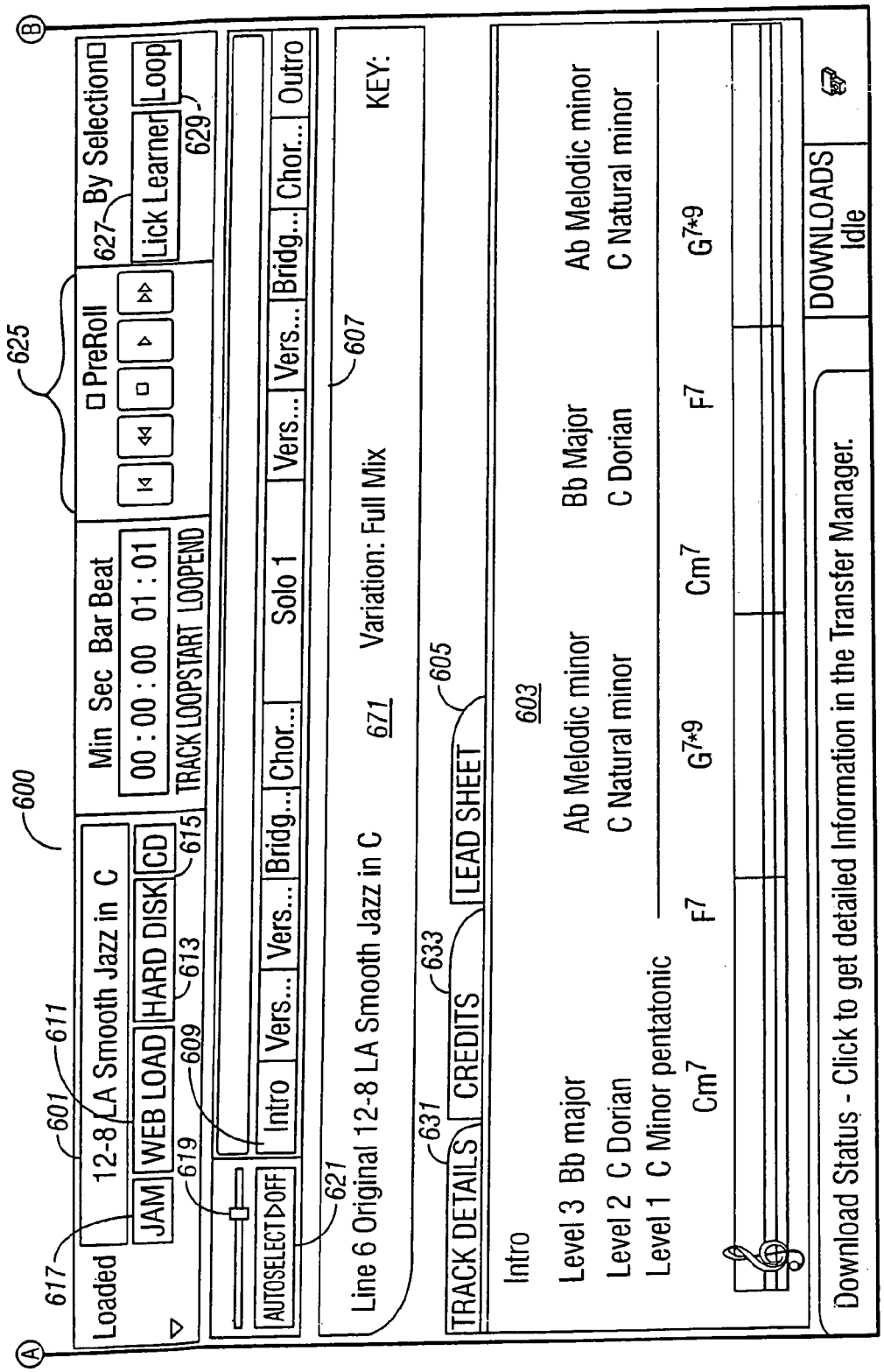

For example, turning briefly to FIG. 6*c*, the musical piece (e.g. Jamtrack) LA Smooth Jazz in C 601, and it's associated lead sheet 605 with musical notation 603 has been selected by user and is shown. Associated with the LA Smooth Jazz musical piece are MIDI markers. The text labels 609 for the MIDI markers 607 are displayed above the musical notation 603 and come from the MIDI file 546 of the session file 539. In this example, the text labels 609 of the MIDI markers 607 represent different portions of the musical piece/audio file 540, as shown: Intro, Verse, Bridge, Chorus, Solo 1, etc. For example, a MIDI marker 607 may have the text label 609 "Chorus". The MIDI marker 607 for the text label 609 "Chorus" causes the music notation 603 (e.g. chords, notes, guitar tablature, and lyrics, etc.) to be displayed whenever the chorus of the song begins. As another example, as shown in FIG. 6*c*, the music notation 603 for the Intro (e.g. chords) is shown. Thus, when the computing device 102 receives a MIDI marker 607 from associated session file 539, it processes the MIDI marker utilizing JavaScript, which looks up the corresponding function and executes the script for it. The JavaScript typically loads a picture or draws something on the display device. In this example, the JavaScript displays the musical notation 603 (e.g. chords) for the Intro of the selected musical piece, LA Smooth Jazz in C when it receives the MIDI marker 607 for the "Intro".

Returning to FIG. 5*c*, illustrating method 503, at block 528, the session file 539 (e.g. the audio file 540 and the rest of the multimedia data) is processed to present a multimedia presentation of an audio file 540 to the user (e.g. including musical notation 603). This allows the user to play a guitar 112 in conjunction with the multimedia presentation of the audio file 540 (block 530).

Referring also to FIG. 6*c*, the computing device 102 can display pictures, text, and graphics during playback (e.g. on the display device 204). For example, the computing device can display musical notation 603 such that while the musical piece/Jamtrack (e.g. including audio file 540) plays, the current position within the musical pieces is displayed, typically along with other information: such as the lyrics, the key signature, and guitar tablature (e.g. chords, notes, figuring diagrams, etc.), and a user is allowed to play his or her guitar 112 in conjunction with the multimedia presentation of the audio file 540.

For example, in the present example of FIG. 6*c*, the musical piece (e.g. Jamtrack) LA Smooth Jazz in C 601, and it's associated lead sheet 605 with musical notation 603, has been selected by user and is display on the GUITARPORT Display 671. In this example, the text labels 609 of the MIDI markers 607 are displayed and represent different portions of the musical piece/audio file 540, as shown: Intro, Verse, Bridge, Chorus, Solo 1, etc. As shown in FIG. 6*c*, the music notation 603 for the Intro (e.g. chords) is shown. In this example, the JavaScript displays the musical notation 603 (e.g. chords) for the Intro of the selected musical piece, LA Smooth Jazz in C when it receives the MIDI marker 607 for the "Intro".

Accordingly, the user can play his or her guitar 112 in conjunction with the musical notation 603 and the audio file 540. As the audio file 540 progresses, the musical notation 603 can be automatically updated (e.g. to next portion of the musical piece—Bridge, Chorus, solo, etc.) such that the user can read the musical notation and play along. Moreover, the user can choose versions of the musical piece/audio file 540 with and without a guitar track to enable learning and jamming. Further, as previously discussed, musical pieces/audio files can be chosen that have the vocals, drums, bass, etc., removed.

Further, a patch block 544 that includes patch information such that the guitar 112 has the proper tone or sound to go along with the associated musical piece/audio file 540. The patch information includes the type of amplifier, speaker cabinet, effect settings, etc., such that the guitar settings of the control panel interface 600 are set to go along with the selected musical piece/audio file and can even accommodate changes within the musical piece itself. This can be triggered by the MIDI markers, as previously discussed. The application software module 402 sets the control panel graphical interface 600 to the proper configuration to model the sound characteristics of the tone for the guitar for the particular musical piece or portion of the musical piece and the DSP software module 412 properly processes the guitar signal to emulate the proper tone such that the guitar sound goes along with the musical piece/audio file 540. As previously discussed, the user's guitar is electrically routed through the computing device 102, allowing the computing device 102 to control the sound of a guitar during playback so that the amplifier model, its settings and any effects can change dynamically as required throughout the musical piece/audio file 540. As shown in FIG. 6c, an amplifier model based on a '90 Marshall JCM-800 amplifier with a Delay setting is used to emulate a jazz sound to go along with the Intro. for the selected LA Smooth Jazz in C musical piece. Thus, matching patches for each portion of a musical piece/Jamtrack are automatically provided, for example to go from one tone during the Chorus and to another tone during the Solo.

Looking at FIG. 6c, particular aspects of the GUITARPORT Display 671 will be discussed to point out other particular features of the invention. As shown, the Tracks button 688 has been selected, and the musical piece LA Smooth Jazz in C 601 has been particularly selected by the user. Accordingly, the LA Smooth Jazz in C's 601 associated lead sheet 605 with musical notation 603 is further displayed on the GUITARPORT Display 671. Below the selected musical piece (e.g. Jamtrack) LA Smooth Jazz in C 601 are buttons that control the way musical pieces can be selected. The Web Load button 611 allows a user to select a musical piece from the GUITARPORT Web-site and load it onto the user's computing device 102 (e.g. store it in local memory). The Hard Disk button 613 allows a user to select a musical piece already stored locally at the computing device 102 (e.g. on the user's hard disk). The CD button 615 allows a user to select a musical piece from a CD in the CD drive of the user's computing device 102. When a song is selected on the CD, the GUITARPORT server 104 determines if it has an associated session file 539 for the song, and if so, if a user so chooses, provides the multimedia presentation of the song (e.g. patch file, musical notation, etc.) to the user.

The Jam button 617, when selected by the user, begins the multimedia presentation of a musical piece (e.g. Jamtrack), previously discussed, such that the user can jam along. The Mixer Slide 619 controls the volume of the musical piece. The Autoselect On/Off button 621 can be used to toggle between using the pre-defined patch settings for the control panel graphical interface 600 (i.e. the amplifier settings) automatically selected for the currently playing multimedia presentation (e.g. Autoselect On), as opposed to, the user setting the control panel graphical interface 600 settings (i.e. the amplifier settings) themselves to their own liking (e.g. Autoselect Off).

A typical timer display 623 for musical pieces (e.g. Jamtracks) and loops is provided along with conventional digital multimedia control features 625 (e.g. play, record, stop, rewind, fast forward, etc.). A Lick Learner button 627, when selected, slows down the tempo of the currently playing musical piece (e.g. Jamtrack), without altering the pitch, to facilitate learning. Also, a Loop button 629 is provided, that when selected, loops (i.e. plays repeatedly), a current portion of a musical piece/Jamtrack (e.g. Intro, Chorus, etc.) to facilitate learning that portion of the musical piece. Moreover, track details 631 can be selected which provides information about the musical piece. For example, when it was recorded, information about the artists, what type of guitars, amplifiers, and effects that were used. Also, credits 633 can be selected which provides information about where the musical piece came from, e.g. Sony, Arista, etc., or whether the musical piece was specifically created (and by who) for the GUITARPORT Web-site. For example, musical pieces (e.g. Jamtracks) can be custom-created to facilitate the learning of particular types of music—e.g. rock, blues, jazz, country, etc.—exclusively for the GUITARPORT Web-site.

Accordingly, the present invention allows a user to couple his or her guitar 112 into the computing device 102, via the interface device 106, such that he or she can download tones and musical pieces from the GUITARPORT Web-site. The interface device 106 along with a subscription is required to obtain the online subscription services (e.g. downloading the musical pieces and tones). The interface device 106 uniquely identifies the user and, in conjunction with the rest of system 100, is used to authorize the user, encrypt and decrypt audio files, and to track the purchases of assets, as will be discussed in more detail later. Moreover, in response to a user selecting a musical piece (e.g. Jamtrack), the server 104 transmits a session file 539 associated with the musical piece to the computing device 102 through the computer network 105. The session file 539 includes an audio file and multimedia data such that the computing device can process the session file to present the multimedia presentation of the audio file to the user. The computing device 102 processes the session file 539 to present the multimedia presentation of the audio file to the user (e.g. including scrolling music notation 603) such that a user can play his or her guitar 112 in conjunction with the multimedia presentation of the audio file. Furthermore, an intuitive control panel graphical interface 600 for the guitar resembling familiar guitar equipment is provided. The control panel graphical interface 600 includes an amplifier panel with standard controls, allowing the user to select from several different types of amplifiers to achieve different tones. Also, a set of effect boxes is also provided.

As previously described, users can listen to musical pieces while viewing musical notation 603 (e.g. chords, notes, tablature (fingering diagrams), lyrics, etc.). These musical pieces can include both commercial musical pieces and musical pieces created exclusively for use by the GUITARPORT Web-site to facilitate the learning of the guitar. Users can jam along with versions of a musical piece with and without the original guitar track to facilitate practice. Thus, users are provided quick and easy access to a wide variety of musical pieces (e.g. Jamtracks) that they can download from a server 104, and the user can then play along with the downloaded musical piece, which is presented in a multimedia presentation format to facilitate learning.

Users can be provided with access to hundreds or thousands of musical pieces (e.g. Jamtracks) in a range of different styles. Musical pieces may include the following: pre-existing sound recordings; remixes of pre-existing sound recordings (example without the guitar track or vocal tracks); re-recorded versions of previously published copyrighted songs; original songs produced for the GUITARPORT Web-site (e.g. songs created to facilitate the learning of guitar); drum loops; grooves; etc. Furthermore, grooves (e.g. rhythm sections, drumbeats, etc.) can be provided to facilitate jamming and practice. Moreover, the GUITARPORT Web-site can also provide for the sale of many other music related assets, besides musical pieces (e.g. Jamtracks), such as: CDs by a multitude of recording artists, printed sheet music, tablature, guitar notation, chord charts, lyrics, digital sheet music, T-shirts, music memorabilia etc. Additionally, as will be discussed in detail later, each unique musical piece or tone downloaded, or any type of purchase, is tracked and recorded for accurate reporting to content licensing partners (e.g. the copyright owner).

Embodiments of the present invention further provide a security device 110 to uniquely identify a user and to decrypt encrypted assets for use by the computing device 102. Thus, the security device protects against unauthorized duplication of licensed material and provides a secure revenue opportunity for content providers. Typically assets relate to musical pieces (e.g. Jamtracks) including audio files (e.g. copyrighted sound recordings), however, it should be appreciated that assets can be any sort of data (e.g. multimedia, video, movies, voice, software, generic data forms, etc.) transmitted over a computer network. As will be discussed in more detail later, the security device 110 in conjunction with the computing device 102 and the server 104, allow the server 104 to uniquely identify the security device 110 and allow a computing device 102 coupled to the authorized security device 110 to decrypt assets specifically encrypted for use by the authorized security device 110, along with many other functions. As will be discussed, the security device 110 includes an embedded electronic Serial No. and user key that is combined with hardware encryption and key storage circuitry, to uniquely identify each security device 110 to the server 104, and to ensure that assets will only operate with a computing device 102 coupled to an authorized security device thereby providing a secure revenue opportunity for content providers.

Figure 7A:
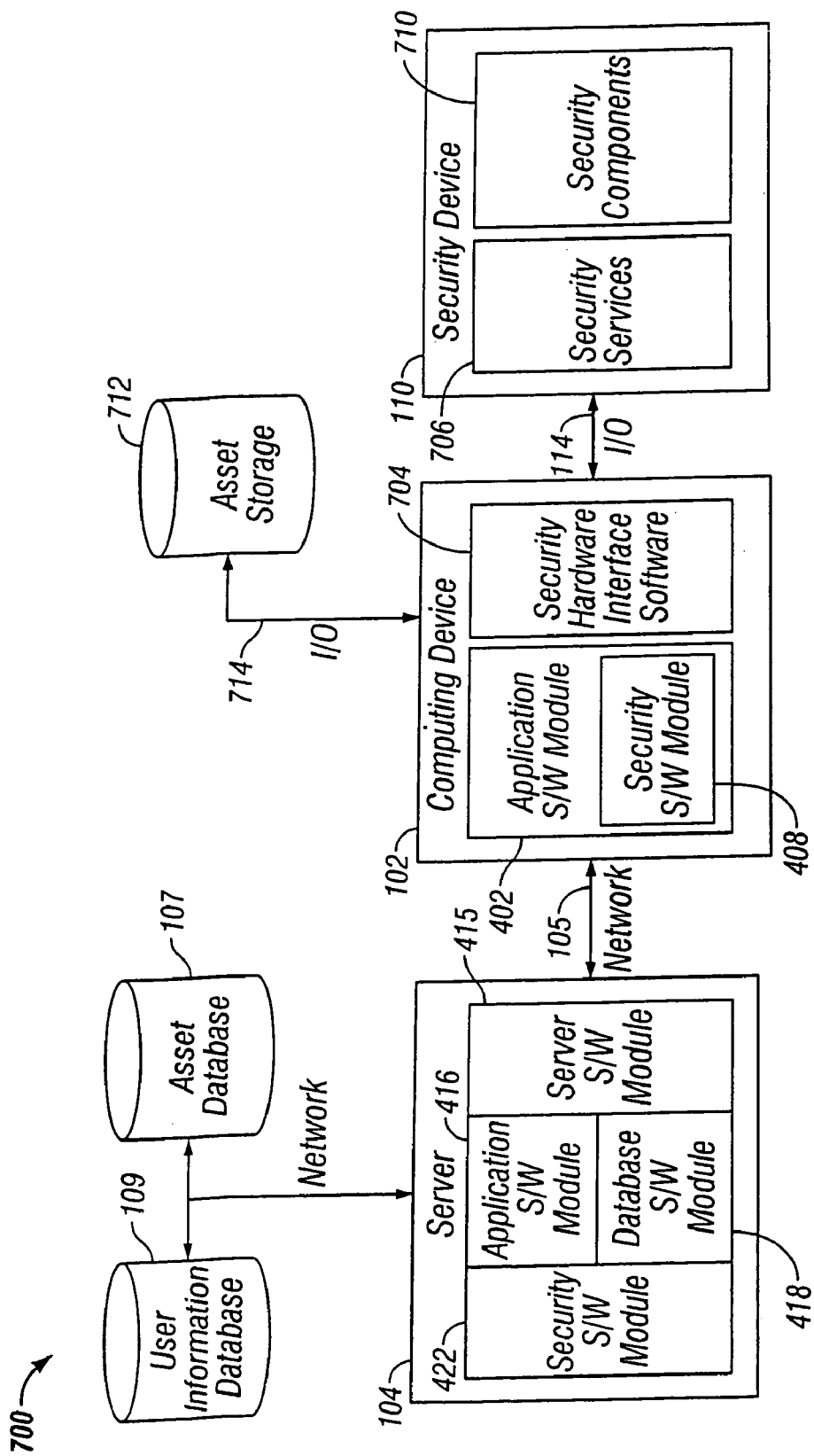
FIG. 7a illustrates a security system, according to one embodiment of the present invention.

Referring now to FIG. 7a, FIG. 7a illustrates a security system 700, according to one embodiment of the present invention. As previously discussed, the server 104 is coupled through the computer network 105 (e.g. the Internet) to the computing device 102, and the computing device 102 is in turn connected through an I/O link 114 (e.g. a USB link) to a security device 110.

Shown to highlight the security aspects of the security system 700, the server 104 includes the security software module 422, the application software module 416, the server software module 415, the database software module 418 and, not shown here, the commerce software module 420. Moreover, coupled to the server 104 through computer network connections are the asset database 107 and the user information database 109.

Further shown to highlight the security aspects of the security system 700, the computing device 102 includes the application software module 402 including the security software module 408 and security hardware interface software 704. The security device 110 includes security services 706 and security components 710 to implement the security services 706. Moreover, local asset storage 712, for example local memory such as a hard drive is coupled through I/O link 714 to the computing device 102 or is part of the computing device 102. Local asset storage 712 can be used to store assets (e.g. audio files) previously downloaded by the user.

The security device 110 includes security components 710 that can be utilized to implement security services 706. Such security services 706 include uniquely identifying the security device 110 to the server 104 such that access to the server 104 is only granted to a user operating with an authorized security device 110. Another security service 706, performed by the security device 110 in conjunction with the server 104, is to ensure that assets (e.g. audio files) are properly encrypted and decrypted such that only a computing device 102 coupled to properly authorized security device 110 can receive and utilize assets.

Looking particularly at the server 104, the server 104 includes the security software module 422 that contains security programs and algorithms for performing security functions, as will be discussed. The security software module 422 coordinates information from a clock/calendar of the server 104 and the various databases—i.e., the user information database 109 and the asset database 107, to authenticate users and deliver encrypted assets to authenticated users. The clock/calendar is a typical part of a server computer 104 that allows it to accurately determine the date and time. Further, the server 104 operates in secure operating environment (e.g. utilizing secure sockets layer (SSL), S-HTTP, etc).

The user information database 109 includes subscription and registration information for each user who is registered to access the server 104 (e.g. in one embodiment, a GUITARPORT Web-site subscriber) and who also has an authorized security device 110. The subscription information for each user includes the expiration date for the user's subscription and the user's unique serial number for his or her security device 110, user key, and memory key, which are needed for determining the authenticity of each security device 110 and for encrypting and decrypting assets, as will be discussed. It should be noted that the unique user serial numbers stored at both the server and the security devices, respectively, may consist of digits, letters, printable characters, binary codes, alphanumeric codes, or basically any sort of designator for unique identification.

The asset database 107 contains assets (e.g. multimedia presentations associated with musical pieces and audio files, and as previously discussed Jamtracks including full songs and songs with various instrumental tracks removed), as well as any other sort of digital data asset. Moreover the asset database 107 includes unique asset encryption keys for each asset (e.g. each audio file). Further, it should be appreciated that the asset database 107 can include any other assets that can be purchased or rented and downloaded to a computing device 102 over a computer network 105.

Looking particularly at the computing device 102, the computing device 102 particularly includes the application software module 402 and the security software module 408. The security software module 408 includes standard encryption and decryption routines to encrypt and decrypt assets, as will be discussed. Any suitable block mode cipher that utilizes pseudo-random generators to XOR pseudo-random numbers with data can be used. Some examples include Data Encryption Standard (DES), International Date Encryption Algorithm (IDEA), etc. Further, the security software module 408, as will be discussed later, allows the computing device 102 to be used as a conduit for interaction between the server 104 and the security device 110 and to particularly authenticate the service device 110. However, the application software module 402 and the security software module 408 are not assumed to execute in a secure operating environment.

The security hardware interface software 704 provides a standard input/output interface (e.g. a USB interface) between the computing device 102 and the security device 110. Furthermore, the computing device uses a standard clock/calendar (i.e. common to most all computing devices) that allows the application software module 402 to accurately determine the date and time for interactions between the computing device 102 and the security device 110.

Figure 7B:
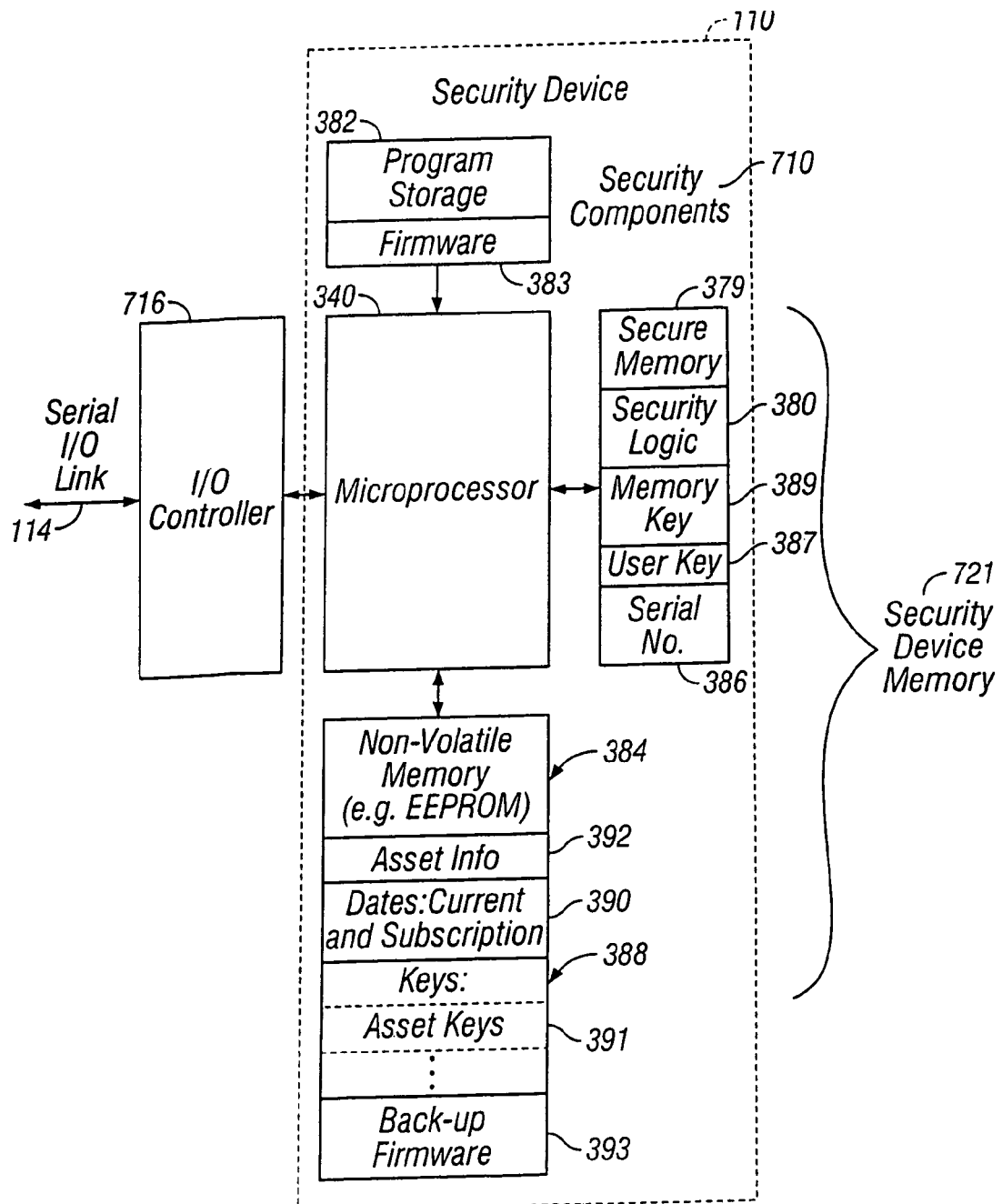
FIG. 7b illustrates the pertinent security components of the security device used in the security system, according to one embodiment of the present invention.

Looking particularly at the security device 110 and referring now to FIG. 7b, FIG. 7b illustrates the pertinent security components 710 of the security device 110 according to one embodiment of the present invention. As shown in FIG. 7b, the security device 110 includes a microprocessor 340, a secure memory 379 having security logic 380, program storage 382 to store security firmware 383, and nonvolatile memory 384 (e.g. EEPROM). Also, an I/O controller 716 controls the flow of digital data to and from the computing device 102 along serial I/O link 114. In one example, the serial I/O controller 716 can be a USB controller and the serial I/O link 114 can be a USB link. The digital data controlled by the serial I/O controller 716 can include keys, asset information and other data, as will be discussed.

Generally, the security firmware 383 when executed by the microprocessor 340 in conjunction with the secure memory 379 and the nonvolatile memory 384, provide for secure operations that allow the server 104 to uniquely identify the security device 110 and allow the computing device 102 in conjunction with the security device 110 to decrypt assets specifically encrypted for use by a computing device 102 coupled to the authorized computing device 102. The secure memory 379 includes both read-only memory (ROM) and writeable memory, which can be locked and unlocked for reading and writing using the hardware implemented security logic 380.

As previously discussed, a unique identifier, such as user key 387, associated with serial number 386 of the security device 110 is used by the security logic 380 to authenticate the security device 110 to the server 104. Also, a memory key 389 is used by the security logic 380 to initially unlock the secure memory 379. The serial number 386, user key 387, and memory key 389 are sealed in the secure memory 379 during manufacturing and thereafter can no longer be written over once the secure memory 379 is sealed. The serial number 386, user key 387, and memory key 389 are also stored at the server's user information database 109 so that the server 104 can initially generate a challenge and response to uniquely authenticate the security device 110 and open and lock the secure memory 379 and the nonvolatile memory 384, as will be discussed in more detail later.

The nonvolatile memory 384 is used as an extension to the secure memory 379. The firmware 383 prevents access to the nonvolatile memory 384 unless the secure memory 379 has also been unlocked. The nonvolatile memory 384 has hardware write protection, which is controlled by the firmware 383. The nonvolatile memory 384 stores keys 388 such as asset encryption keys (e.g. audio file keys) associated with particular purchased assets (e.g. audio files), the current date and subscription dates for certain assets 390, and asset information (e.g. information about assets) 392. It should be appreciated that the serial number 386, the user key 387, the memory key 389, keys 388, the dates 390, the asset information 392 and even the firmware 383 can instead be located or co-located at any of the security device memories: program storage 382, secure memory 379, or nonvolatile memory 384; this particular arrangement being only one embodiment.

Moreover, as will be discussed, the security software of the server 104, computing device 102, and the firmware of the security device 110, include standard encryption and decryption routines to encrypt and decrypt assets, keys, dates and other data sent between these devices. Any suitable block mode cipher that utilizes pseudo-random generators to XOR pseudo-random numbers with data can be used. Some examples include Data Encryption Standard (DES), International Date Encryption Algorithm (IDEA), etc.

Various security functions implemented by the combination of the server 104, computing device 102, and security device 110, will now be discussed with reference to the flowcharts of FIGS. 8a–8i.

One of the security functions to be performed is that the server 104 uniquely identifies a security device 110 to ensure that the computing device 102 coupled to security device 110 is authorized to access the server 104 and its many functions (e.g. in one embodiment, the GUITARPORT Website). Further, the server 104 determines the authenticity of the security device 110 to prevent unauthorized access to the server 104 and its assets (e.g. audio files). This is done when a user initially tries to log on to the server 104 and can be performed periodically thereafter. This authentication process includes the server 104 issuing a coded challenge to the security device via a scripting language performed by the security software module 422 of the server 104. The firmware 383 of the security device 110 executes a program to generate a response. An authorized security device 110 will return a unique response, which the server 104 utilizing the security software module 422 will validate. If the response is valid for the specific security device 110, the session is continued. If the response is not valid, the session is terminated.

Figure 8A:
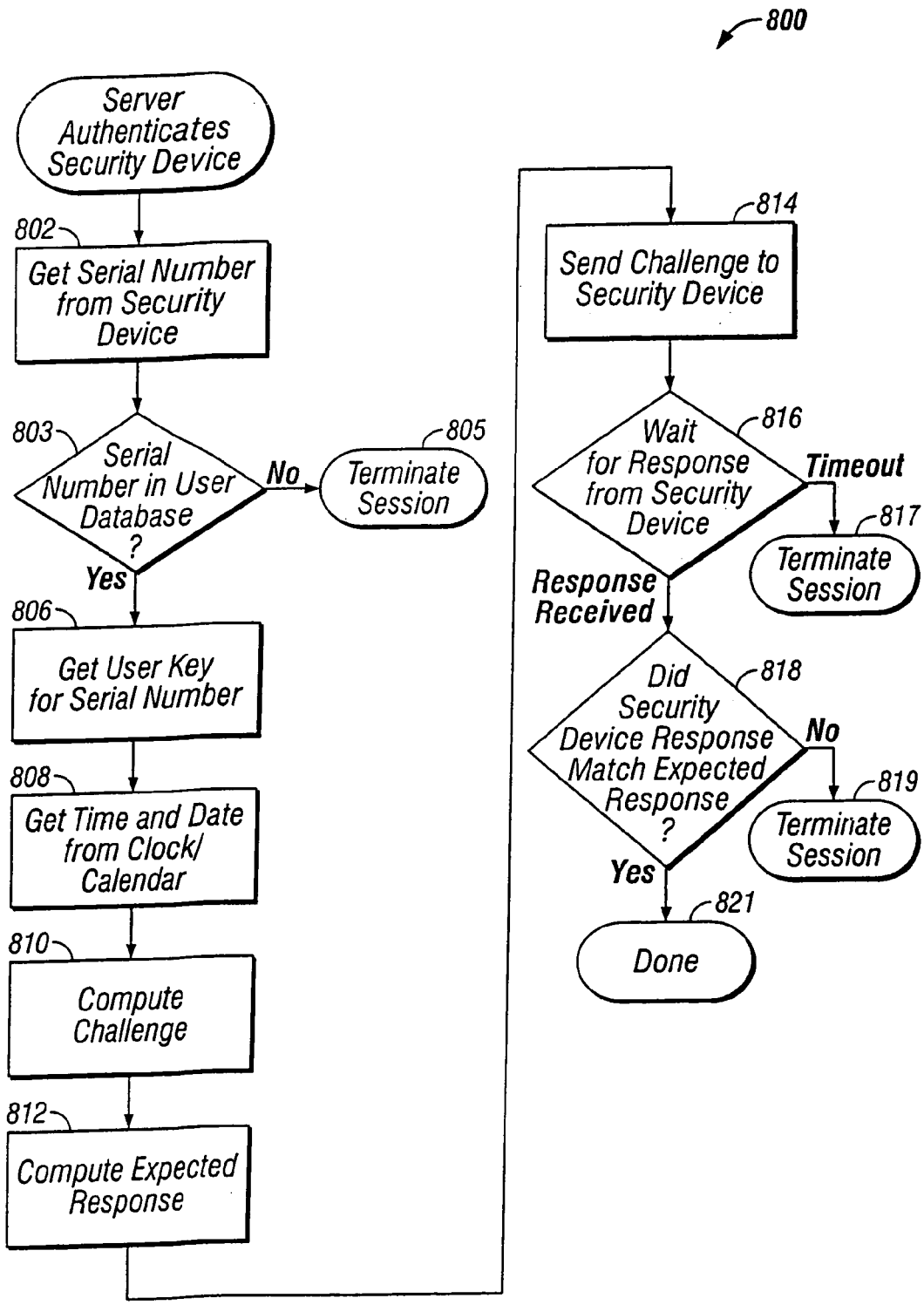
FIG. 8a is a flow diagram illustrating a process for the server to authenticate the security device, according to one embodiment of the present invention.

Turning to FIG. 8a, FIG. 8a is a flow diagram illustrating a process 800 for the server 104 to authenticate the security device 110, according to one embodiment of the present invention. These process steps 800 are generally implemented by the security software module 422 of the server 104 in conjunction with the other software modules at the server. First, the server 104 requests a unique identifier, such as the Serial No. 386, stored in the secure memory 379 of the security device 110 from the security device 110 (block 802). In response to the received Serial No., at block 803, the server determines whether the Serial No. is in the user information database 109. If not, the session is terminated (block 805). However, if the Serial No. is in the user information database 109, then the server 104 obtains the user key for the Serial No. from the user information database 109 (block 806). As previously discussed, the user information database 109 stores a unique user key for each Serial No. associated with each security device 110. The server 104 also obtains a time and date from the clock/calendar of the server 104, which will be used later to see if the subscription is expired (block 808).

Next, the server 104 computes a challenge (block 810) and the expected response from the security device 110 (block 812). The challenge/response sequence is basically a request for the security device 110 to accurately identify itself to the server by sending an appropriate response. In one embodiment, the challenge is a random or pseudo-random number generated by the server 104 and can be based on the current time and date (e.g. as a seed value). The expected response is created at the server 104 by performing a mathematical transformation on the user key 387 associated with the security device 110 and the challenge. Both the server 104 and the security device 110 utilize the same mathematical transformation and have the same user key 387 such that the response generated at the security device 110 should be the same as the expected response created at the server 104 (assuming it actually is the security device associated with the serial number for the user). In one embodiment, the common mathematical transformation of the server 104 and security device 110 can be any suitable one-way hashing function.

The challenge is then sent from the server 104 to the security device 110 (block 814). The server 104 then waits for the response from the security device 110 (block 816). If a predefined period of time passes, the process 800 is timed out, and the session is terminated (block 817). However, if a response is received within the predefined period of time, the server 104 determines whether the response from the security device 110 matches the expected response (block 818). If not, the session is terminated (block 819). If so, the user is allowed to log on to the server 104 and the process 800 is complete (block 821). For example, the use can access the GUITARPORT Web-site, previously discussed.

Figure 8B:
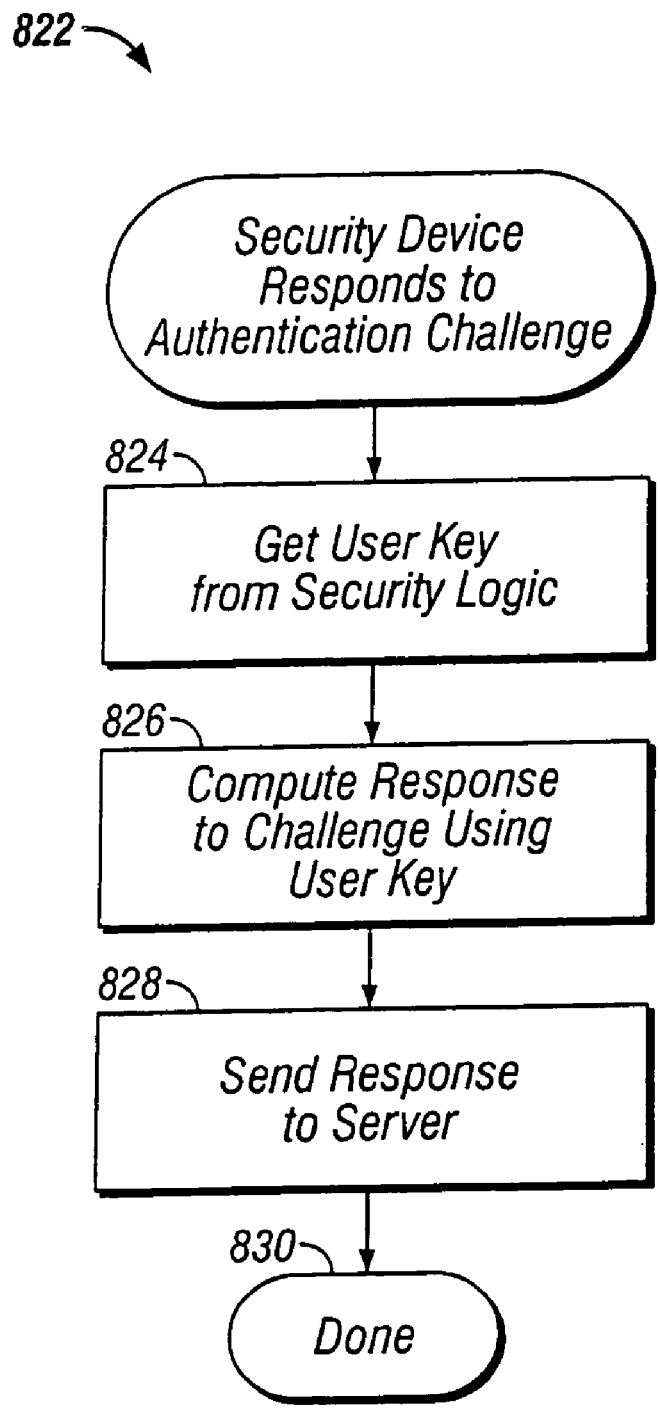
FIG. 8b is a flow diagram illustrating a process for the security device to respond to an authentication challenge from the server, according to one embodiment of the present invention.

Referring now to FIG. 8*b*, FIG. 8*b* is a flow diagram illustrating a process 822 for the security device 110 to respond to the authentication challenge from the server 104, according to one embodiment of the present invention. These process steps 822 are generally implemented under the control of the firmware 383 of the security device 110. First, the user key 389 is obtained from the secure memory 379 (block 824). Next, at block 826, the response to the challenge is computed. As previously described, the response is typically a mathematical transformation (e.g. a one-way hashing function), common to both the server 104 and security device 110, of the user key 389 (again, common to both the server 104 and security device 110) and the challenge. The response to the challenge is then sent to the server 104 (block 828). The process 822 is then complete (block 830).

Other security functions implemented by the combination of the server 104, computing device 102, and security device 110, relate to updating the current date and the subscription expiration date stored at the security device 110. The current date and the subscription expiration date 390 are stored in nonvolatile memory 384 of the security device 110. The server 104 updates both the subscription expiration date and the current date 390 in the security device 110. However, the application software module 402 of the computing device 102 also updates the current date 390 when the server 104 is not connected. Because the application software module 402 is not considered secure, the server 104 updates the subscription expiration date and the current date 390, when it is connected, to maintain security.

Figure 8C:
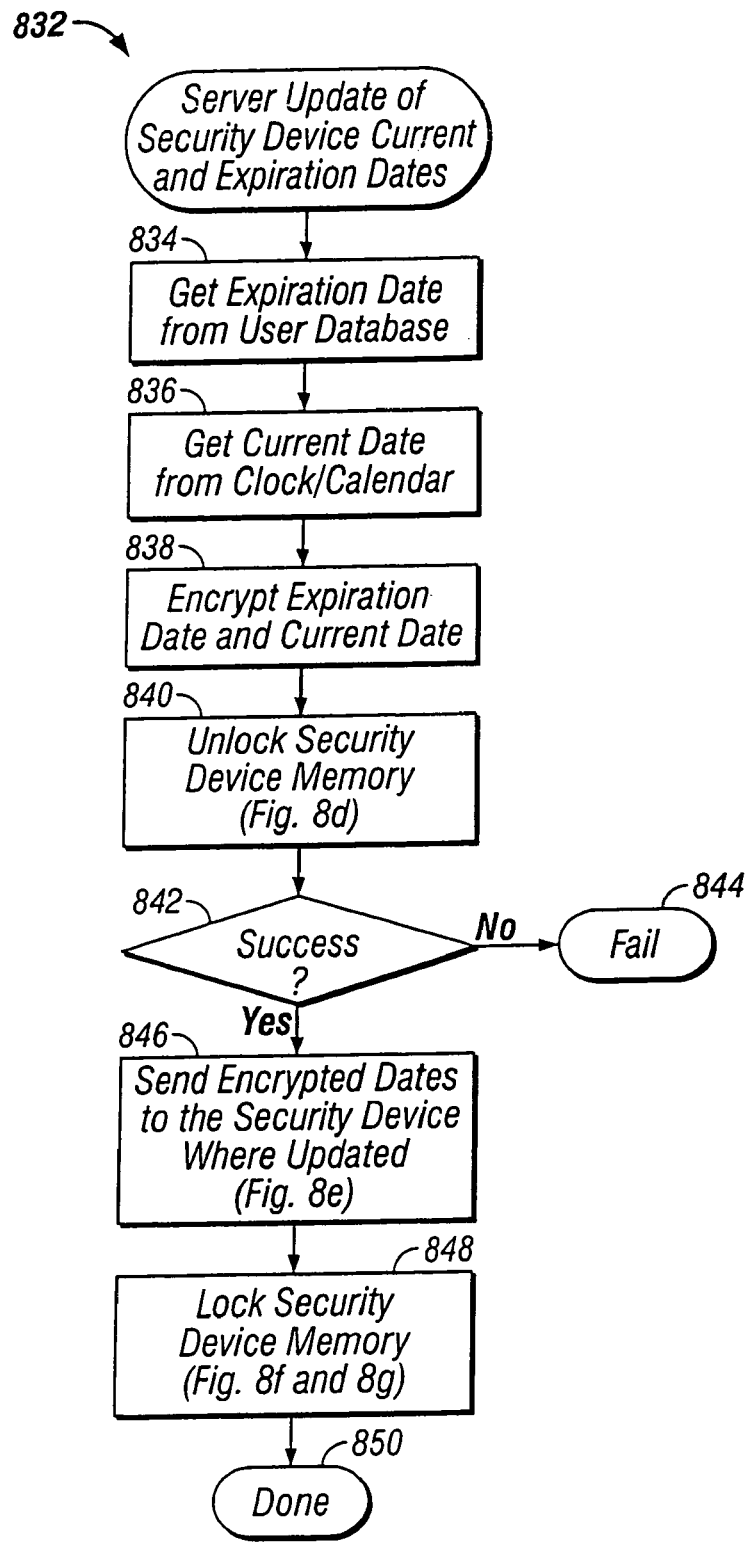
FIG. 8c is a flow diagram illustrating a process for the server to update the security device with the current date and the subscription expiration date, according to one embodiment of the present invention.
Figure 8D:
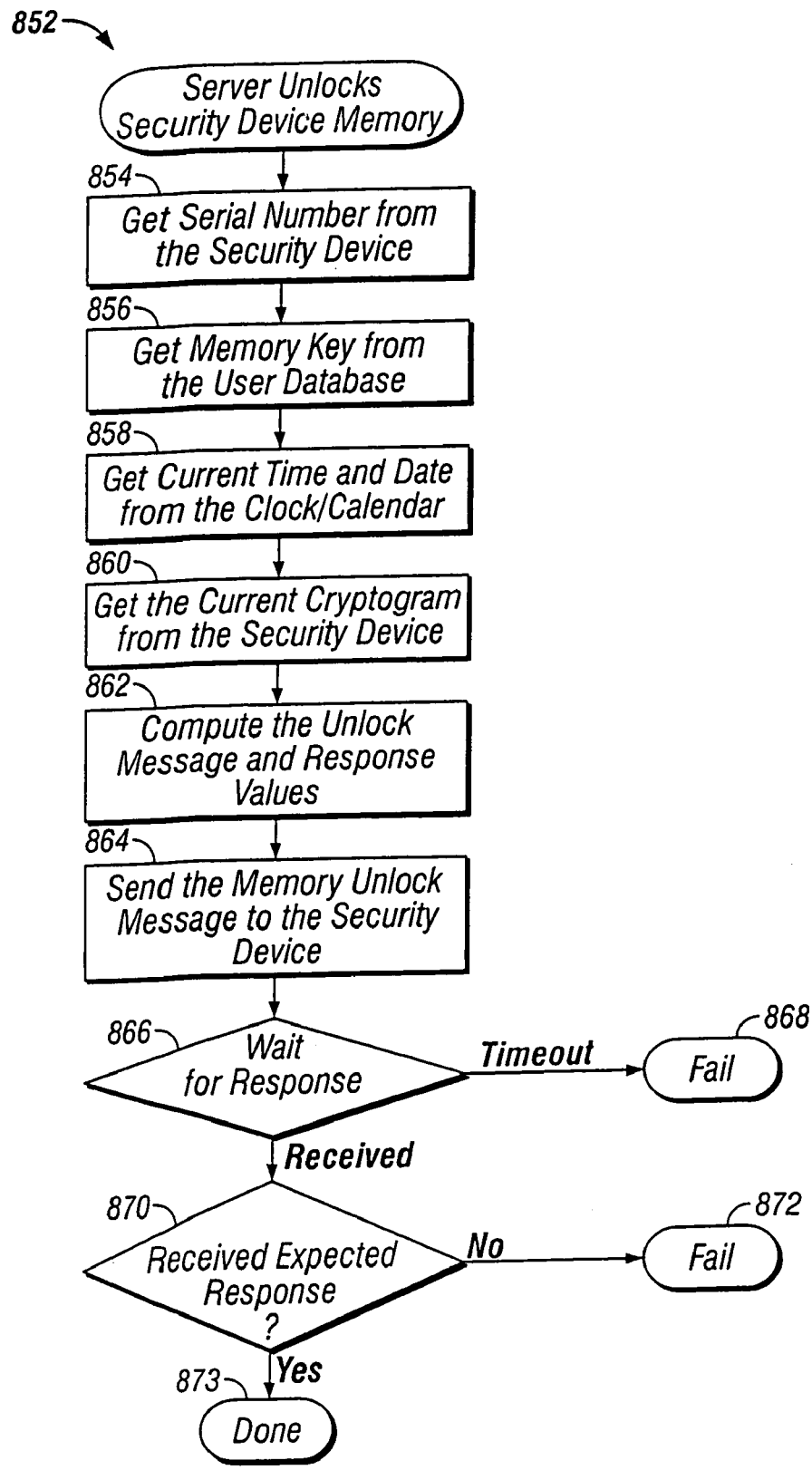
FIG. 8d is a flow diagram illustrating a process for the server to unlock the security device memory of the security device, according to one embodiment of the present invention.

Turning to FIG. 8*c*, FIG. 8*c* is a flow diagram illustrating a process 832 for the server 104 to update the security device 110 with the current date and the subscription expiration date, according to one embodiment of the present invention. These process steps 832 are generally implemented by the security software module 422 of the server 104 in conjunction with the other software modules at the server 104. First, the subscription expiration date from the user information database 109 is obtained for the user (block 834). Next, the current date from the clock/calendar of the server 104 is obtained (block 836). The subscription expiration date and the current date are then encrypted (block 838). Further, the server 104 sends a command to the security device 110 to unlock the security device memory 721 including the nonvolatile memory 384 (block 840). FIG. 8*d*, as will be discussed, describes the process of unlocking the security device memory 721. Based on a response from the security device 110 as to whether the security device memory 721 has been successfully unlocked, the server 104 determines whether the unlock operation was successful or not (block 842). If the security device memory 721 was not successfully unlocked, the process 832 fails (block 844).

Figure 8E:
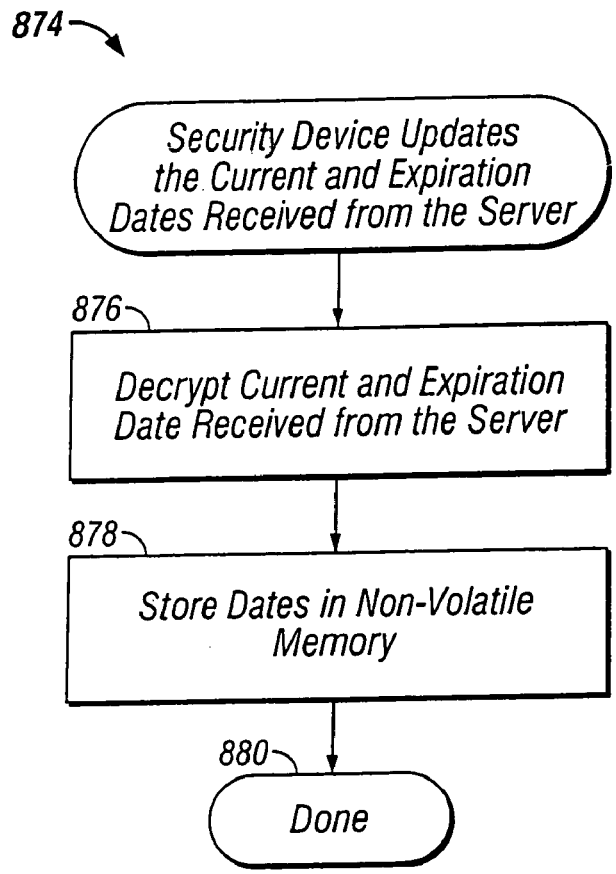
FIG. 8e is a flow diagram illustrating a process for the security device to update the current and subscription expiration dates received from the server, according to one embodiment of the present invention.
Figure 8F:
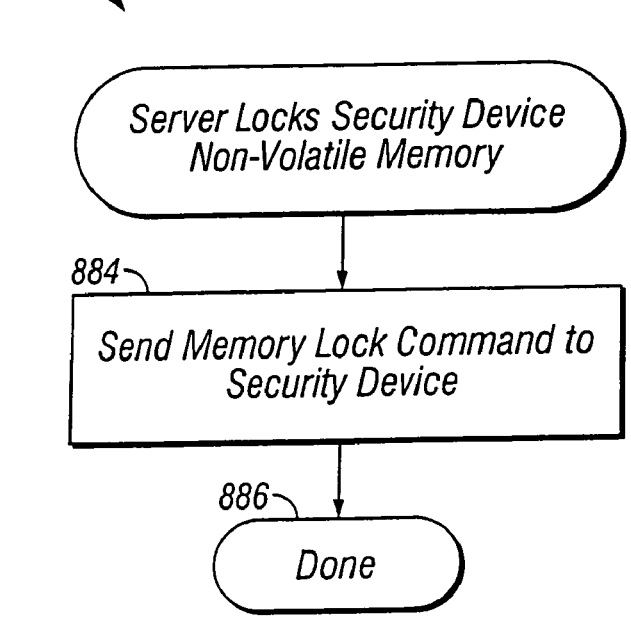
FIG. 8f is a flow diagram illustrating a process for the server to lock the nonvolatile memory of the security device memory of the security device, according to one embodiment of the present invention.
Figure 8G:
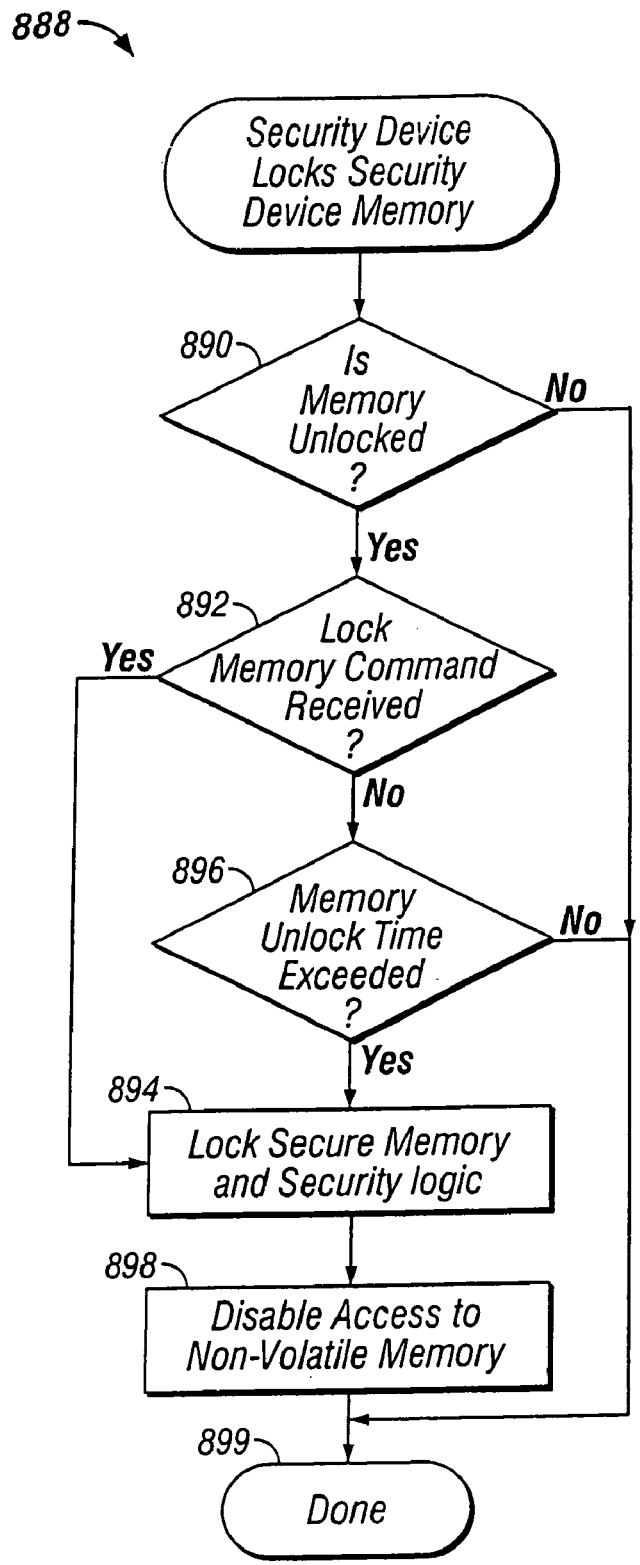
FIG. 8g is a flow diagram illustrating a process for the security device to lock the security device memory, according to one embodiment of the present invention.

However, if the security device memory 721 was successfully unlocked, then the server 104 sends the encrypted subscription expiration date and the current date to the security device 110 where the security device 110 updates the dates (block 846). FIG. 8*e*, as will be discussed, describes the process of the security device 110 updating the dates. The server then sends a command to the security device to lock the security device memory 721 (block 848). FIGS. 8*f* and 8*g*, as will be discussed, describe the process of locking the security device memory 721. The process 832 is then complete (block 850).

Referring to FIG. 8*d*, FIG. 8*d* is a flow diagram illustrating a process 852 for the server 104 to unlock the security device memory 721 of the security device 110, according to one embodiment of the present invention. At block 854 the server 104 obtains the Serial No. 386 from the security device 110. Next, at block 856 the server obtains the memory key 389 associated with the Serial No. for the user from the user information database 109. The server 104 then obtains the current time and date from the clock/calendar of the server 104 (block 858). The server then obtains the current cryptogram from the security device 110 (block 860). The current cryptogram is a random number generated by the security device 110 each time the security device 110 is authenticated by the server 104.

The server 104 next computes an unlock message to unlock the security device memory 721 and an appropriate expected response value from the security device 110 (block 862). Then, the server 104 sends the memory unlock message to the security device 110 (block 864).

If the unlock message is valid, i.e. decipherable by the security device 110 to properly command the security device 110 to unlock its security device memory 371 (such that both the security device and the server must be authorized participants), the security device 110 will send the expected response back to the server 104. The server 104 requires an appropriate expected response back from the security device 110 to verify that it is the authorized security device 110 and that the security device memory 371 has therefore been unlocked. Conversely, the security device 110, based on the unlock message, can verify that the server 104 is authorized to command the security device to unlock its security device memory 371. The symmetrical expected response generated at the server 104 and the response generated at the security device 110, utilizing the memory key 389 and the cryptogram, in one embodiment, can be based upon a proprietary anti-wire tapping algorithm created and licensed by the ELVA Corporation. However, any suitable zero-knowledge proof algorithm for accurately authenticating two parties can be used. Furthermore, in one embodiment, the security logic 380 that implements the ELVA anti-wire tapping algorithm may be a cryptography device produced by the ATMEL Corporation.

Continuing with the present example, the server 104 waits for an appropriate response from the security device 110 for a predefined period of time (block 866). If the security device 110 does not respond with a predefined period of time then the process 852 fails (block 868). If the server 104 receives a response from the security device 110 in time, then at block 870, the server 104 determines whether it has received the expected response from the security device 110. If not, the process 852 fails (block 872). If the server 104 receives the expected response from the security device 110, then the server 104 knows that the security device memory 721 of the security device 110 has been unlocked. Accordingly, as will be discussed with reference to FIG. 8e, the memory is unlocked such that the security device can update the current and subscription expiration dates received from the server 104. The process 852 is then complete (block 873). Moreover, it should be appreciated that the security device memory 721 can be unlocked to perform many other functions, for example, to store asset information 392, asset keys 391, etc., as will be discussed.

Referring to FIG. 8e, FIG. 8e is a flow diagram illustrating a process 874 for the security device 110 to update the current and subscription expiration dates received from the server 104, according to one embodiment of the present invention. Again, the security device operates under the control of the firmware 383 to implement its functions. At block 876 the security device 110 decrypts the current date and the subscription expiration date received from the server 104. Next, at block 878, the security device 110 stores the current date and the subscription expiration date 390 in nonvolatile memory 384. The process 874 is then complete (block 880).

Referring to FIG. 8f, FIG. 8f is a flow diagram illustrating a process 882 for the server 104 to lock the nonvolatile memory 384 of the security device memory 721 of the security device 110, according to one embodiment of the present invention. In order to accomplish this, the server 104 merely sends a memory lock command to the security device 110 (block 884). The process 882 is then complete (block 886).

After the server 104 sends a memory lock command to lock the nonvolatile memory 384, the security device 110 can lock the secure memory 379. Turning now to FIG. 8g, FIG. 8g is a flow diagram illustrating a process 888 for the security device 110 to lock the secure memory 379, according to one embodiment of the present invention. At block 890, the security device 110 determines whether the secure memory 379 is unlocked. If not, indicating that the secure memory 379 is already locked, the process 888 is complete (block 899). If the secure memory 379 is unlocked, the security device 110 checks to see whether the lock memory command has already been received (block 892). If so, the security device 110 locks the secure memory 379 and the security logic 380 (block 894) and disables access to the nonvolatile memory 384 (block 898). The process 888 is then complete (block 899).

However, if the lock memory command has not been received at block 892 then the security device 110 checks to see whether the memory unlock time has been exceeded. If not, the process 888 is complete and the security device 110 can lock the security device memory 721 later (block 899). On the other hand, if the memory unlock time has been exceeded, then the security device 110 locks the secure memory 379 and the security logic 380 (block 894) and disables access to the nonvolatile memory 384 (block 898) such that the process 888 is then complete (block 899). Accordingly, once the secure memory 379 is locked, as well as, the nonvolatile memory 384, the whole security device memory 721 is locked. Thus, after the security device memory 721 has been unlocked to update the current and subscription expiration dates, to store asset information 392, asset keys 391, etc., it can be locked again.

As previously discussed, the application software module 402 and the security software module 408 of the computing device 102 can be used to update the current date and time in the security device 110. However, this is not secure, and these dates and times are always scrutinized against the dates and times received from the server 104 as previously discussed.

Figure 8H:
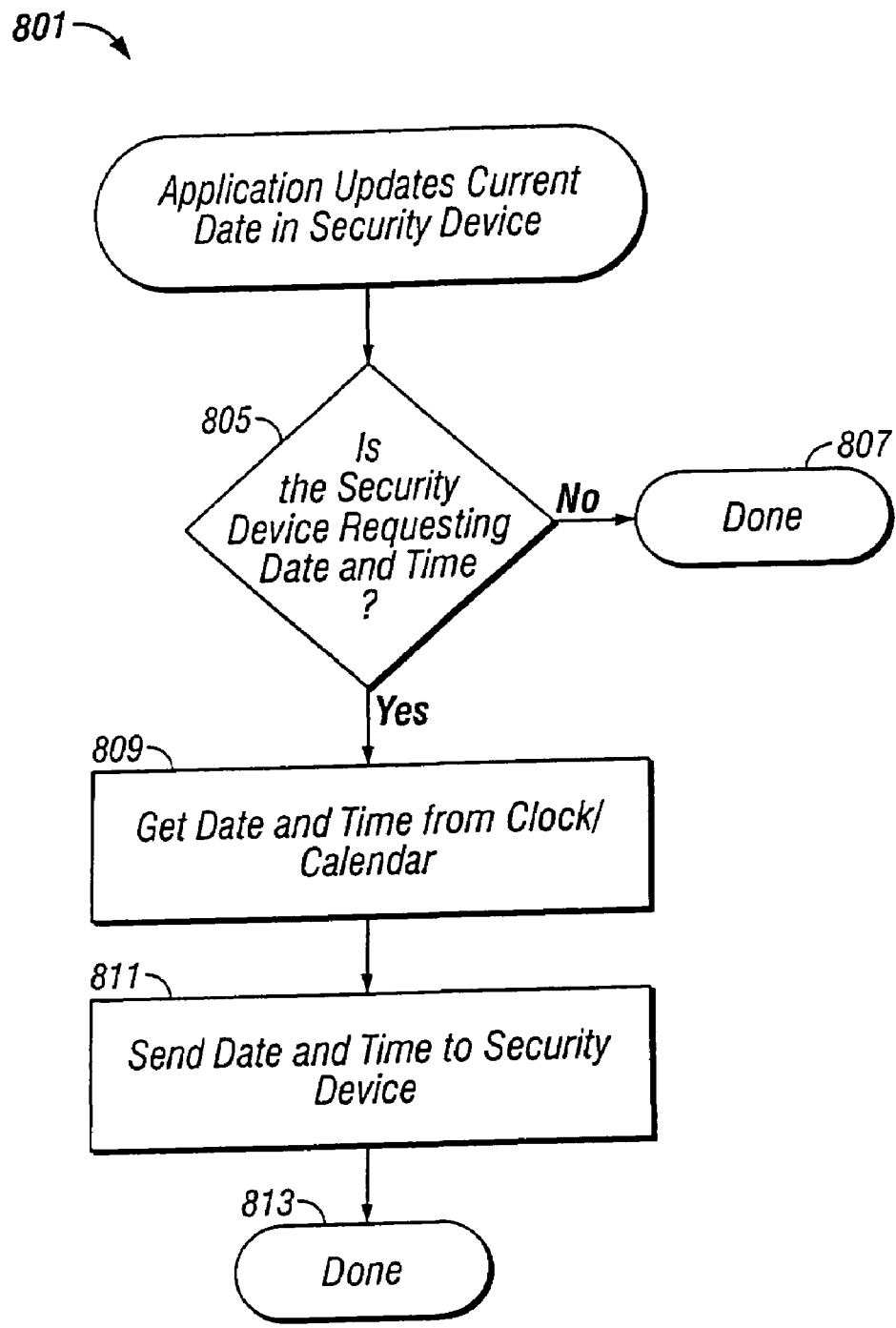
FIG. 8h is a flow diagram illustrating a process for the computing device to update the current date at the security device, according to one embodiment of the present invention.

Referring now to FIG. 8h, FIG. 8 is a flow diagram illustrating a process 801 for the application software module 402 of the computing device 102, in conjunction with the other software modules, to update the current date at the security device 110, according to one embodiment of the present invention. At block 805 the computing device 102 determines whether the security device 110 is requesting the date and time. If not, the process 801 is complete (block 807). However, if the security device 110 is requesting the date and time, then the computing device 102 obtains the date and time from the clock/calendar of the computing device 102 (block 809). The computing device 102 then sends the date and time to the security device 110 (block 811). The process 801 is then complete (block 813).

Figure 8I:
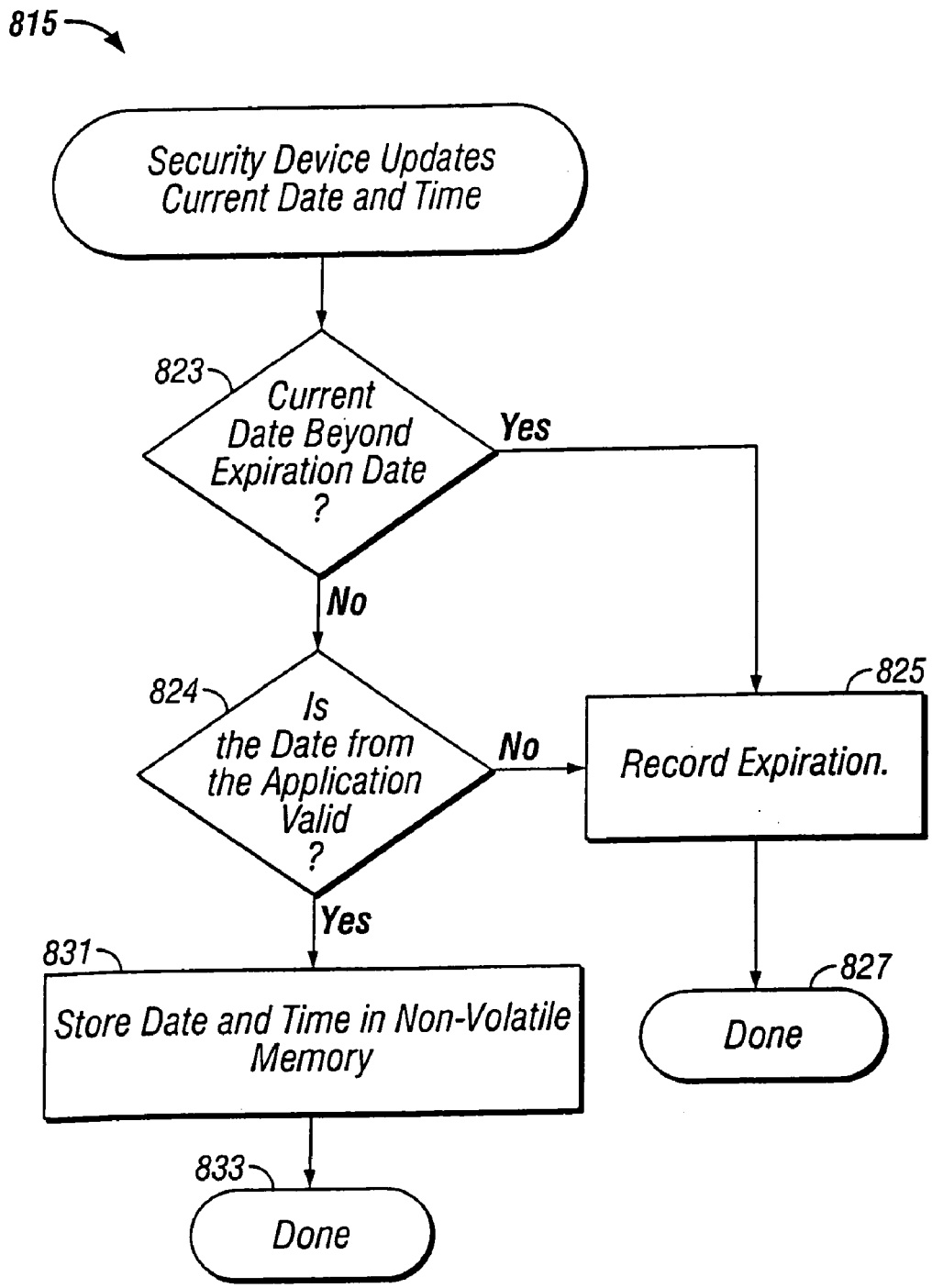
FIG. 8i is a flow diagram illustrating a process for the security device to update the current date and time received from the computing device, according to one embodiment of the present invention.

Turning now to FIG. 8i, FIG. 8i is a flow diagram illustrating a process 815 for the security device 110 to update the current date and time received from the computing device 102, according to one embodiment of the present invention. At block 823, the security device 110 determines whether the current date received is beyond the subscription expiration date. If so, the security device 110 records the expiration of the subscription (e.g. in nonvolatile memory 384) (block 825). The process 815 is then complete (block 827). The security device 110 may then instruct the computing device 102 to display to the user that his or subscription has expired and the server 104 will direct the user to update the subscription upon the next connection.

On the other hand, if the current date is not beyond the subscription expiration date, the security device 110 will check to see that the date received from the application software module 402 of the computing device 102 is valid as compared to the trusted date and time received from the server 104 from the last update (block 829). If not, the security device 110 will then assume there has been a breach of security and will record the expiration of the subscription (block 825). The process 815 is then complete (block 827). Again, the security device 110 may then instruct the computing device 102 to display to the user that his or subscription has expired and the server 104 will direct the user to update the subscription upon the next connection. However, if the date from the application software module 402 of the computing device 102 is determined to be valid by the security device 110 then the security device will then store the date and time 390 in the nonvolatile memory 384 (block 831). The process 815 is then complete (block 833).

Another security service 706, performed by the security device 110 in conjunction with the server 104, is to ensure that digital assets (e.g. audio files) are properly encrypted and decrypted such that only a computing device 102 coupled to properly authorized security device 110 can receive and utilize the assets. As previously discussed, the asset database 107 contains assets (e.g. multimedia presentations associated with musical pieces, audio files (e.g., as previously discussed Jamtracks including full songs and songs with various instrumental tracks removed), as well as other digital data assets). Moreover the asset database 107 includes unique asset encryption keys for each asset (e.g. for each audio file). Further, it should be appreciated that the asset database 107 can include any other type of digital data asset (e.g. multimedia data, video data, voice data, software, other generic forms of data, etc.) that can be purchased or rented and downloaded to a computing device 102 coupled to an authorized security device 110 over a computer network 105. Thus, the term "asset" as it will be used hereinafter specifically includes audio files (e.g. such as the Jamtracks previously discussed with reference to the GUITARPORT Web-site) but further includes any other sort of digital asset.

Embodiment of the present invention further provides a secure asset delivery system. Assets are encrypted by the security system 700 (referring also to FIG. 7a again) to protect against unauthorized duplication of licensed material. Each asset is stored in the asset database 107 of the server 104 and is encrypted with a different, unique asset key particularly for that asset. Each asset is uniquely encrypted utilizing the security software module 422 of the server 104, in conjunction with the other software modules. As each encrypted asset is streamed to the requesting computing device 102, the encrypted asset is stored in the asset storage 712 of the computing device 102. Further, the asset key for the asset is encrypted using the user key of the associated security device 100 of the requesting computing device 102, and the encrypted asset key is also streamed to the requesting computing device 102, where it is stored in the asset storage 712 of the computing device 102. As previously discussed each user key 389 is unique to each user's security device 110 and each user key 389 is stored at both the security device 110 and at the user information database 109 at the server 104.

When it is time to access the asset at the computing device 102, for example, the user wants to play a downloaded audio file asset (e.g. as part of a multimedia presentation for a Jamtrack to facilitate learning of the guitar), the security software module 408 in conjunction with the application software module 402 and the other software modules of the computing device 102, sends the encrypted asset key to the security device 110 to be decrypted. The decrypted asset key is then sent back from the security device 110 to the computing device 110 where it is used by the computing device 102, operating again with the security software module 408 in conjunction with the application software module 402 and the other software modules, to decrypt the asset (e.g. an audio file) into memory. The decrypted asset can then be utilized. For example, a decrypted audio file can be decompressed for playback.

Figure 9:
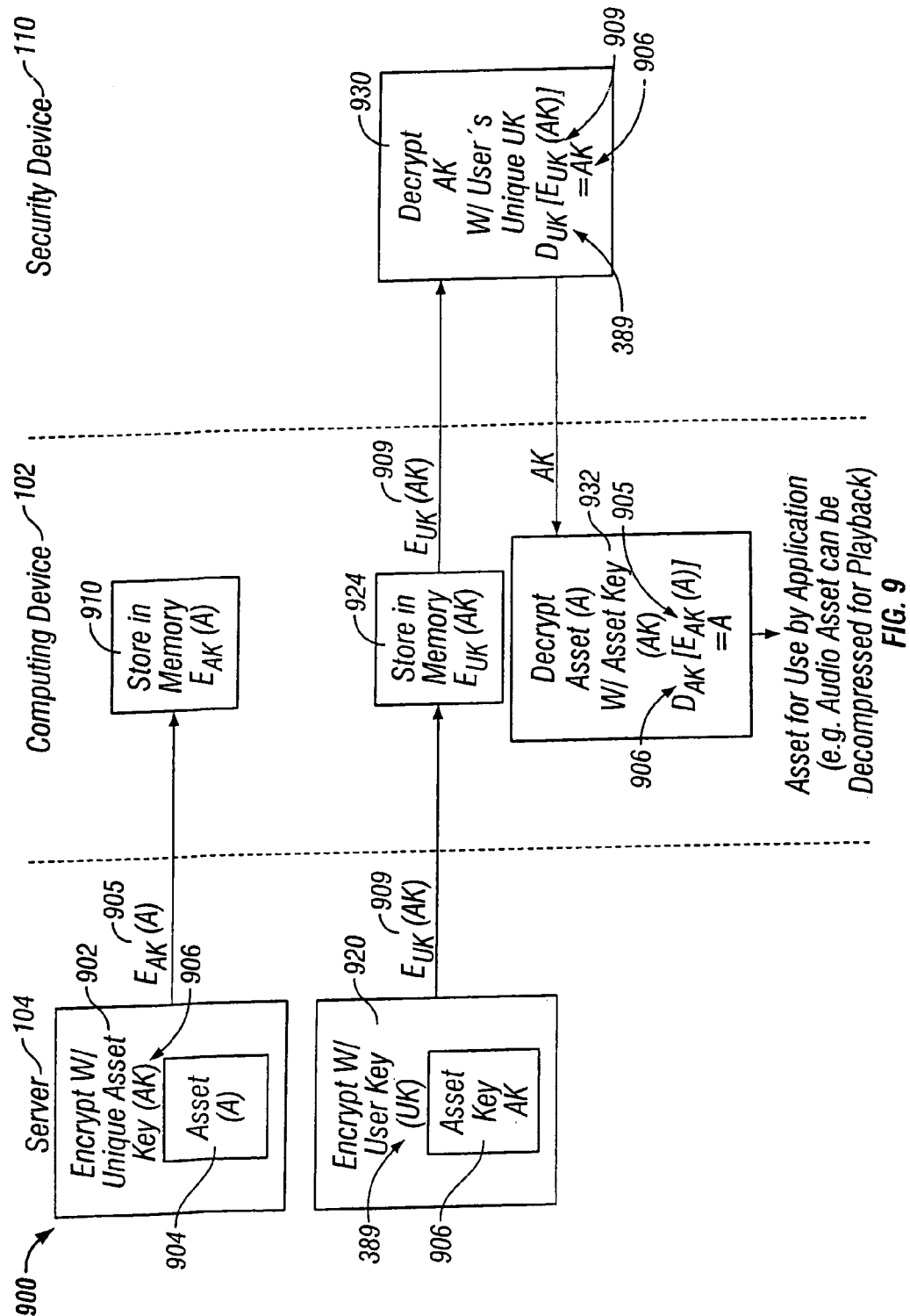
FIG. 9 illustrates an example of a secure asset delivery system, according to one embodiment of the present invention.

Referring now to FIG. 9, FIG. 9 illustrates an example of a secure asset delivery system 900, as previously described, according to one embodiment of the present invention. At block 902, an asset (A) 904 is encrypted with an asset key (AK) 906. The encrypted asset 905 (e.g. ($E_{AK}(A)$)) is then sent to the computing device 102 where it is stored in memory (e.g. asset storage 712) (block 910). Also, at block 920 the asset key (AK) 906 is encrypted with the user's user key (UK) 389. The encrypted asset key 909 (e.g. ($E_{UK}(AK)$)) is then sent to the computing device 102 where it is stored in memory (block 924). At block 930, the security device 110 decrypts the encrypted asset key 909 with the user's unique user key (UK) 389 (e.g. $D_{UK}[E_{UK}(AK)]$) to yield the asset key 906 (AK), which is then forwarded onto the computing device 102. Then, at block 932, the computing device 102 can decrypt the encrypted asset 905 with the asset key (AK) 906 (e.g. $D_{AK}[E_{AK}(A)]$) to yield the asset (A). The asset can then be utilized by the application software module 402 of the computing device 102. For example, if the asset is an audio file, the audio file can be decompressed for playback as part of a multimedia presentation of a Jamtrack to facilitate learning of guitar. It should be appreciated that encryption and decryption algorithms are well known in the art, and that various types of encryption and decryption algorithms can be used by the server 104, the computing device 102, and the security device 110.

The security software of the server 104, computing device 102, and the firmware of the security device 110, include standard encryption and decryption routines to encrypt and decrypt assets, keys, dates and other data sent between these devices. Any suitable block mode cipher that utilizes pseudo-random generators to XOR pseudo-random numbers with data can be used. Some examples include Data Encryption Standard (DES), International Date Encryption Algorithm (IDEA), etc.

A more detailed embodiment of the secure asset delivery system 900, according to one embodiment of the present invention, will now be discussed. As previously discussed, the server 104 encrypts each asset sent to a user with a unique asset key. Moreover, the server 104 also sends an indication as to whether the asset is to be rented or owned by the user. Assets that are rented expire when the user's subscription expires and cannot be used after the subscription. Assets that are owned by the user do not expire when the user's subscription expires. The server 104 further sends the unique asset key required to decrypt the asset to the user in an encrypted form—wherein the asset key is encrypted with the user key 389 of the security device 110 for the user such that the security device 110 can decrypt the encrypted asset key and the computing device 102 can then decrypt the asset with the decrypted asset key to provide the user access to the asset. Thus, an asset can be delivered securely to a specific user having a particular security device.

The computing device 102, operating with the application software module 402, the security software module 408 and in conjunction with the other software modules, performs many functions related to decrypting and accessing the asset, as has been previously discussed. The computing device 102 receives and stores the encrypted asset and the encrypted asset key in local memory (e.g. asset storage 712). The computing device 102 sends the encrypted asset key (and an indication of whether the asset is rented our owned) to the security device 110. The security device 110, under control of the firmware 383, decrypts the asset key and determines whether the asset has expired due to a lapsed subscription. If the asset has not expired, the security device 110 sends the decrypted asset key to the computing device 102 so that the asset can be decrypted by the computing device and can then be utilized. As previously discussed, the computing device 102 decrypts the asset with the asset key to yield the asset.

On the other hand, if the subscription has expired, the security device 110 notifies the computing device 102, and the computing device 102 notifies the user that the subscription has expired. Specific process steps will now be discussed to implement this functionality.

Figures 10A, 10B:
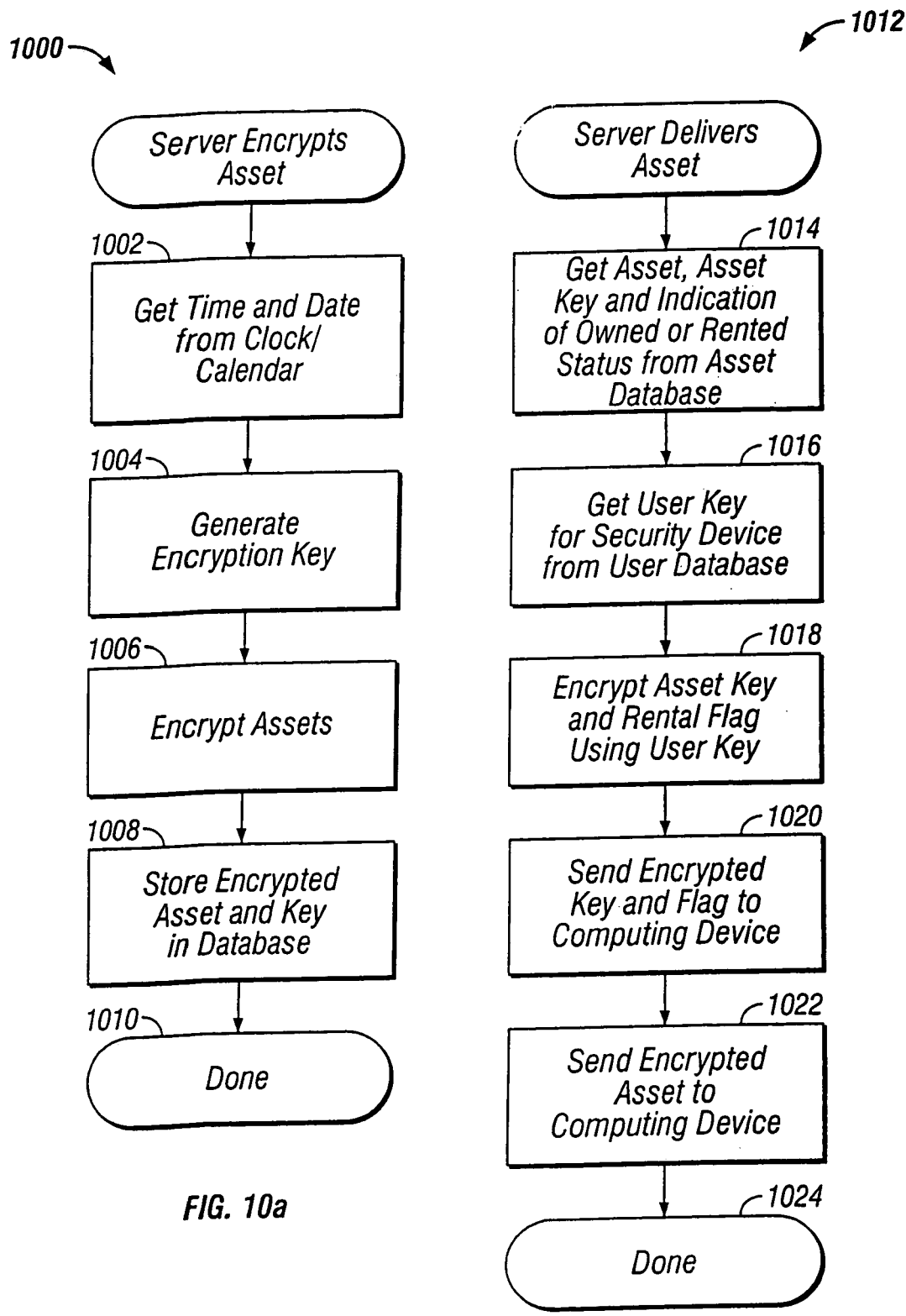
FIG. 10a is a flow diagram illustrating a process for the server to encrypt assets, according to one embodiment of the present invention.
FIG. 10b is a flow diagram illustrating a process for the server to deliver assets, according to one embodiment of the present invention.

Referring to FIG. 10a, FIG. 10a is a flow diagram illustrating a process 1000 for the server 104 to encrypt assets, according to one embodiment of the present invention. The server 104 operates under the control of the application software module 416, the security software module 422 and in conjunction with the other software modules, to implement the functions of the processes, as will be discussed. At block 1002, the server 104 obtains the time and date from the clock/calendar of the server 104. Next, server 104 generates an encryption key (block 1004). The server 104 then encrypts the asset with a unique asset key (block 1006). The server 104 then stores the encrypted asset and the asset key in the asset database 107 (block 1008). The process 1000 is then complete (block 1010).

Referring now to FIG. 10b, FIG. 10b is a flow diagram illustrating a process 1012 for the server 104 to deliver the asset, according to one embodiment of the present invention. At block 1014, the server 104 obtains the asset, the asset key, and a status indication of whether the asset is owned or rented from the asset database 107. The status indication may be implemented as a rental flag—e.g. a rental flag that is set corresponds to the asset being rented by the user and a rental flag that is not set corresponds to the asset being owned or purchased by the user. Further, the server 104 obtains the user key 389 for the user (corresponding to the user's security device 110) from the user information database 109 (block 1016). Next, the server 104 encrypts the asset key and the rental flag utilizing the user's user key 389 (block 1018). The server 104 then sends the encrypted asset key and rental flag to the computing device 102 (block 1020). Further, the server 104 sends the encrypted asset to the computing device 102 (block 1022). The process 1012 is then complete (block 1024).

Figure 10C:
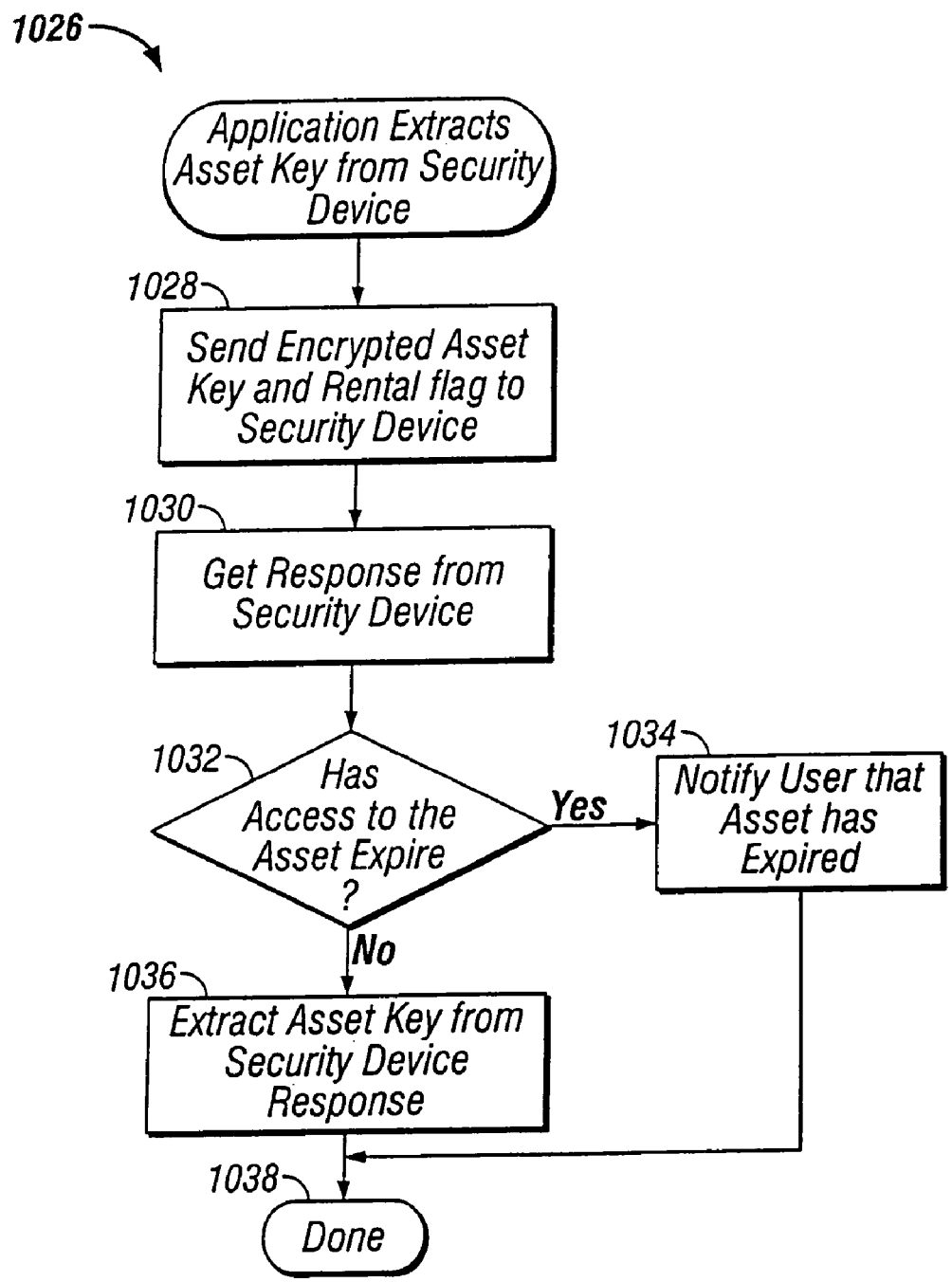
FIG. 10c is a flow diagram illustrating a process by which the computing device perform the functions of extracting an asset key from the security device, according to one embodiment of the present invention.

Turning now to FIG. 10c, FIG. 10c is a flow diagram illustrating a process 1026 by which the computing device 102 performs the functions of extracting the asset key from the security device 110, according to one embodiment of the present invention. The computing device 102 operates under the control of the application software module 402, the security software module 408 and in conjunction with the other software modules, to implement the functions of the processes, as will be discussed. At block 1028, the computing device 102 sends the encrypted asset key and rental flag received from the server 104 to the security device 110. Next, the computing device 102 obtains a response from the secure device 110 (block 1030). The response includes a notification as to whether the asset has expired, and if the asset has not expired, the decrypted asset key. The generation of the response at the security device 110 will be discussed later with reference to FIG. 10e.

At block 1032, the computing device 102 determines, based on the response from the security device 110, whether access to the asset has expired (block 1032). For example, if the asset is rented and the subscription has expired (i.e. the current date is passed the subscription expiration date for the asset), then access to the asset has expired. Thus, if access to the asset has expired, then at block 1034, the computing device 102 notifies the user that access to the asset has expired. If access to the asset has not expired (i.e. the asset is owned or the subscription expiration date has not passed), then the computing device extracts the asset key from the security device response (block 1036). The process 1026 is then complete (block 1038).

Figure 10D:
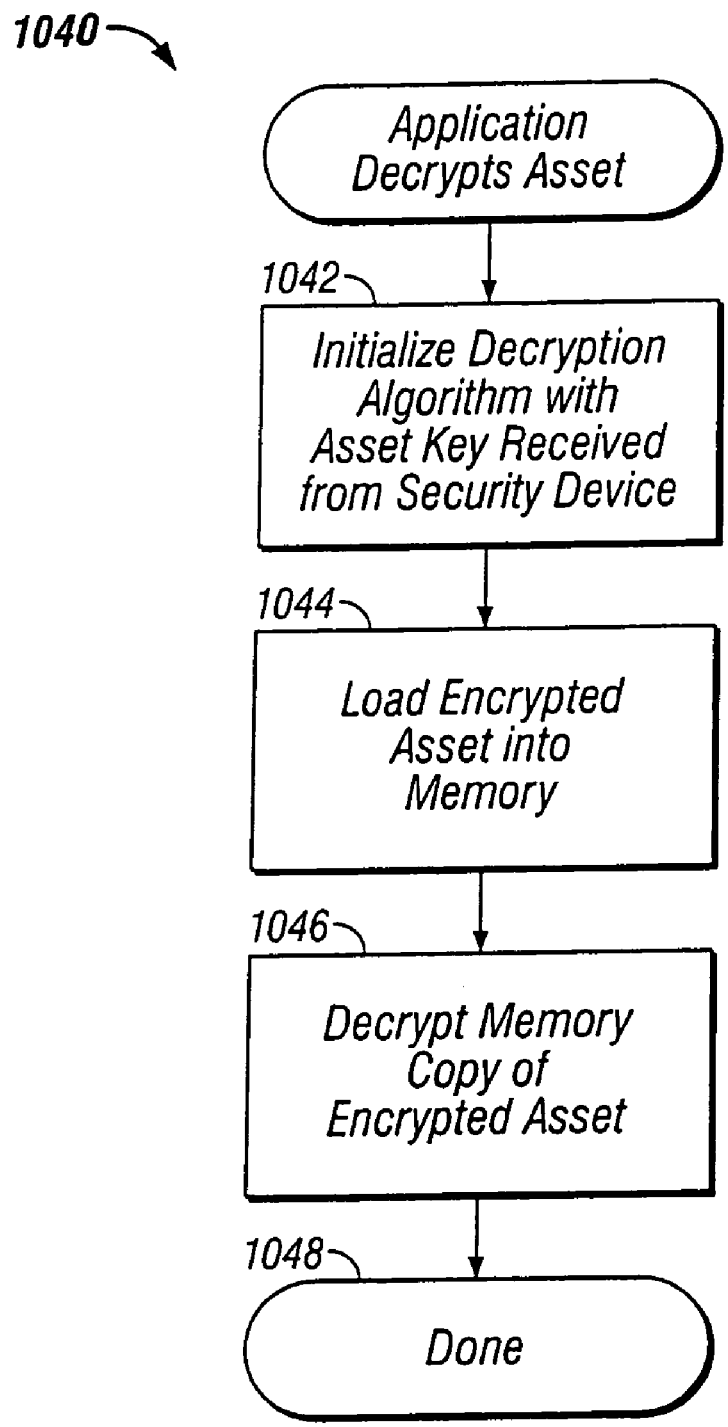
FIG. 10d is a flow diagram illustrating a process by which the computing device performs the functions of decrypting an asset, according to one embodiment of the present invention.

Referring now to FIG. 10d, FIG. 10d is a flow diagram illustrating a process 1040 by which the computing device 102 performs the functions of decrypting the asset, according to one embodiment of the present invention. At block 1042, the computing device 102 initializes a decryption algorithm with the asset key received from the security device 110. Next, the computing device 102 loads the encrypted asset into memory (block 1044). The computing device 102 then decrypts the memory copy of the encrypted asset utilizing the asset key received from the security device 110 to decrypt the encrypted asset (i.e. the encrypted asset being encrypted with the asset key) (block 1046). Thus, the asset is yielded to the computing device 102, for use by the computing device 102. The asset can then be utilized by applications of the computing device 102. For example, if the asset is an audio file, the audio file can be decompressed for playback as part of a multimedia presentation of a Jamtrack to facilitate the learning of guitar, as previously discussed.

Figure 10E:
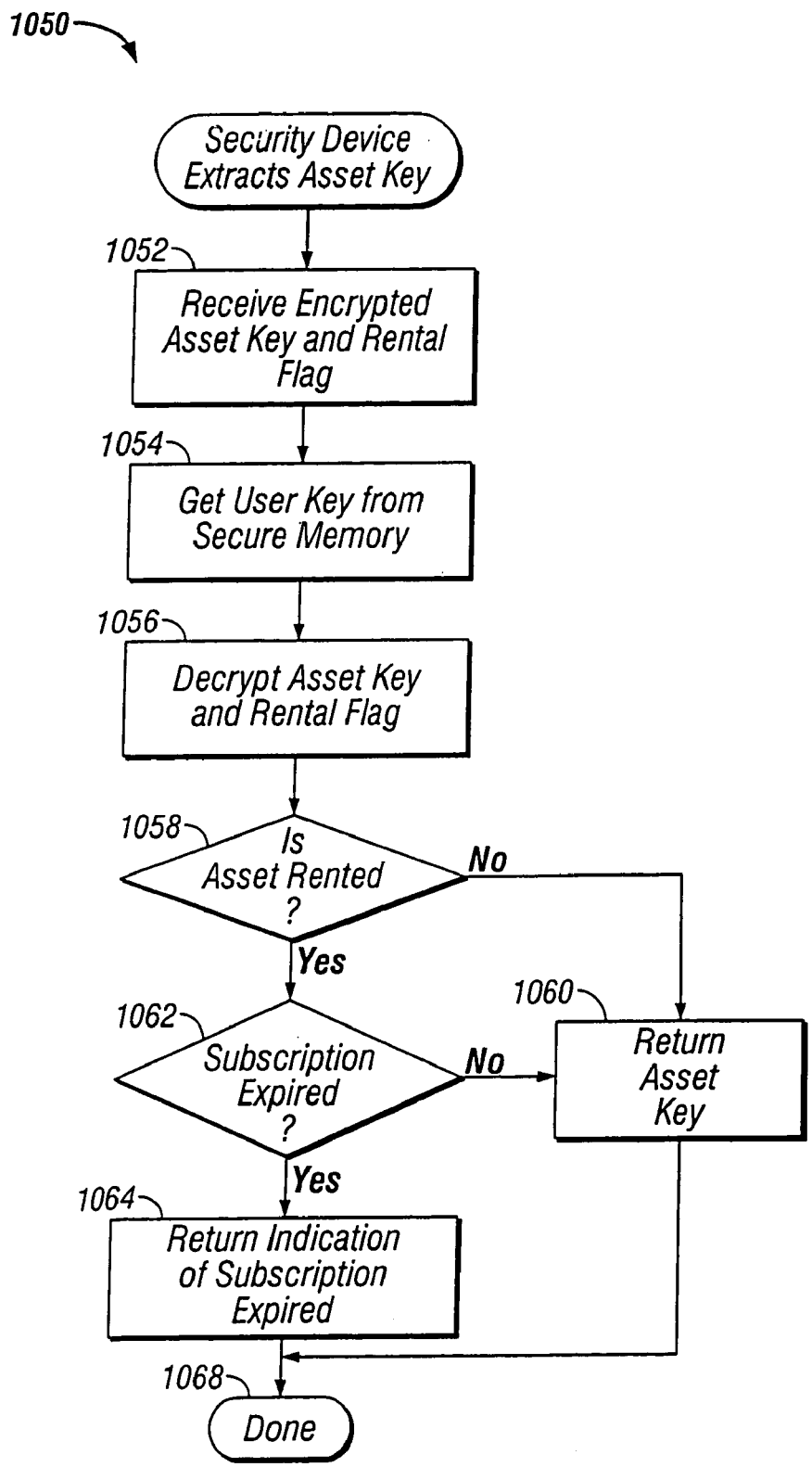
FIG. 10e is a flow diagram illustrating a process by which the security device extracts the asset key, according to one embodiment of the present invention.

Turning now to FIG. 10e, FIG. 10e is a flow diagram illustrating a process 1050 by which the security device 110 extracts the asset key, according to one embodiment of the present invention. As previously discussed, the security device 110 operates under the control of the firmware 383. At block 1052, the security device 110 receives the encrypted asset key and the rental flag from the computing device 102. The encrypted asset key and rental flag being encrypted with the user key. The security device 110 then obtains the user key 389 from nonvolatile memory 384 (block 1054). Next, the security device 110 decrypts the asset key and rental flag with the user key 389 (block 1056).

The security device then determines whether the asset is rented (block 1058). If not (i.e. it is owned), the security device 110 returns the decrypted asset key to the computing device 102 (block 1060) and process 1050 is complete (block 1068). However, if the asset is rented, the security device 110 next determines whether the subscription has expired (i.e. whether the current date is passed the subscription expiration date for the asset) (block 1062). If not, the security device 110 returns the decrypted asset key to the computing device 102 (block 1060) and the process 1050 is complete (block 1068). However, if the subscription has expired, then the security device 110 returns a response with an indication to the computing device 102 that the subscription has expired (block 1064). The process 1050 is then complete (block 1068).

It should be appreciated that the security software of the server 104, computing device 102, and the firmware of the security device 110, utilize standard encryption and decryption routines to encrypt and decrypt assets, keys, dates and other data sent between these devices, as has been discussed. Any suitable block mode cipher that utilizes pseudo-random generators to XOR pseudo-random numbers with data can be used. Some examples include Data Encryption Standard (DES), International Date Encryption Algorithm (IDEA), etc.

Accordingly, as previously described, the secure asset delivery system ensures that digital assets are encrypted and decrypted such that only a computing device coupled to properly authorized security device, that is associated with a particular user/subscriber, can receive and utilize the assets. Embodiments of the present invention provide a secure asset delivery system wherein digital assets are properly encrypted by the secure server 104 and can only be decrypted by a computing device 102 that is coupled to a properly authorized security device 110 such that only that properly authorized computing devices 102 can receive and utilize the assets—thereby protecting against unauthorized duplication of licensed material. As previously discussed, in one embodiment, the asset database 107 contains assets (e.g. multimedia presentations associated with musical pieces, audio files—such as Jamtracks including full songs and songs with various instrumental tracks removed)), as well as other digital assets. For example, in one embodiment, if the asset is an audio file, the audio file can be decompressed for playback as part of a multimedia presentation of a Jamtrack to facilitate the learning of guitar, as previously discussed. Further, it should be appreciated that the asset database 107 can include any other digital assets (e.g. multimedia, videos, movies, voice, sound recordings, software, other generic forms of data etc.) that can be purchased or rented and downloaded to a computing device 102 over a computer network 105.

Figure 11:
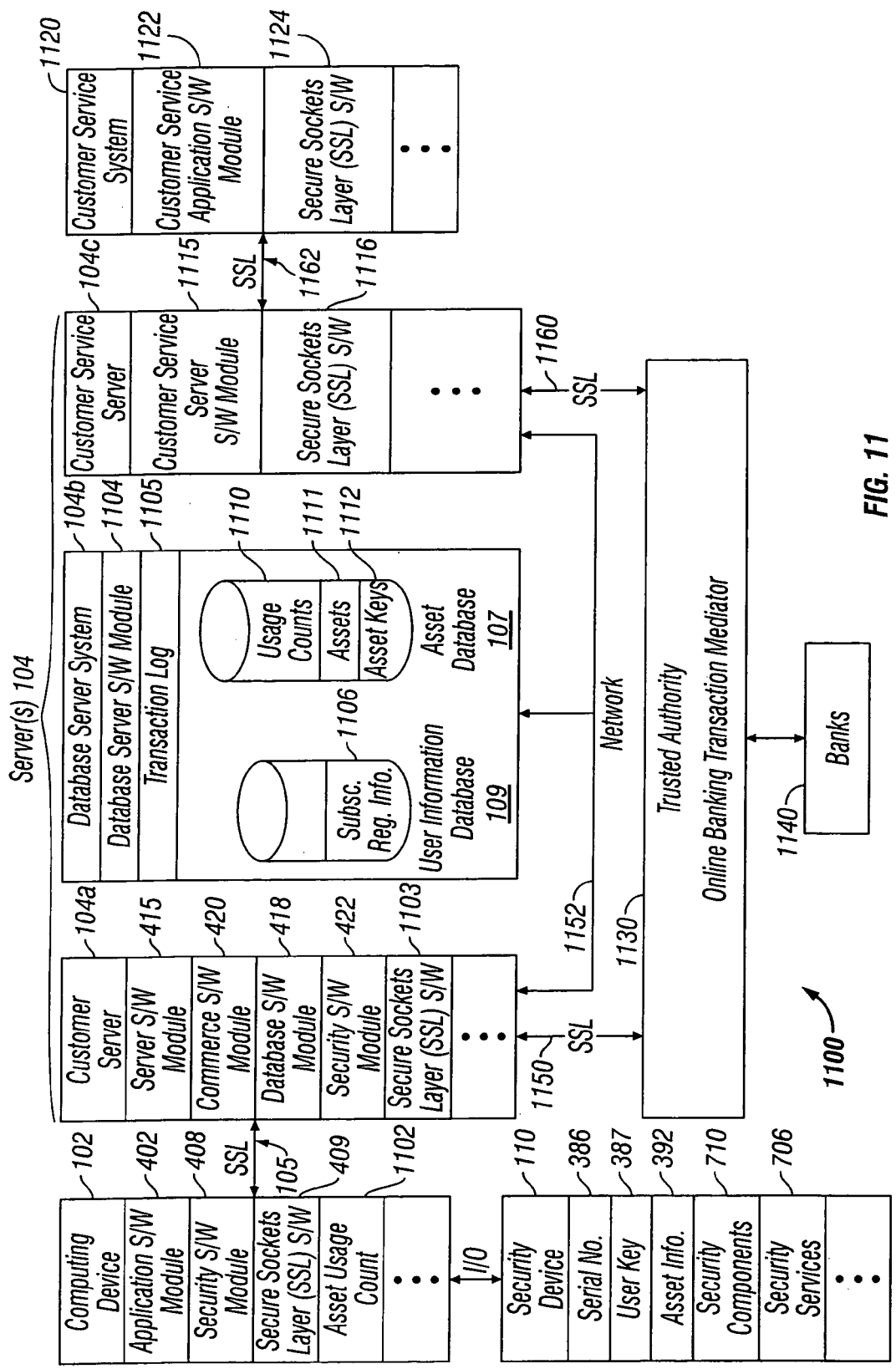
FIG. 11 is a diagram illustrating a secure electronic commerce system to track and record the distribution and use of assets, according to one embodiment of the present invention.

Turning now to FIG. 11, embodiments of the present invention further provide a secure electronic commerce system 1100 to track and record the distribution and use of assets. As previously discussed, embodiments of the invention include a security device 110 coupled to a computing device 102 that is uniquely identified and authenticated by a server 104 to establish a high degree of trust between a user utilizing the computing device 102 and the server 104 thereby enabling secure electronic commerce transactions between the computing device 102 and the server 104. This involves the use of a unique identifier, such as a serial number, an associated user key, and a plurality of non-obvious methods and procedures to uniquely identify and authenticate the security device. Also, as has been discussed, the security device 110 allows for the decryption of digital assets specifically encrypted for use by the authorized security device 110, along with many other functions. Accordingly, encrypted digital assets only operate with a computing device 102 coupled to an authorized security device 110 to protect against unauthorized duplication of licensed material and to provide a secure revenue opportunity for content providers.

Moreover, as will be described, the secure electronic commerce system 1100 tracks and records the distribution and use of assets. Particularly, the secure electronic commerce system 1100 tracks the purchase, rental, and number of uses of assets by a user. The secure electronic commerce system 1100 can be used either directly by the content owner to track the distribution and use of assets or by a third party provider to track the distribution and use of assets and further in order to keep an accounting of licensing fees (e.g. royalties) due to the content owner (e.g. the copyright holder). In this way, the secure electronic commerce system 1100 makes it easy for a third party provider to accurately report transactions regarding licensed assets to the ultimate content owner for licensing fees (e.g. royalty tracking). Accordingly, the secure electronic commerce system 1100 promotes the distribution of assets to customers in a secure manner and provides a secure revenue opportunity for content providers (especially the ultimate content owner (i.e. the copyright holder)).

With particular reference to FIG. 11, the secure electronic commerce system 1100 includes the security device 110, the computing device 102, the servers 104, a customer service system 1120, a trusted authority 1130, and banks 1140. Particularly, the servers 104, include a customer server 104a, a database server system 104b, and a customer service server 104c. It should be noted that the servers 104a, 104b, and 104c, can be physically separate servers or can be logical divisions of one server computer.

The security device 110 includes security components 710, security services 706, a serial number 386, a user key 387, asset information 392, etc., as has been previously discussed in detail.

Turning to the computing device 102, the computing device 102 includes software modules for interacting with the servers 104 via the computer network 105 (e.g. the Internet). The computing device 102 includes the application software module 402, as previously discussed. In addition to the previously discussed functions of the application software module 402, the application software module 402 in the secure electronic commerce system 1100 further provides forms (received from the server) to the user for entering registration and subscription information (e.g. to initially register and for registration updates) and allows the user to make online purchases. For example, the user can purchase or rent digital assets from the server 104, which are then specifically encrypted for decryption by the user's security device 110, and are then transmitted to the computing device 102 for use by the user. The digital asset can be any sort of digital asset, e.g. audio files (songs, music, etc.), multimedia, videos, movies, voice, sound recordings (songs, music, etc.), software, other generic forms of data etc., or can be, in the GUITARPORT embodiment, an audio file associated with a Jamtrack (i.e. a multimedia presentation associated with an audio file for learning guitar). However, it should be appreciated that tangible assets such as CDs, books, shirts, are any sort of tangible product, can be purchased using the secure electronic commerce system 1100.

In addition, the application software module 402 keeps track of the number of uses of rented digital assets for royalty tracking purposes. For example, in one embodiment, the computing device 102 stores an asset usage count list 1102 of rented assets in a storage device (e.g. a hard drive), which includes the title of the rented asset, the dates on which the asset has been accessed or used, and the total number of days on which the asset has been accessed or used. Of course, other asset usage count schemes could be utilized. Also, the computing device 102 can also store a list of digital assets that have been purchased by the user. As previously discussed, digital assets that are rented expire when the user's subscription expires and cannot be used after the subscription expires, whereas digital assets that are owned by the user do not expire when the user's subscription expires.

The computing device 102 also includes a security software module 408, as previously discussed, in conjunction with secure sockets layer (SSL) software 409, to allow the computing device 102 to interact securely with the servers 104 via the computer network 105 (e.g. the Internet). Secure sockets layer (SSL) is a widely used security protocol, which is built into both of the leading Web browsers. SSL is a transport-level protocol developed by Netscape that provides channel security. With SSL, the client and server use a handshaking technique to agree on the level of security they want to use during a session. Authentication takes place over a secure channel, and all information transmitted during a session is encrypted.

Turning now to the customer server 104a, in one embodiment of the present invention, the customer server 104a includes a server software module 415, a commerce software module 420, a database software module 418, a security software module 422, and Secure Socket Layer (SSL) software 1103.

The server software module 415 can be conventional server software for transmitting and receiving data to and from computing devices 102. For example, using the Hypertext Transfer Protocol (HTTP) and Hypertext Markup Language (HTML) or Extensible Markup Language (XML), the server 104 can communicate with the computing device 102 across the computer network 105 to provide various functions and data to the user. At the computing device 102, utilizing the embedded browser 404, which is part of the application software module 402, or even other browsers such as Netscape™ Navigator™ published by Netscape™ Corporation of Mountain View, Calif., the Internet Explorer™ published by Microsoft™ Corporation of Redmond, Wash., the user interface of America Online™, or any other browser or HTML/XML translator from a well-known supplier, computing device 102 may supply data to, and access processed or unprocessed data from, the server 104.

According to one embodiment of the present invention, the commerce software module 420 controls the delivery of digital assets to the computing device 102 when they are purchased or rented. Further, the commerce software module 420, in conjunction with the database software module 418, tracks the purchase, rental, and number of uses of digital assets by a user, as well as account balances for users. Additionally, the commerce software module 420, in conjunction with the database software module 418, performs functions related to initially registering users, registration updates, billing, and royalty tracking. The particular functions of the commerce software module 420 will be discussed in more detail later.

The database software module 418 can be conventional database software, such as MySQL, to control the input and output of data from the asset database 107 and the user information database 109, under the control of the commerce software module 420. The security software module 422, as previously discussed, in conjunction with the Secure Socket Layer (SSL) software 1103, implements a secure protocol for the transferring of data between the computing device 102 and the customer server 104a.

Further, as previously discussed, the computer network connection 105 (e.g. an Internet connection) provides network access between the customer server 104a and the computing device 102 of the user. Moreover, a secure SSL computer network connection 1150 (e.g. a private connection or public Internet connection) can also be made to a trusted authority (e.g. an online banking transaction mediator) to provide a path and protocol to a bank for banking transactions, as will be discussed. Additionally, another network connection 1152 is made between the customer server 104a, the database server 104b, and customer service server 104c. The network connection 1152 may be through a private network (e.g. a LAN) or through a public network (e.g. the Internet). The network connection 1152 is a secure connection. The servers 104a, 104b, and 104c operate in a secure environment.

Looking now at the database server system 104b, the database server system 104b includes a database server software module 1104, a transaction log 1105, the asset database 107, and the user information database 109. The database server software module 1104 includes programs for providing access to the user information database 109 and the asset database 107. For example, the database server software module 1104 can be conventional database software, such as MySQL, to control the input and output of data from the asset database 107 and the user information database 109. The database server system 104b, in conjunction with the customer server 104a and the customer service server 104c, operate in a secure environment.

Access to the database server system 104b is "transaction-safe", which means any transaction that fails to complete does not alter the consistency or state of the database server system 104b. The network connection 1152 to the customer server 104a and customer service server 104c provides a path for sharing data from the database server system 104b (e.g. data from the user information database 109 and the asset database 107) with the customer server 104a and the customer service server 104c.

The user information database 109 includes subscription and registration information 1106 for each registered user. The subscription and registration information 1106 include data such as the user's name, email address, home address, computer connection speed, credit card number, credit card expiration date, subscription information, type of computer, and security information including a user's serial number for his or security device 110, user key, memory key, and other user information. Moreover, the user information database 109 may include the user's preferences such as musical preferences, movie preferences, book preferences, or any other type of preferences that would be suitable to tailor the presentation of preferred assets to the user. In the GUITARPORT embodiment, the user information may also include the type of musical preferences of the user to tailor preferred Jamtracks offerings to the user (as previously discussed).

The asset database 107 can include any type of digital asset (e.g. music, sound recordings, voice, multimedia, videos, movies, software, or any other type of digital data, etc.) that can be purchased or rented by a user and downloaded to a computing device 102 over a computer network 105. Moreover, the asset database 107 stores unique asset encryption keys 1112 for each digital asset such that a digital asset can be uniquely encrypted for a particular authorized security device 110 (in conjunction with the unique user key for the particular security device) and sent to a user operating a computing device 102 with that authorized security device 110—so that only that authorized security device 110 can decrypt the uniquely encrypted asset, as previously discussed. In the GUITARPORT embodiment, as previously discussed, the asset database 107 contains assets 1111 such as session files, multimedia data for multimedia presentations associated with musical pieces, audio files, and audio files associated with Jamtracks including full songs and songs with various instrumental tracks removed, sound recordings, etc., as previously discussed.

It will be readily appreciated by those having ordinary skill in the relevant arts that the asset database 107 and user information database 109 may be stored in storage devices including various mass storage devices such as one or more DASD arrays, tape drives, optical drives, or the like, and that the aforementioned information may be stored in any one of a variety of formats or data structures.

The database server system 104c also includes a transaction log 1105 that contains an audit trail for all operations that alter the user information database 109 and the asset database 107. The transaction log 1105 further includes a timestamp for each entry and sufficient information to retrace steps performed by the servers and by customer support personnel. It should be appreciated that transaction logs for such purposes are well known in the art.

Turning now to the customer service server 104c, the customer service server 104c includes a customer service server software module 1115 that includes programs for updating registration information, handling transfers of ownership, making account adjustments, and canceling accounts. Customer service software modules to fulfill these functions are well known in the art.

The Secure Socket Layer (SSL) software 1116, implements a secure protocol for the transferring of data between the customer service server 104c and the customer service system 1120 and the trusted authority 1130. A secure SSL computer network connection 1160 (e.g. a private connection or public Internet connection) can be made to a trusted authority (e.g. an online banking transaction mediator) to provide a path and protocol to a bank for banking transactions, as will be discussed. Another secure SSL computer network connection 1162 (e.g. a private connection or public Internet connection) can also be made to the customer service system 1120. Additionally, another network connection 1152 is made between the customer server 104a, the database server 104b, and customer service server 104c. The network connection 1152 may be through a private network (e.g. a LAN) or through a public network (e.g. the Internet). The network connection 1152 is a secure connection. The servers 104a, 104b, and 104c operate in a secure environment.

Referring now to the customer service system 1120, the customer service system 1120 includes at least one personal computer that stores a customer service application software module 1122 that provides functionality for interacting with the customer service server 104c. The customer service application software module 1122 provides forms that can be utilized by operators for updating registration information, handling transfers of ownership, making account adjustments, and canceling accounts. The personal computers at the customer service system 1120 can be utilized by operators to make changes regarding registration updates, ownership issues, account adjustments, the cancellation of accounts, etc., directly to the customer service server 104c, via computer network connection 1162, for users who call into the customer service system 1120 or otherwise communicate with the customer service system 1120. This information can then be accurately updated and reflected in the database server system 104b. Customer service application software to fulfill these functions is well known in the art.

Thus, as one example, a user can talk with an operator at the customer service system 1120 to make changes with a Web-based business server 104. Accordingly, users can contact operators at the customer service system 1120 to update their accounts and correct problems with their accounts. Alternatively, as previously discussed, a user can make changes to their accounts using their own computing device 102 with forms presented by the application software module 402.

Secure Socket Layer (SSL) software 1124, implements a secure protocol for the transferring of data between the customer service system 1120 and the customer service server 104c. A secure SSL computer network connection 1162 (e.g. a private connection or public Internet connection) can be made to the customer service system 1120 to transfer data. Furthermore, although the customer service system 1120 is shown as being separate from the location of the servers 104, it should be appreciated that the customer service system 1120 can be co-located with the servers 104.

The trusted authority/online banking transaction mediator 1130 is a service bureau provided by a third party for verifying credit cards and performing online banking transactions (with banks 1140) including managing the transfer of funds between bank accounts. Typically, the trusted authority 1130 provides a password-protected login account and requires the use of an underlying security protocol. For example, Verisign is a well known trusted authority that can be utilized.

Figure 12A:
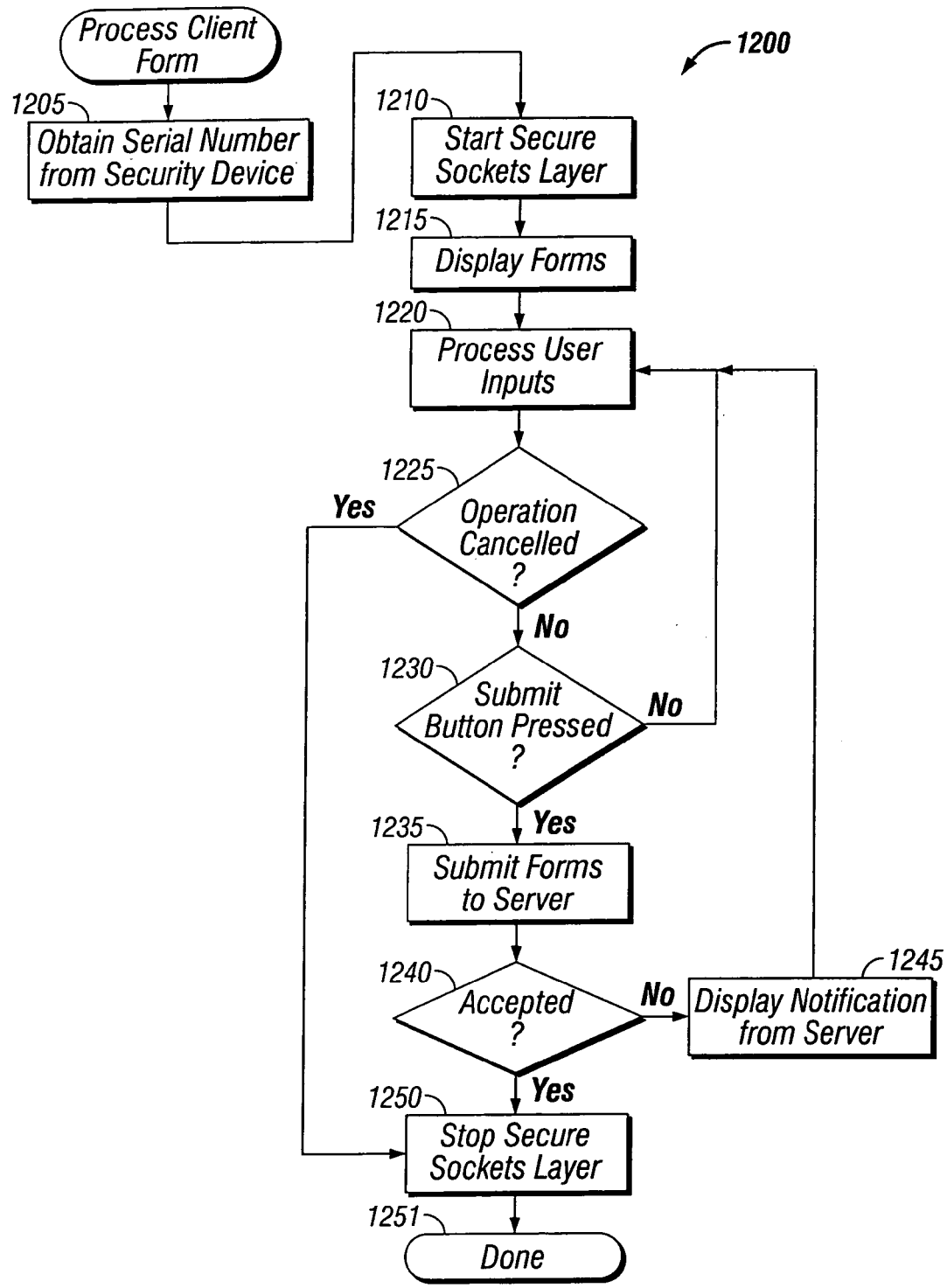
FIG. 12a illustrates a process for processing a client form at the client device in order for a client to register and subscribe to a server, according to one embodiment of the present invention.

With reference now to FIG. 12a, FIG. 12a illustrates a process 1200 for processing a client form at the client device in order for a user to register and subscribe to a server 104, according to one embodiment of the present invention. As previously discussed, the computing device 102 includes software modules for interacting with the servers 104 via the computer network 105 (e.g. the Internet) of the secure electronic commerce system 1100. Particularly, the computing device 102 includes the application software module 402, as previously discussed, which provides forms (received from the server) to the user for entering registration and subscription information to implement process 1200 (e.g. to initially register and subscribe the user).

Particularly, each user must register before using the secure electronic commerce system 1110. Basically, registration consists of filling out a form to provide personal information and to designate a credit card for billing purposes. Moreover, a user's security device serial number identification is automatically retrieved at the time of registration to uniquely identify and authenticate the security device.

As shown in FIG. 12a, at block 1205 the serial number 386 is obtained from the security device 110. Once the serial number 386 is obtained, the challenge/response process to authenticate the security device 110 is performed, as previously described with reference to FIGS. 8a and 8b. At block 1210, a secure sockets layer (SSL) session is begun between the computing device 102 and the customer server 104a. Next forms are displayed having entry bocks for the entry of user registration and subscription input data (block 1215). This can be implemented as a single form or as two separate forms—e.g. a first registration form and a second registration form.

For example, a first registration form is displayed. The type of registration input data requested by the first form may include the user's name, home address, country, email address, type of computer, computer connection speed, etc. Further, the first form may include a user agreement having accept and decline selection buttons that the user must accept (by selecting the accept button) before the forms can be processed. Next, a second subscription information form is displayed requesting billing information such as the user name, billing address, credit card number, and credit card expiration date, etc. This second form further includes a selectable submit button. Such forms are standard and are known in the art.

At block 1220, the computing device 102 processes the users inputs from the forms. The process 1200 further monitors for whether the operation has been canceled (block 1225). If so, the process 1200 stops the SSL session with the customer server 104a (block 1250) and process 1200 is complete (block 1251). If not, the process 1200 determines whether the submit button of the second form has been selected by the user (e.g. pressed) such that the user wishes to submit his or her user information to the customer server 104a to register with the Web based business server (block 1230). For example, in one embodiment, the Web based business can be the GUITARPORT business model previously discussed. If the submit button has not been selected, the process 1200 returns to block 1220 to continue processing user inputs. On the other hand, if the submit button is not selected (e.g. the user selects a return to form entry button or the like), then the computing device 102 submits the user forms to the customer server 104a via the computer network 105 (block 1235).

At block 1240, the process 1200 determines whether the customer server 104a accepted the user's subscription and registration information submitted in the forms (this process will be discussed with reference to FIG. 12b). If the customer server 104a does not accept the user information submitted in the forms (e.g. due to erroneous or incomplete information), then the computing device 102 displays a notification from the server to the user that the user subscription and registration information has not been accepted and the process 1200 returns to block 1220 to further process the user subscription and registration input data. For example, the user may be allowed to correct erroneous subscription and registration information or to enter subscription and registration information left that was out.

If the customer server 104*a* accepts the user subscription and registration information submitted in the forms then at block 1250 the user is registered with the server (e.g. a Web-based business) and the SSL session is stopped. The process 1200 is then complete (block 1251).

Figure 12B:
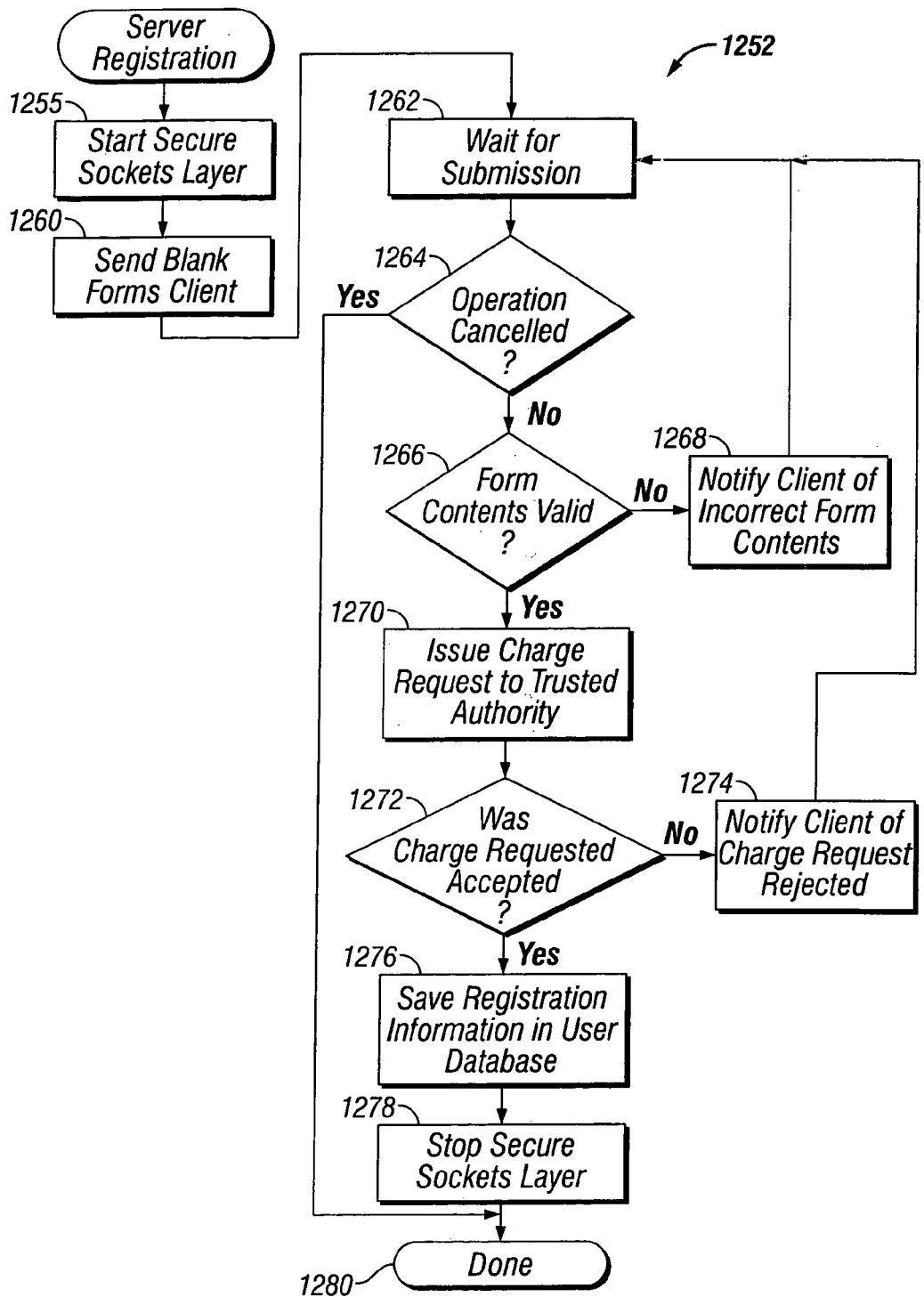
FIG. 12b illustrates a process for processing a client form received from the client device at the server in order for a client to register and subscribe to the server, according to one embodiment of the present invention.

With reference now to FIG. 12*b*, FIG. 12*b* illustrates a process 1252 for processing client forms received from the client device 102 at the server 104 in order for a client to register and subscribe to the server 104, according to one embodiment of the present invention. As previously discussed, customer server 104*a* includes the commerce software module 420, in conjunction with the database software module 418, to perform functions related to registering users (and further to perform registration updates) to implement process 1252.

As shown in FIG. 12*b*, at block 1255 a secure sockets layer (SSL) session is initiated between the customer server 104*a* and the computing device 102. At block 1260 blank registration and subscription forms (e.g. the first and second registration and subscription forms previously discussed) are sent to the computing device 102. The process 1252 then awaits submission of the forms from the computing device 102 (block 1262). Further, the process 1252 monitors for whether the user at the computing device 102 has canceled the registration and subscription operation (block 1264). If the user cancels the registration and subscription operation, then the process 1252 is complete (block 1280).

However, if the user does not cancel the registration and subscription operation then the process 1252 next verifies whether the form contents are valid or not (block 1266). If the form contents are not valid and the customer server 104*a* does not accept the user information submitted in the forms (e.g. due to erroneous or incomplete information), then the process 1252 returns to block 1262 to further await submission of forms from the computing device 102 that include the correct or required information. Moreover, as previously discussed, the customer server 104*a* sends a command to the computing device 102 to display a notification to the user that the user subscription and registration information has not been accepted and is either incomplete or erroneous (block 1268). The process 1252 then returns to block 1262 to await submission of forms with valid information from the computing device 102. In this way, the user can correct erroneous subscription and registration information or enter subscription and registration information that was previously left out.

On the other hand, if the form contents are valid, the process 1252 issues a charge request to the trusted authority 1130 to verify that the user's credit card is valid (block 1270). Next, at block 1272, the process 1252 determines whether or not the charge request was accepted or denied by the trusted authority 1130. If the trusted authority 1130 denies the charge request, then the customer server 104*a* notifies the user at the computing device 102 that his or her charge request was denied (e.g. the user's credit card was denied) (block 1274). The process 1252 then returns to block 1262 to again wait for the submission of forms that include a valid credit card number. However, if the trusted authority 1130 accepts the charge request (e.g. the credit card is valid), then the customer server 104*a* saves the registration and subscription information for the user in the user information database 109 (e.g. subscription and registration information 1106) (block 1276).

The process 1252 then stops the SSL session between the customer server 104*a* and the computing device 102 (block 1278). The process is then complete (block 1280). Thus, the user has successfully been registered and subscribed with the Web based business server 104. For example, in one embodiment, the Web based business server can be the GUITARPORT embodiment, previously discussed. However, it should be appreciated that the previously described processes can be used to register and subscribe users to any type a Web based business server.

Figure 13A:
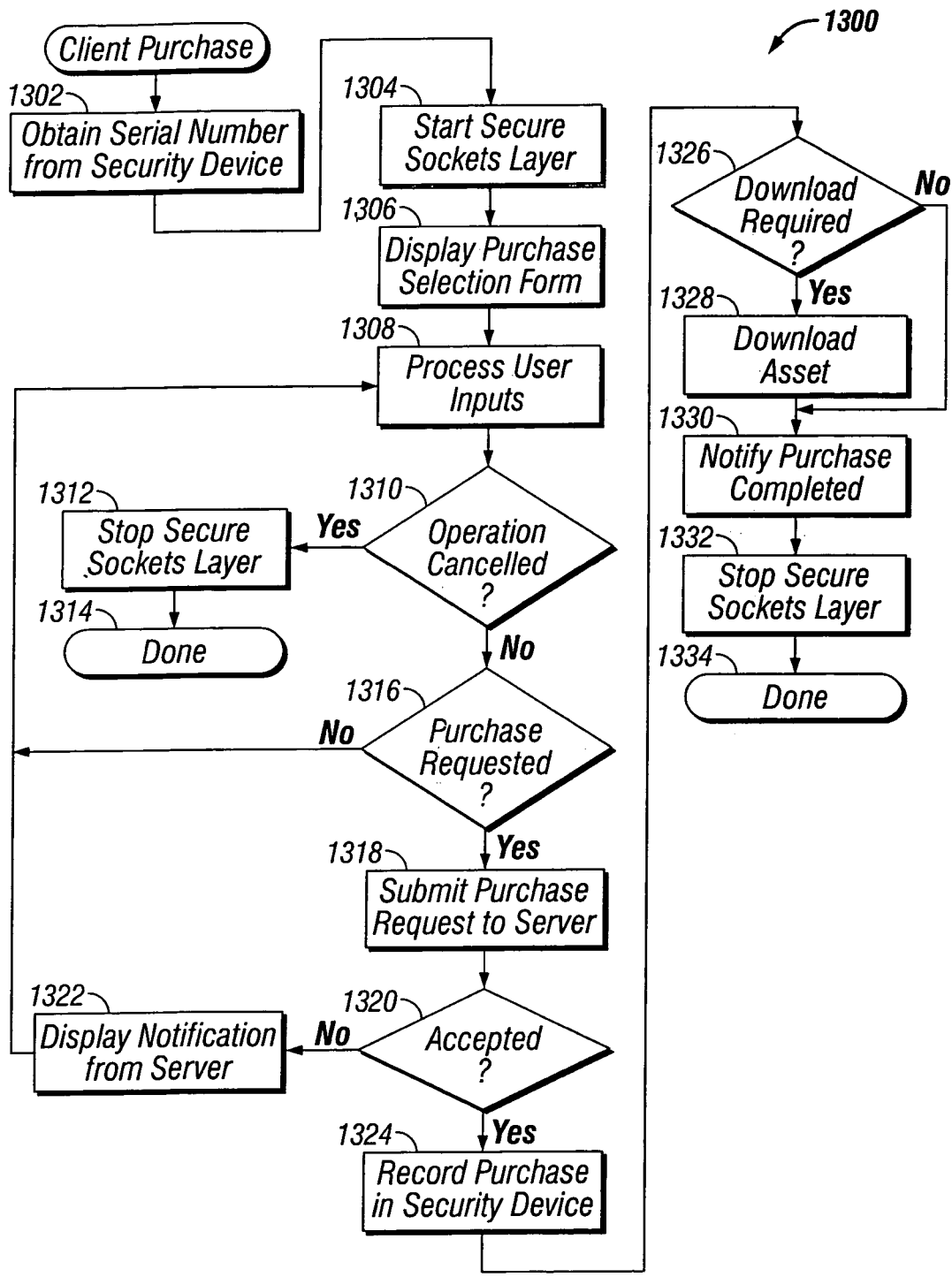
FIG. 13a illustrates a process for allowing a user to purchase or rent an asset at the client device using the secure electronic commerce system, according to one embodiment of the present invention.

With reference now to FIG. 13*a*, FIG. 13*a* illustrates a process 1300 for allowing a user to purchase or rent an asset at the client device 102 using the secure electronic commerce system 1100, according to one embodiment of the present invention. As previously discussed, the computing device 102 includes the application software module 402, which allows the user to make online purchases and rentals and aids in implementing the process 1300. For example, the user can purchase or rent digital assets from the server 104, which are then specifically encrypted for decryption by the user's security device 110, and are then transmitted to the computing device 102 for use by the user. The digital asset can be any sort of digital asset, e.g. audio files (songs, music, etc.), multimedia, videos, movies, voice, sound recordings (songs, music, etc.), software, other generic forms of data etc., or can be, in the GUITARPORT embodiment, an audio file associated with a Jamtrack (i.e. a multimedia presentation associated with an audio file for learning guitar). However, it should be appreciated that tangible assets such as CDs, books, shirts, are any sort of tangible product, can be purchased using the secure electronic commerce system 1100.

Generally, a user may make an online purchase and the transactions for the purchase or rental are coordinated by the customer server 104*a*. The secure electronic commerce system 1100 supports instant purchases or rentals, which are automatically charged to a registered credit card of the user. Further the secure electronic commerce system 1100 also supports purchases or rentals that are added to the monthly amount due by the user and are automatically billed at the end of the billing cycle.

In order to implement process 1300, it is assumed that the computing device 102 has already successfully logged on to the customer server 104*a* by satisfying the challenge/response process to authenticate the security device 110, as previously described with reference to FIGS. 8*a* and 8*b*. As shown in FIG. 13*a*, at block 1302 the process 1300 obtains the serial number 386 from the security device 110. Next, the process 1300 starts a secure sockets layer (SSL) session between the computing device 102 and the customer server 104*a* (block 1304). The process 1300 then displays a purchase selection form at the computing device 102 to allow the user to select an asset for purchase (block 1306). Typically, the purchase selection form will be displayed after a user selects an asset for purchase, for example, by double clicking on an asset. For example, the purchase selection form may be a simple dialog box asking if the user is sure they want to purchase or rent this asset with a selectable yes or no button. For example, in the GUITARPORT embodiment, a user may select a Jamtrack asset for purchase or rental. The purchase selection form would then be presented allowing the user to purchase or rent the Jamtrack by selecting the yes button. However, any type of digital asset can be simply purchased in this way. For example, a user could double click on a song they want to purchase on a music related Web-site, select the yes button of the purchase selection form, and they will have instantly purchased the song without the need to enter a great deal of information as with current electronic commerce systems.

The process 1300 then processes user inputs related to the purchasing of an asset (block 1308). Furthermore, the process 1300 monitors the purchase operation to verify that the user does not cancel the purchase operation (block 1310). If the user cancels the purchase operation, then the SSL session between the computing device 102 and the customer server 104a is stopped (block 1312). The process 1300 is then complete (block 1314). If the purchase operation is not canceled by the user, then the process 1300 determines whether or not a purchase or rental of an asset was requested (block 1316).

At block 1316, if the process 1300 determines that a purchase or rental has not been requested, the process returns to block 1308 to continue processing user inputs related to the purchasing or renting of assets. On the other hand, if the purchase or rental of an asset has been requested then the process 1300, at block 1318, submits the purchase or rental request for the asset to the customer server 104a. At block 1320, the process 1300 determines whether or not the purchase or rental request will be accepted by the customer server 104a (as will be discussed with reference to FIG. 13b). If the purchase or rental request for the asset is denied by the customer server 104a then the process 1300 displays a notification from the customer server 104a on computing device 102 that the purchase or rental request for the asset has been denied. The process 1300 then returns to block 1308 to continue processing user inputs related to the purchasing or renting of assets.

On the other hand, if the customer server 104a accepts the purchase or rental request for the asset, then a record of the purchase or rental is recorded in the security device 110 (block 1324). In order to accomplish this, the customer server 104 unlocks the security device memory 721 of the security device 110, as previously described with reference to FIG. 8d, in order to record the purchase or rental. At block 1326, the process 1300 determines whether a download is required. If a download is required, then the asset is downloaded from the customer server 104a to the computing device 102 (block 1328). The process of downloading intangible digital assets (e.g. audio files, sound recordings, video, multimedia, etc.) from the customer server 104a to the computing device 102 and the security device 110, has been previously described in detail (including the novel and non-obvious encryption/decryption security techniques for downloading digital assets) with reference to FIGS. 9, 10a, and 10b. However, in the case of a tangible asset such as a retail product (e.g. CD or book) where a download is not required, the retail product can be sent to the user by conventional means (e.g. through the mail system).

Next, at block 1330, the user of the computing device 102 is notified that the purchase or rental is complete. Further, after this step the security device memory 721 of the security device 110 is locked as described in detail previously with reference to FIGS. 8f and 8g. Moreover, the purchased or rented is uniquely encrypted digital asset can then only be accessed and utilized by the computing device 102, in conjunction with the authenticated security device 110, as previously described in detail with reference to FIGS. 10c–10e. As previously discussed, the digital asset can be stored in encrypted from on the hard drive of the computing device 102 and the asset key to decrypt the asset is stored in the security device 110. The SSL session between the computing device 102 and customer server 104a is then stopped (block 1332) and the process 1300 is complete (block 1334).

Figure 13B:
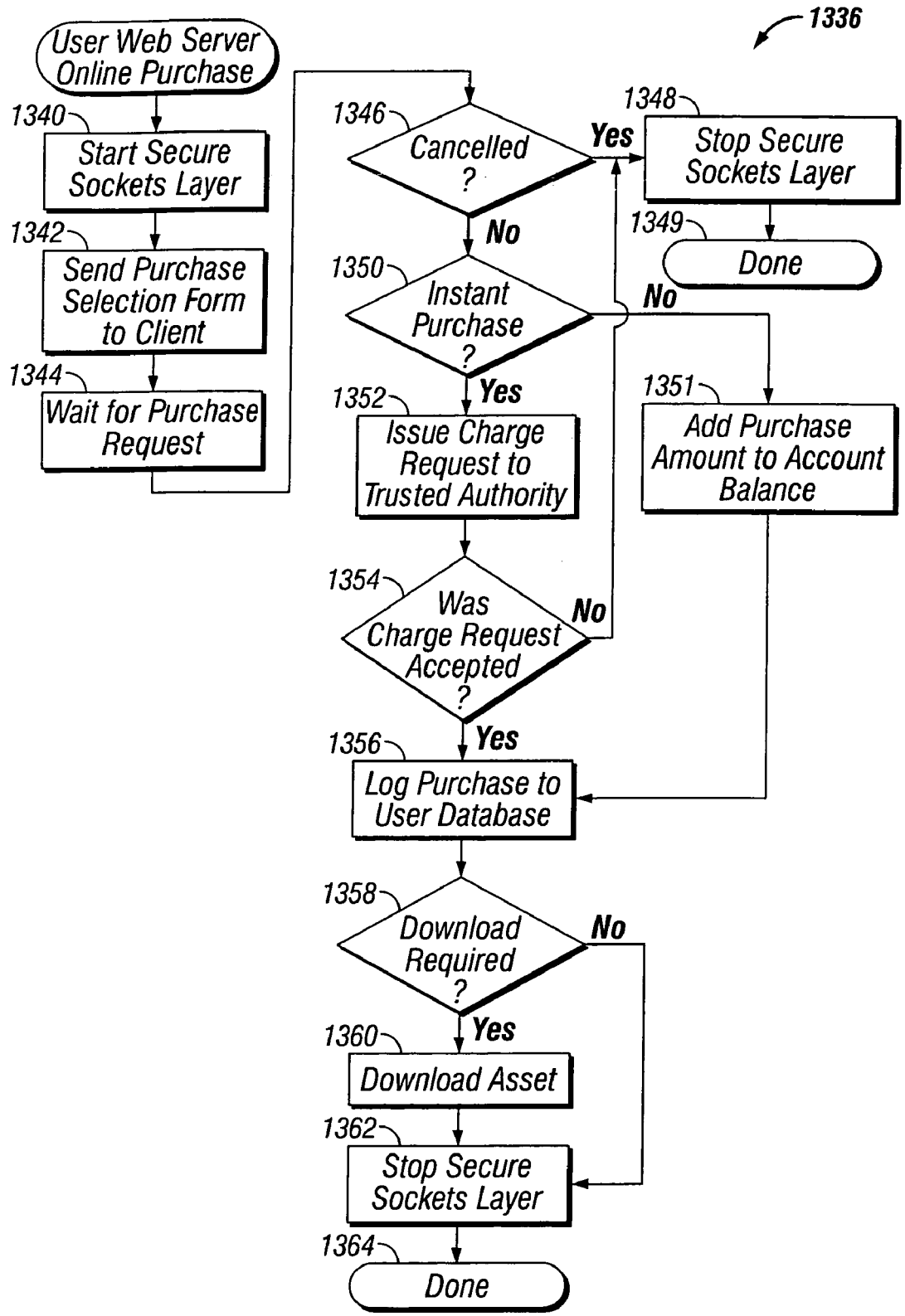
FIG. 13b illustrates a process implemented by a customer server for allowing a user to purchase or rent an asset at the client device using the secure electronic commerce system, according to one embodiment of the present invention.

With reference now to FIG. 13b, FIG. 13b illustrates a process 1336 implemented by the customer server 104a for allowing a user to purchase or rent an asset at the client device 102 using the secure electronic commerce system 1100, according to one embodiment of the present invention. As previously discussed, the customer server 104a includes commerce software module 420 that controls the purchase and rental of digital assets by the user of a computing device 102. Further, the commerce software module 420, in conjunction with the database software module 418, tracks the purchase, rental, and number of uses of digital assets by a user, as well as account balances for users.

As shown in FIG. 13b, at block 1340 the process 1336 starts a secure sockets layer (SSL) session between the customer server 104a and the computing device 102. At block 1342, in response to a user selecting an asset, the customer server 104a sends a purchase selection form to the computing device 102. The customer server 104a then waits for a purchase request from the client device 102 (e.g. a user verifying that they wish to purchase or rent an asset by selecting the yes button on the purchase selection form) (block 1344). The process 1336 monitors for whether the purchase request has been canceled (block 1346). If the user cancels the request, then the process 1336 stops the SSL session between the customer server 104a and the computing device 102 (block 1348) and the process 1336 is complete (block 1350).

On the other hand, if the user does not cancel their purchase request then the process 1336 next determines, at block 1350, whether or not this is an instant purchase. An instant purchase is a purchase or rental that is automatically and instantly charged to the user's credit card whereas a non-instant purchase is a purchase or rental that is simply added to the user's account balance which is then billed to the user at the user's next billing cycle (e.g. monthly). Thus, if the purchase or rental is a non-instant purchase the purchase amount is simply added to the user's account balance (block 1351). However, if the purchase or rental is an instant purchase, then at block 1352, a charge request is issued to a trusted authority 1130.

The process 1336 next determines whether the charge request was accepted by the trusted authority (block 1354). If not, the process 1336 stops the SSL session with the computing device 102 (block 1348) and the process 1336 is complete (block 1350). On the other hand, if the charge request was accepted by the trusted authority 1130, then the purchase or rental is logged to the user in the user information database 109. The user information database 109 stores records for each user identifying the assets they have purchased or rented and the number of times they have used or accessed each rented asset. Next, at block 1358, the process 1336 determines whether or not a download is required. As previously discussed, intangible digital assets are downloaded from the customer server 104 a to the computing device 102 in encrypted form whereas the purchase of tangible assets (e.g. products-CDs, shirts, etc.) do not require a download and can simply be delivered through the conventional mail system. If a download is not required, then the process 1336 simply stops the SSL session with the computing device 102 (block 1362) and the process 1336 is complete (block 1364). Conversely, if a download is required, then the customer server 104a downloads the digital asset to the computing device (block 1360), as previously described in detail. Afterwards, the process 1336 stops the SSL session with the computing device 102 (block 1362) and the process 1336 is complete (block 1364).

Thus, the secure electronic commerce system 1100 tracks and records the distribution (e.g. purchases and rentals) and use of assets. Particularly, the secure electronic commerce system 1100 tracks the purchase, rental, and number of uses of assets by a user. Therefore, the secure electronic commerce system 1100 can be used either directly by the content owner to track the distribution and use of assets or by a third party provider to track the distribution and use of assets and further in order to keep an accounting of licensing fees (e.g. royalties) due to the content owner (e.g. the copyright holder). In this way, the secure electronic commerce system 1100 makes it easy for a third party provider to accurately report transactions regarding licensed assets to the ultimate content owner for licensing fees (e.g. royalty tracking). Accordingly, the secure electronic commerce system 1100 promotes the distribution of assets to customers in a secure manner and provides a secure revenue opportunity for content providers (especially the ultimate content owner (i.e. the copyright holder)).

In order to track the number of uses of assets by a user, the customer server 104a periodically queries the computing device 102 to determine the amount of usage of rented assets in order to report the usage to licensors and to use in determining the amount of royalties owed to the licensor (e.g. for royalty tracking).

As previously discussed, the computing device 102 includes application software module 402 that keeps track of the number of uses of rented digital assets for royalty tracking purposes. For example, in one embodiment, the computing device 102 stores an asset usage count list 1102 for rented assets in a storage device (e.g. a hard drive), which for each rented asset includes the title of the rented asset, the dates on which the rented asset has been accessed or used, and the total number of days on which the asset has been accessed or used (termed the usage count). Also, the computing device 102 can also store a list of digital assets that have been purchased by the user. As previously discussed, digital assets that are rented expire when the user's subscription expires and cannot be used after the subscription expires, whereas digital assets that are owned by the user do not expire when the user's subscription expires.

Figure 14A:
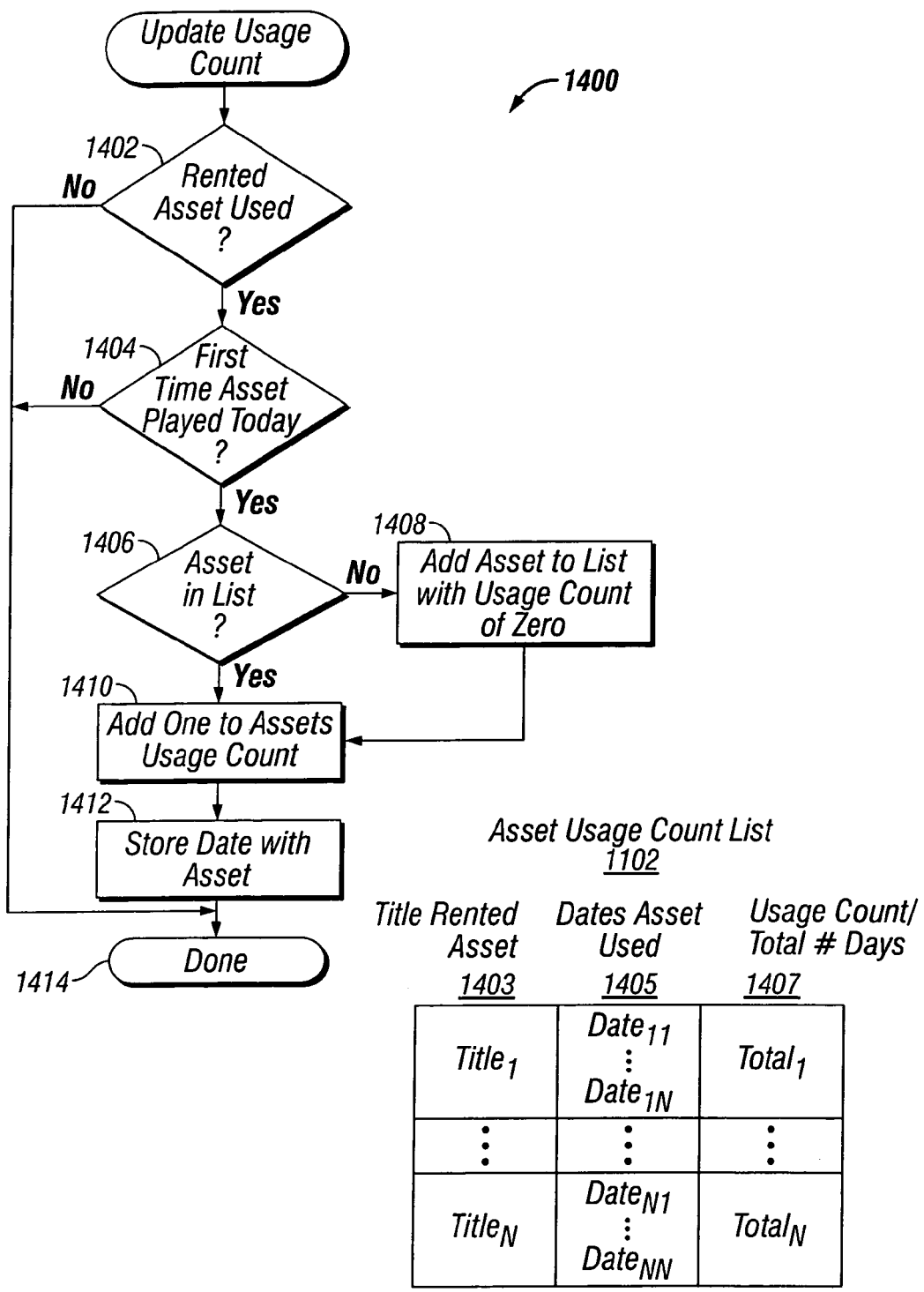
FIG. 14a illustrates a process implemented by the computing device for tracking the number of uses of rented digital assets using the secure electronic commerce system, according to one embodiment of the present invention.

With reference now to FIG. 14a, FIG. 14a illustrates a process 1400 implemented by the computing device 102 for tracking the number of uses of rented digital assets using the secure electronic commerce system 1100, according to one embodiment of the present invention. As previously discussed, the computing device 102 includes application software module 402 that keeps track of the number of uses of licensed or rented digital assets for royalty tracking purposes and that may be used to implement the process 1400.

As shown in FIG. 14a, the process 1400 first determines whether a licensed or rented asset is being used (block 1402). If not, the process is complete (block 1414). Conversely, if a licensed or rented asset is being used, the process 1400 next determines whether this is the first time the asset has been used on the current day. If not, the process is complete (block 1414). However, if this is the first time the asset has been played on the current day, the process 1400 next determines whether the licensed or rented asset is in the list of rented assets in the asset usage count list 1102, which for each rented asset includes the title of the rented asset 1403, the dates on which the asset has been accessed or used 1405, and the total number of days 1407 on which the asset has been accessed or used (termed usage count). If the rented asset is not in the list, then at block 1408 the asset is added to the list with a usage count of zero (e.g. the total number of days or usage count 1407 is set to zero). However, at block 1410, a numeric one is added to the usage count such that the usage count 1407 is set to one.

On the other hand, if this is the first time the asset has been played on the current day and the asset is already in the asset usage count list 1102, a numeric one is added to the usage count 1407 for the asset (block 1410). Furthermore, the current date on which the asset has been accessed or used is also recorded in the asset usage count list 1102 (e.g. in the dates asset used field 1405) (block 1412). The process 1400 is then complete (block 1414).

Figure 14B:
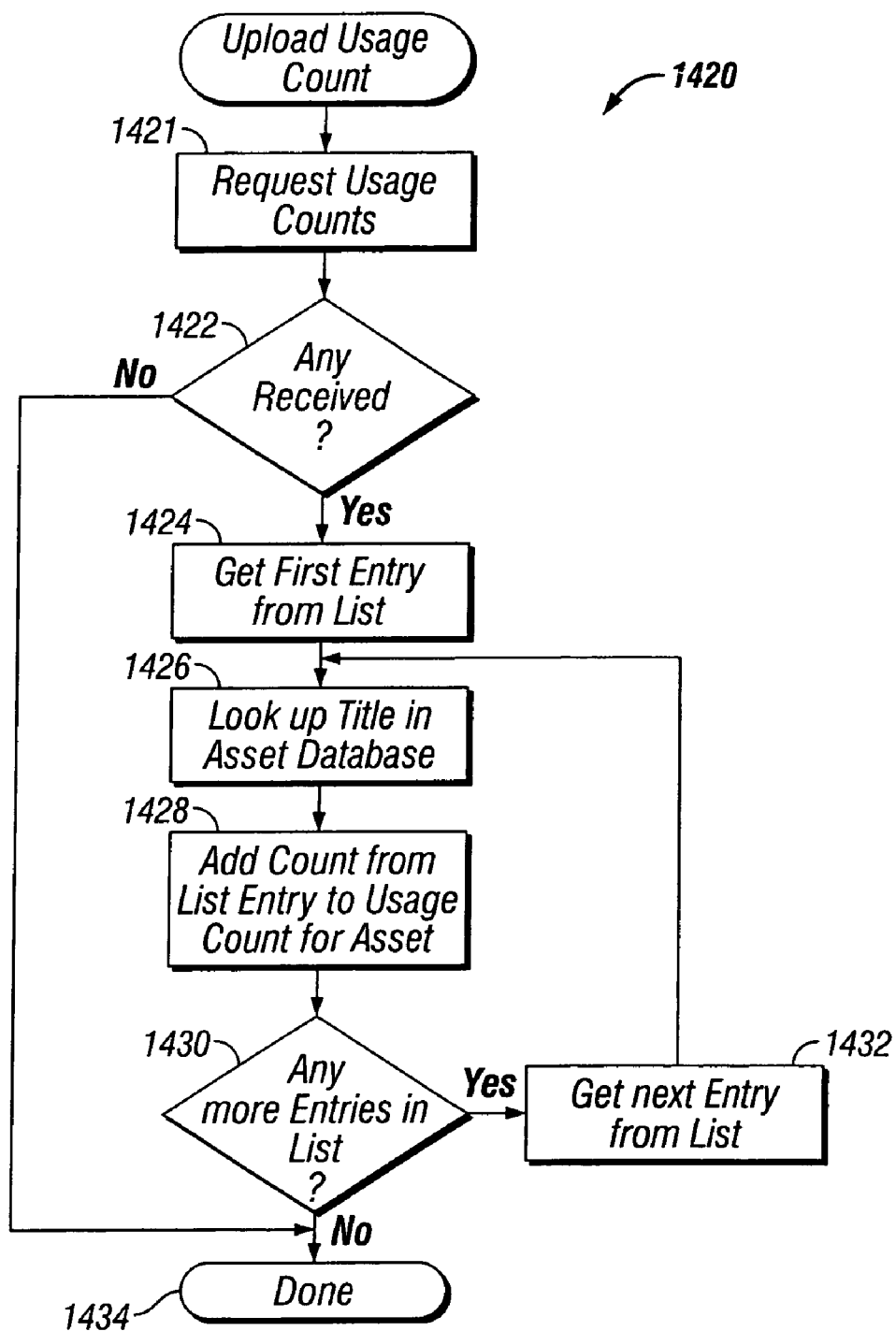
FIG. 14b illustrates a process implemented by the customer server for tracking the number of uses of rented digital assets by computing devices using the secure electronic commerce system, according to one embodiment of the present invention.

With reference now to FIG. 14b, FIG. 14b illustrates a process 1420 implemented by the commerce server for tracking the number of uses of rented digital assets by computing devices using the secure electronic commerce system 1100, according to one embodiment of the present invention. As previously discussed, the commerce server 104a utilizing commerce software module 420, in conjunction with the database software module 418, tracks the purchase, rental, and number of uses of digital assets by a user and may be used to implement the process 1420. More particularly, the customer server 104a periodically queries the computing device 102 to determine the amount of usage of licensed or rented assets in order to report the usage to licensors and to use in determining the amount of royalties owed to the licensor (e.g. for royalty tracking). For example, when the user logs on to the customer server 104a, the customer server 104a can poll the computing device 102 to determine the number of uses of rented digital assets, or, whenever the user goes on-line (e.g. accesses the Internet) the computing device 102 can notify the customer server 104a that the user is on-line and the customer server 104a can poll the computing device 102 to determine the number of uses of rented digital assets, as will be discussed.

As shown in FIG. 14b, the process 1420 implemented at the customer server 104a requests the asset usage count lists 1102 from the computing devices 102 in the secure electronic commerce system 1100 on a periodic basis. In other words, the customer server 104a polls the plurality of computing devices for their asset usage count lists 1102. Particularly, examining the process 1420 as to the customer server 104a polling a single computing device 102, the process 1420 determines whether an asset usage count list 1102 has been received from the computing device 102 (block 1422). If not, the process 1420 is complete (block 1434). If an asset usage count list 1102 from a computing device 102 is received, the process 1420 obtains the first entry from the asset usage count list 1102 (e.g. Title$_1$, Dates$_{11-1N}$, Total$_1$). Next, the customer server 104a implementing process 1420 looks up the title of the asset in the asset database 107 (block 1426). The process 1420 adds the total usage count from the polled computing device 102 to the total aggregated usage count 1110 for that particular asset contained in the asset database 107 (block 1428). Thus, the asset database 107 includes a total aggregated usage count 1110 for each asset that is an aggregation of the total usage counts of all the computing devices 102 polled.

The process 1420 implemented by the customer server 104a then determines if there are any more entries in the asset usage count list of the current polled computing device 102 (block 1430). If not, the process 1420 is complete (block 1434). However, if there are more entries, the process 1420 proceeds to block 1432 to get the next entry from the asset usage count list (e.g. Title$_2$, Dates$_{21-2N}$, Total$_2$). The process 1420 then returns to block 1426 to look up the title of the asset in the asset database 107 and adds the total usage count from polled computing device 102 to the total aggregated usage count 1110 for that particular asset. The process 1420 iteratively goes through this procedure for every asset in the asset usage count list 1102 of the polled computing device until the last asset is reached (e.g. Title$_N$, Dates$_{N1-NN}$, Total$_N$). Moreover, the customer server 104a implementing the process 1420 does this for every computing device 102 in the secure electronic commerce system network 1120. In this way, every asset 1111 in the asset database has a usage count 1110 that represents the aggregated total number of uses by every computing device 102 in the network (for a given period of time). Accordingly, the total amount of usage of licensed or rented assets can be determined in order to report the usage to licensors and to be used in determining the amount of royalties owed to the licensors (e.g. for royalty tracking).

Figure 14C:
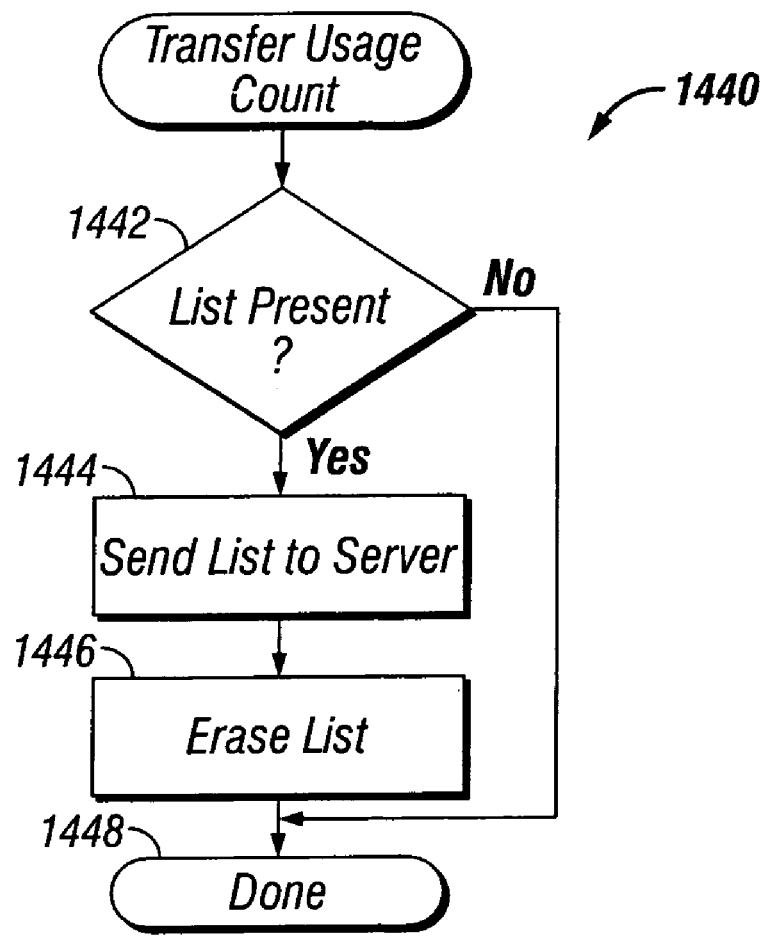
FIG. 14c illustrates a process implemented by the computing device to transfer an asset usage count list to the customer server, according to one embodiment of the present invention.

With reference now to FIG. 14c, FIG. 14c illustrates a process 1440 implemented by a computing device 102 to transfer the asset usage count list 1102 of the computing device 102 to the customer server 104a, according to one embodiment of the present invention. Briefly, the computing device 102, in response to the request for the asset usage count list 1102 by the customer server 104a, simply sends the asset usage count list 1102 to the customer server 104a and then the erases the list from the local memory (e.g. the hard disk) of the computing device 102. As shown in FIG. 14c, the process 1440 implemented by the computing device 102 first determines whether an asset usage count list 1102 is present (block 1442). If not process 1440 is complete (block 1448). If on the other hand, an asset usage count list 1102 is present then the computing device 102 simply sends the asset usage count list 1102 to the customer server 104a (block 1444). Then, the computing device 102 erases the asset usage count list 1102 (block 1446). The process 1440 is then complete (block 1448). Thus, the processes for retrieving rented material usage counts happens behind the scenes and does not involve any interaction with the end-user.

Accordingly, the secure electronic commerce system 1100 tracks and records the distribution and use of assets. Particularly, the secure electronic commerce system 1100 tracks the rental and number of uses of assets by users. The secure electronic commerce system 1100 as previously described can be used either directly by the content owner to track the distribution and use of assets or by a third party provider to track the distribution and use of assets and further in order to keep an accounting of licensing fees (e.g. royalties) due to the content owner (e.g. the copyright holder). Furthermore, the secure electronic commerce system 1100 makes it easy for a third party provider to accurately report transactions regarding licensed assets to the ultimate content owner for licensing fees (e.g. royalty tracking). Therefore, the secure electronic commerce system 1100 promotes the distribution of assets to customers in a secure manner and provides a secure revenue opportunity for content providers (especially the ultimate content owner (i.e. the copyright holder)).

Figure 15:
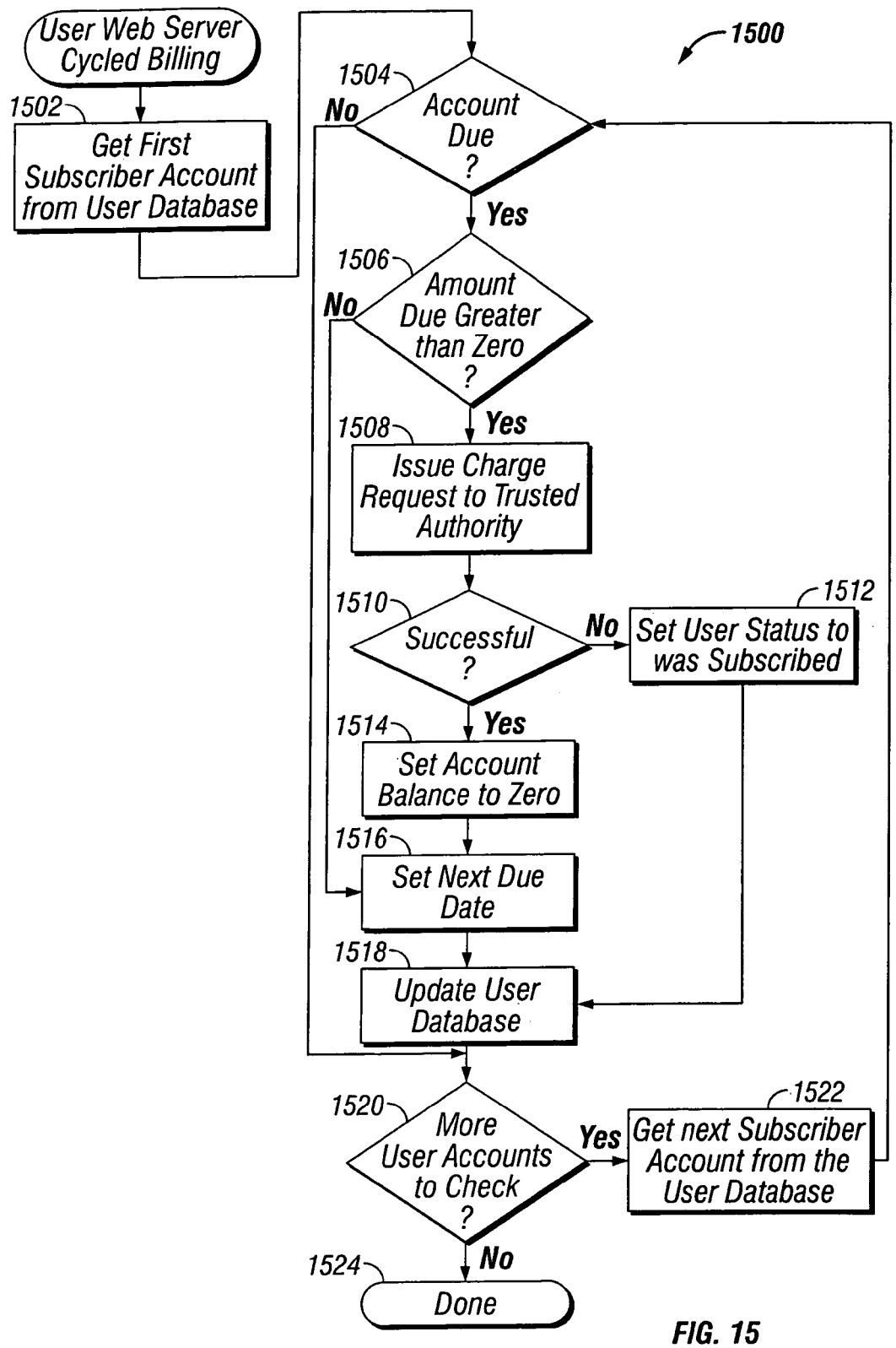
FIG. 15 illustrates a process performed by the customer server to implement the cycled billing of users, according to one embodiment of the present invention.

Turning now to FIG. 15, FIG. 15 illustrates a process 1500 performed by the customer server 104a to implement the cycled billing of users, according to one embodiment of the present invention. The process 1500 may be implemented by the commerce software module 420, in conjunction with the database software module 418, of the customer server 104a. Generally, the customer server 104a automatically charges any outstanding balance for a user at the end of a billing cycle directly to the registered credit card for that user. The billing cycle can, for example, be monthly and occur on the monthly anniversary of the registration date of the user.

As shown in FIG. 15, the process 1500 first obtains a first subscriber account from the user information database 109 (block 1502). Next, the process 1500 determines whether or not the account is due (block 1504). If the account is a not due, the process 1500 moves to block 1520 and the process 1500 determines whether or not there are more user accounts to check. If not the process 1500 is complete (block 1524). However, if there are still more accounts to check then the process 1500 returns to block 1504 to determine whether the next account is due and the process 1500 begins again.

If an account at block 1504 is due, then the process 1500 determines whether the amount of money due is greater than zero (block 1506). If the account balance due is a not greater than zero (i.e. it is zero or has a credit), the process 1500 moves to block 1516 where a next due date for the user's account is set for cycled billing. Then, the user's account is updated in the user information database 109 (block 1518). Next, at block 1520, the process 1500 determines whether or not there are more user accounts to check. If not the process 1500 is complete (block 1524). However, if there are still more accounts to check then the process 1500 returns to block 1504 to determine whether the next account is due and the process 1500 begins again.

On the other hand, if the account balance due is greater than zero, then the process 1500 issues a charge request to a trusted authority 1130 (block 1508). The process 1500 then determines whether the charge request was successful (block 1510). If the charge request was not successful (i.e. the credit card was not successfully charged), then the subscriber's account is canceled (block 1512), the user information database 109 is updated (block 1518), and the user is notified of the cancellation and of his or her credit card not being able to be charged on the billing statement sent to the user and/or by a notification the next time the user attempts to log on to the customer server 104a. The process 1500 then moves to block 1520 and the process 1500 determines whether or not there are more user accounts to check. If not, the process 1500 is complete (block 1524). However, if there are more accounts to check then the process 1500 returns to block 1504 to determine whether the next account is due and process 1500 begins again.

Conversely, if the charge request is successful (i.e. the credit card is successfully charged), then the user's account balance is set to zero (block 1514). Then, a next due date for the user's account is set for cycled billing (block 1516). Next, the user's account is updated in the user information database 109 (block 1518). The process 1500 then moves to block 1520 and the process 1500 determines whether or not there are more user accounts to check. If not, the process 1500 is complete (block 1524). However, if there are more accounts to check then process 1500 returns to block 1504 to determine whether the next account is due and process 1500 begins again.

Figure 16:
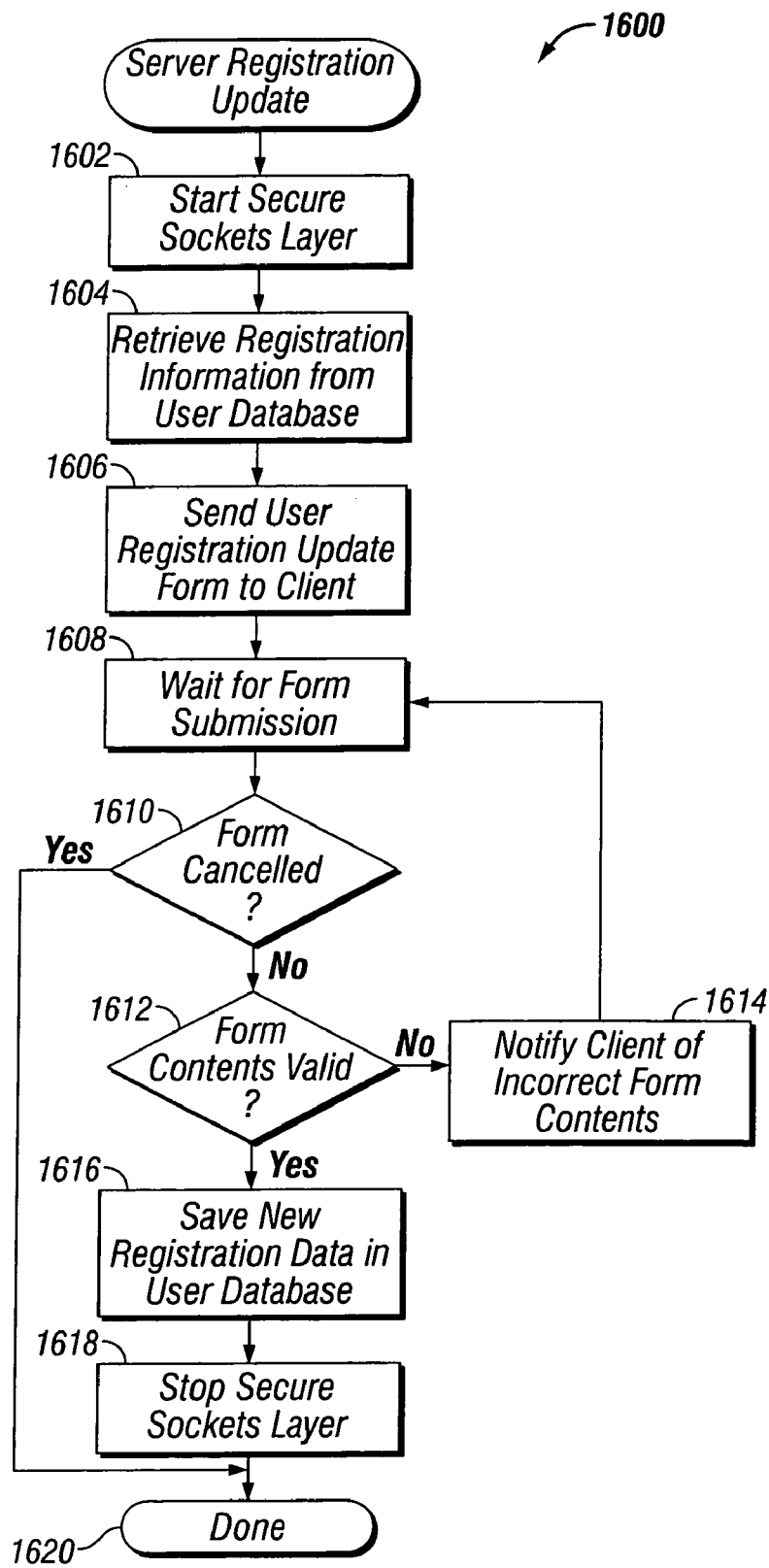
FIG. 16 illustrates a process to update a user's registration and subscription information at the server, according to one embodiment of the present invention.

Turning now to FIG. 16, FIG. 16 illustrates a process 1600 to update a user's registration and subscription information at the server 104, according to one embodiment of the present invention. A user's registration and subscription information may be updated by the user himself at the user's computing device 102. For example, this can be accomplished by the user inputting different subscription and registration information into the forms already discussed. In this instance, the customer server 104a updates the user's subscription and registration information 1106 in the user information database 109. Alternatively, a customer service operator utilizing the customer service system 1120, previously discussed, may also change the registration and subscription information in the registration and subscription forms on behalf of the user. In this instance, the customer service server 104c will update the user's subscription and registration information 1106 in the user information database 109. Thus, either the customer server 104a or the customer service server 104c may implement the process 1600 with the information received from the user at the computing device 102 or the customer service operator at the customer service system 1120, respectively.

As shown in FIG. 16, the process 1600 implemented by the server 104 (either the customer server 104a or the customer service server 104c) first starts a secure sockets layer (SSL) session with either the computing device 102 or the customer service system 1120, respectively (block 1602). Next, the registration and subscription information for the user is retrieved from the user information database 109 (block 1604). Registration and subscription update forms are then sent to the client (e.g. the user at the client device 102 or the customer service operator at the customer service system 1120) (block 1606). The server 104 (e.g. the customer server 104a or the customer service server 104c) then waits for the forms to be submitted (block 1608).

At block 1610, the process 1600 performs monitoring to see if the forms have been canceled. If the forms are canceled, then the process 1600 is complete (block 1620). If the forms are not canceled, then the process 1600 next determines whether the contents in the forms are valid (block 1612). If the former contents are not valid, the client (e.g. the user or the customer service operator) is notified of the incorrect contents and the process 1600 returns to block 1608 to await the submission of revised forms. On the other hand, if the form contents are valid, then the new registration and subscription information data is stored in the subscription and registration information 1106 for the user in the user information database 109. The SSL session is then stopped (block 1618) and the process 1600 is complete (block 1620).

Figure 17:
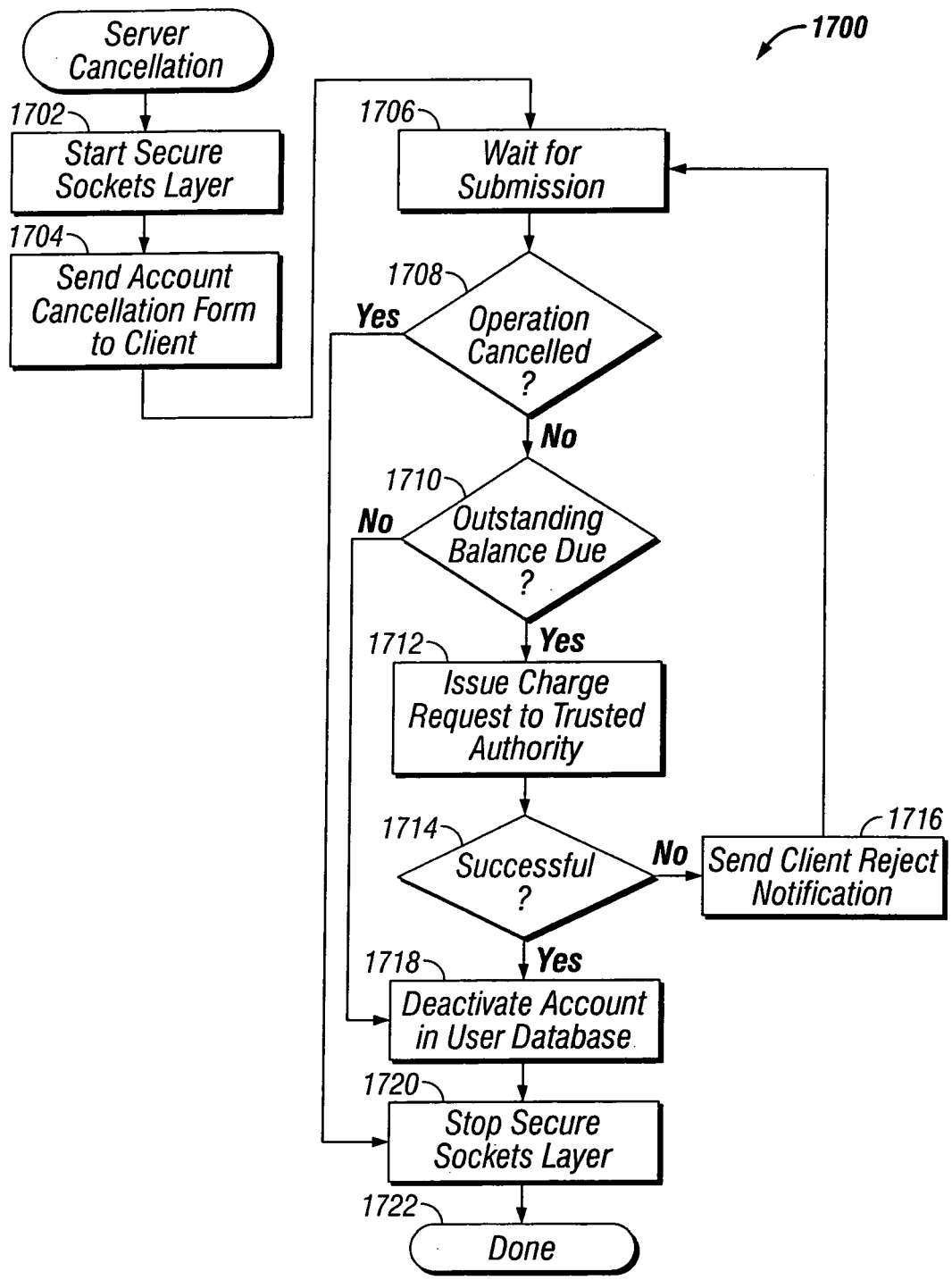
FIG. 17 illustrates a process to cancel a user's subscription at the server, according to one embodiment of the present invention.

Turning now to FIG. 17, FIG. 17 illustrates a process 1700 to cancel a user's subscription at the server 104, according to one embodiment of the present invention. A user's subscription may be canceled by the user himself at the user's computing device 102. In this instance, the customer server 104a deactivates the account for the user in the user information database 109. Alternatively, a customer service operator utilizing the customer service system 1120, previously discussed, may also cancel a user's subscription on behalf of the user. In this instance, the customer service server 104c deactivates the account for the user in the user information database 109. Thus, either the customer server 104a or the customer service server 104c may implement the process 1700 to deactivate a user's account.

As shown in FIG. 17, the process 1700 implemented by the server 104 (e.g. either the customer server 104a or the customer service server 104c) first starts a secure sockets layer (SSL) session with either the computing device 102 or the customer service system 1120, respectively (block 1702). Next, an account cancellation form is sent to the client (e.g. the user at the client device 102 or the customer service operator at the customer service system 1120) from the server 104 (e.g. the customer server 104a or the customer service server 104c) (block 1704). The server 104 then waits for the cancellation form to be submitted (block 1706).

At block 1708, the process 1700 performs monitoring to see if the cancellation operation has been canceled. If the cancellation operation is canceled, then the SSL session is stopped (block 1720) and the process 1700 is complete (block 1722). On the other hand, if the cancellation operation is not canceled, the process 1700 determines whether or not an outstanding balance is due by the user (block 1710). If there is no outstanding balance, then the user's account is deactivated in the user information database 109 (block 1718). The SSL session is stopped (block 1720) and the process 1700 is complete (block 1722). However, if there is an outstanding balance due, a charge request is issued to a trusted authority (block 1712). If the charge request is not successful (i.e. the credit card is not successfully charged), then the client (e.g. the user at the client device 102 or the customer operator at the customer service system 1120) is sent a rejection notification (block 1716) and the process 1700 returns to block 1706 to again await for the submission of cancellation forms. On the other hand, if the charge request is successful (i.e. the credit card successfully charged), then the user's account is deactivated in the user information database 109 (block 1718), the SSL session is stopped (block 1720), and the process 1700 is complete (block 1722).

Figure 18:
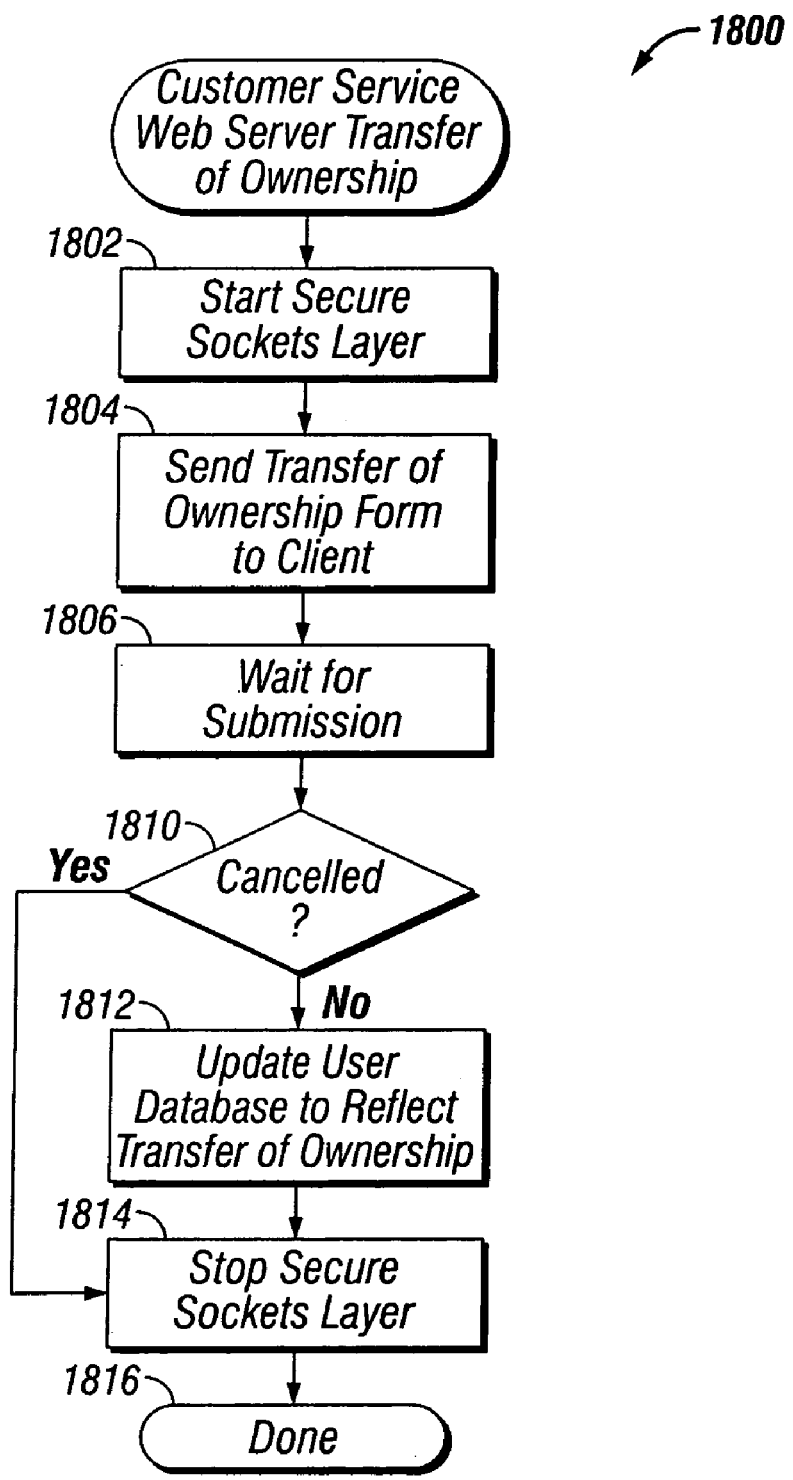
FIG. 18 illustrates a process to transfer the ownership of a security device from one user to another, according to one embodiment of the present invention.

Turning now to FIG. 18, FIG. 18 illustrates a process 1800 to transfer the ownership of a security device from one user to another, according to one embodiment of the present invention. The customer service operators that work at the customer service system 1120 are provided forms for transferring the ownership of a security device from one user to another user. For example, this can occur when a first user sells a security device to a second user, and the second user wants to update the registration and subscription information for billing purposes. Continuing with this example, the second user would then call a customer service operator to update his or her registration and subscription information (or would communicate with the customer service operator by other means—such as e-mail or fax). As previously discussed, a customer service operator at the customer service system 1120 interacts with the customer service server 104c of the server 104 to implement changes, such as the transfer of ownership of a security device. Thus, the customer service server 104c may implement the process 1800 to transfer the ownership of a security device.

As shown in FIG. 18, the process 1800 implemented by the customer service server 104c first starts a secure sockets layer (SSL) session with the customer service system 1120 (block 1802). Next, at block 1804, the customer service server 104c sends a transfer of ownership form to a customer service operator at the customer service system 1120. The customer service server 104c waits for the transfer of ownership form to be submitted back from the customer service system 1120 (block 1806).

At block 1810, the process 1800 performs monitoring to see if the transfer of ownership operation has been canceled. If the transfer of ownership operation has been canceled, then the SSL session is stopped (block 1814) and the process 1800 is complete (block 1816). On the other hand, if the transfer of ownership operation is not canceled, then the subscription and registration information 1106 in the user information database 109 is updated to reflect the change of ownership as present in the from the customer service operator (block 1812). Next, the SSL session is stopped (block 1814) and the process 1800 is complete (block 1816).

Figure 19:
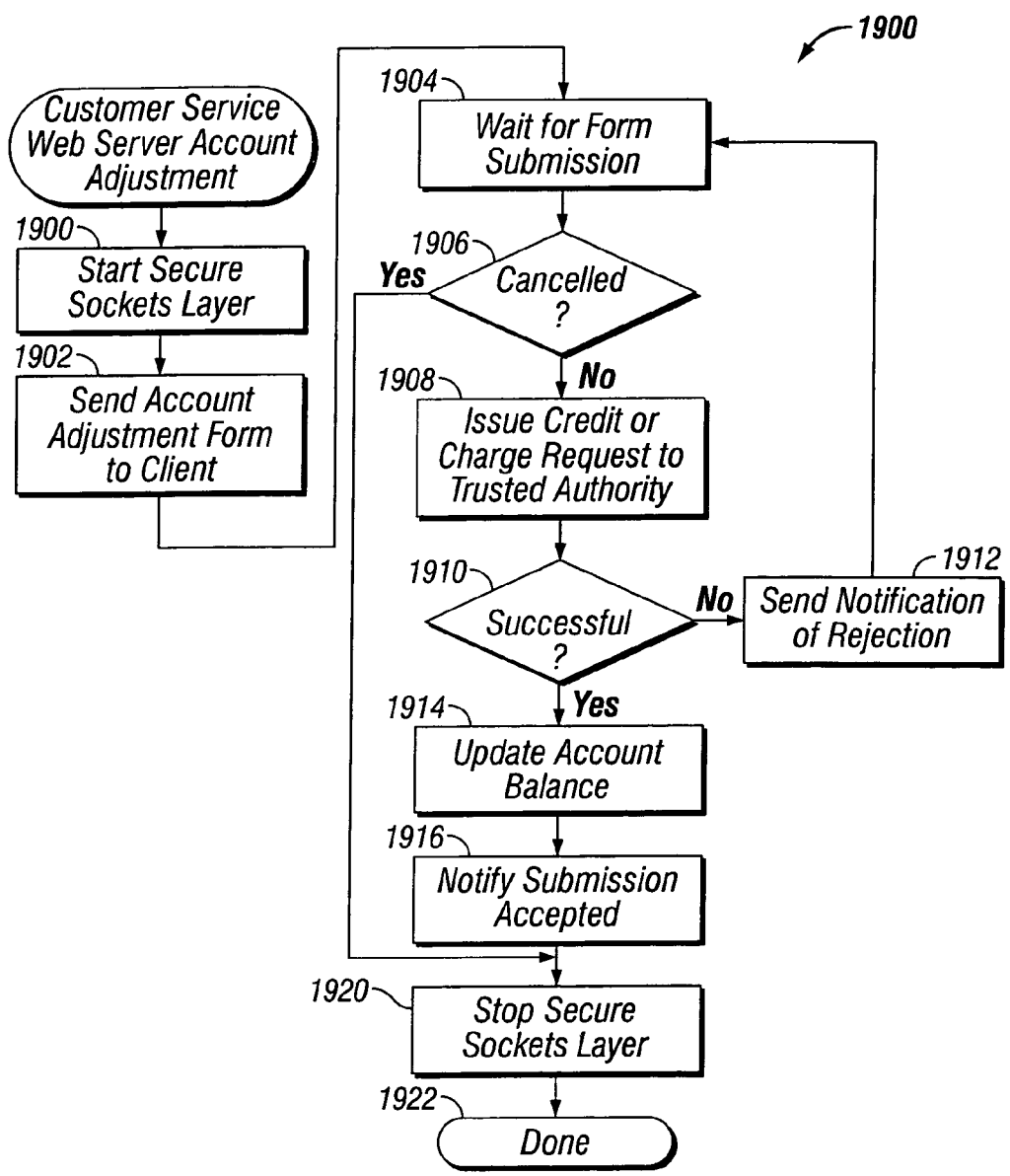
FIG. 19 illustrates a process to provide account adjustments for users, according to one embodiment of the present invention.

Referring now to FIG. 19, FIG. 19 illustrates a process 1900 to provide account adjustments for users, according to one embodiment of the present invention. The customer service operators that work at the customer service system 1120 are provided with the authority to make account adjustments for users. Particularly, customer service operators are provided with forms to adjust account balances for users including crediting accounts and issuing refunds. For example, a user may call a customer service operator to request a credit for an asset that was not received (or would communicate with the customer service operator by other means—such as e-mail or fax). As previously discussed, a customer service operator at the customer service system 1120 interacts with the customer service server 104c of the server 104 to implement changes, such as making account adjustments for users. Thus, the customer service server 104c may implement the process 1900 to make account adjustments for users.

As shown in FIG. 19, the process 1900 implemented by the customer service server 104c first starts a secure sockets layer (SSL) session with the customer service system 1120 (block 1902). Next, at block 1904, customer service server 104c sends an account adjustment form to a customer service operator at the customer service system 1120. The customer service server 104c then waits for the account adjustment form to be submitted back from the customer service system 1120 (block 1904).

At block 1906, the process 1900 performs monitoring to see if the account adjustment operation has been canceled. If the account adjustment operation has been canceled, then the SSL session is stopped (block 1920) and the process 1900 is complete (block 1922). On the other hand, if the account adjustment operation is not canceled, then either a credit or charge request is issued to a trusted authority 1130 (block 1908). Next, the process 1900 determines if the charge request or credit is successful or not (block 1910). If the charge request or credit is not successful, then a notification of the rejection of the account adjustment—e.g., the charge request or credit—is sent to the customer service operator at the customer service system 1120 (block 1912). The process 1900 then proceeds back to block 1904 in which the customer service server 104c waits for account adjustment forms to be submitted.

However, if the charge request or credit is successful, then the account balance for the user at the server 104 (e.g. in the user information database 109) is updated (block 1914). Further, a notification is sent to the customer service operator and the user that the submission for the account balance adjustment (e.g. the charge request or credit) has been accepted. The SSL session is then stopped (block 1920) and the process 1900 is complete (block 1922).

As previously discussed, the secure electronic commerce system 1100 tracks and records the distribution and use of assets. Particularly, the secure electronic commerce system 1100 tracks the purchase, rental, and number of uses of assets by a user. The secure electronic commerce system 1100 can be used either directly by the content owner to track the distribution and use of assets or by a third party provider to track the distribution and use of assets and further in order to keep an accounting of licensing fees (e.g. royalties) due to the content owner (e.g. the copyright holder). In this way, the secure electronic commerce system 1100 makes it easy for a third party provider to accurately report transactions regarding licensed assets to the ultimate content owner for licensing fees (e.g. royalty tracking). Accordingly, the secure electronic commerce system 1100 promotes the distribution of assets to customers in a secure manner and provides a secure revenue opportunity for content providers (especially the ultimate content owner (i.e. the copyright holder)).

Moreover, the secure electronic commerce system 1100, as previously described, further provides other functions related to uniquely identifying and authorizing a security device 1100 attached to a computing device 102 and then allowing the user with the authorized security device to register and subscribe to a Web-based business server. Further, the secure electronic commerce system 1100 provides for cycled billing utilizing a trusted authority, registration and subscription updates, cancellation, the transfer of ownership of authorized security devices, and account adjustments.

The various aspects of the previously described inventions can be implemented as one or more instructions (e.g. software modules, programs, code segments, etc.) to perform the previously described functions. The instructions which when read and executed by a processor, cause the processor to perform the operations necessary to implement and/or use embodiments of the invention. Generally, the instructions are tangibly embodied in and/or readable from a machine-readable medium, device, or carrier, such as memory, data storage devices, and/or remote devices. The instructions may be loaded from memory, data storage devices, and/or remote devices into the memory of the computing device 102, server 104, and interface device 106 or security device 110 for use during operations. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While, embodiments of the present invention have been described with reference to the World-Wide Web, the methods, systems, and apparatuses described herein are equally applicable to other network infrastructures or other data communications systems.

While the present invention and its various functional components have been described in particular embodiments, it should be appreciated the embodiments of the present invention can be implemented in hardware, software, firmware, middleware or a combination thereof and utilized in systems, subsystems, components, or sub-components thereof. When implemented in software (e.g. as a software module), the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for electronic commerce transactions that provides for tracking the usage of rented digital assets over a computer network, the system comprising:

a server including an asset database, the asset database to store a digital asset, a title of the digital asset, and a server usage count for the digital asset;

a computing device coupled to the server over the computer network, the computing device to store a rented digital asset downloaded from the server and an asset usage count list that includes a title of the rented digital asset and a usage count indicating the amount of usage of the rented digital asset by the computing device;

a security device coupled to the computing device, the security device storing a unique identifier associated with the security device and a user key associated with the unique identifier, the server including a user information database storing a plurality of registered unique identifiers and a plurality of user keys, the server requesting the unique identifier and proof of knowledge of the user key when a computing device attempts to log on to the server in order to identify the security device, and if the security device is identified by the server, allowing the computing device to be associated with a user's data in the user information database;

wherein the server:

uploads the asset usage count list from the computing device;

matches the title of the rented digital asset from the asset usage count list of the computing device with the title of the digital asset in the asset database; and adds the usage count from the asset usage count list of the computing device to the server usage count for the digital asset in the asset database of the server.

2. The system of claim 1, wherein the usage count of the asset usage count list of the computing device is numerically updated by one for each day the rented digital asset is used.

3. The system of claim 1, wherein the asset usage count list of the computing device further includes a dates asset used field which includes each date the rented digital asset was used by the computing device.

4. The system of claim 1, wherein after the asset usage count list is uploaded from the computing device to the server, the asset usage count list at the computing device is cleared.

5. The system of claim 1, wherein the digital asset is an audio digital asset.

6. The system of claim 1, wherein when the computing device attempts to log onto the server over the computer network, the server:

requests a unique identifier from the security device;

verifies whether the unique identifier received from the security device is stored as one of the plurality of registered unique identifiers in the user information database;

if the unique identifier is stored within the user information database, the server obtains the associated user key and computes a challenge and computes an expected response based on the associated user key, the server sends the challenge to the security device over the computer network; and if the server receives a response back from the security device in response to the challenge that matches the expected response, the server allows the computing device to log onto the server.

7. The system of claim 6, wherein the expected response computed at the server and the response computed at the security device, are both based on a one-way hashing function of the user key.

8. The system of claim 1, wherein the unique identifier and the user key are sealed in a secure memory of the security device.

9. The system of claim 1, wherein the unique identifier is a serial number.

10. The system of claim 1, wherein after the computing device has been allowed to log onto the server, the computing device to transmit a purchase request to rent a digital asset from the server.

11. The system of claim 10, wherein the purchase request to rent the digital asset is automatically verified by a trusted authority, and if the trusted authority verifies the charge request, an associated charge for the rental of digital asset is automatically charged to an associated credit card.

12. The system of claim 11, wherein the rented digital asset is transmitted from the server to the computing device over the computer network.

13. The system of claim 12, wherein the server encrypts the rented digital asset with an asset key and sends the encrypted rented digital asset to the computing device, the computing device storing the encrypted rented digital asset.

14. The system of claim 13, wherein the server encrypts the asset key with the user key and sends the encrypted asset key to the computing device, the computing device storing the encrypted asset key.

15. The system of claim 14, wherein the security device decrypts the asset key that is encrypted with the user key using the user key stored by the security device.

16. The system of claim 15, wherein the security device transmits the decrypted asset key to the computing device such that the computing device uses the decrypted asset key to decrypt the rented digital asset for use.

17. A method for electronic commerce transactions that provides for tracking the usage of a rented digital assets over a computer network, the method comprising:

uploading an asset usage count list from a computing device to a server, the computing device coupled to the server over the computer network, the asset usage count list including a title of a rented digital asset and a usage count indicating the amount of usage of the rented digital asset downloaded from the server by the computing device, wherein a security device is coupled to the computing device, the security device storing a unique identifier associated with the security device and a user key associated with the unique identifier, the server including a user information database storing a plurality of registered unique identifiers and a plurality of user keys, the server requesting the unique identifier and proof of knowledge of the user key when a computing device attempts to log on to the server in order to identify the security device, and if the security device is identified by the server, allowing the computing device to be associated with a user's data in the user information database;

matching the title of the rented digital asset from the asset usage count list of the computing device with a title of a digital asset stored in an asset database of the server, the asset database to store the digital asset, the title of the digital asset, and a server usage count for the digital asset; and adding the usage count from the asset usage count list of the computing device to the server usage count for the digital asset in the asset database of the server.

18. The method of claim 17, further comprising numerically updating by one the usage count of the asset usage count list of the computing device for each day the rented digital asset is used.

19. The method of claim 17, wherein the asset usage count list of the computing device further includes a dates asset used field which includes each date the rented digital asset was used by the computing device.

20. The method of claim 17, further comprising clearing the asset usage count list at the computing device after the asset usage count list is uploaded from the computing device to the server.

21. The method claim 17, wherein the digital asset is an audio digital asset.

22. The method claim 17, wherein the unique identifier and the user key are sealed in a secure memory of the security device.

23. The method claim 17, wherein the unique identifier is a serial number.

24. The method claim 17, wherein after the computing device has been allowed to log onto the server, transmitting a purchase request to the server to rent a digital asset from the server.

25. The method claim 24, wherein the purchase request to rent the digital asset is automatically verified by a trusted authority, and if the trusted authority verifies the charge request, an associated charge for the rental of digital asset is automatically charged to an associated credit card.

26. The method of claim 25, further comprising transmitting the rented digital asset from the server to the computing device over the computer network.

27. The method of claim 26, further comprising;
encrypting the rented digital asset with an asset key;
sending the encrypted rented digital asset to the computing device; and
storing the encrypted rented digital asset at the computing device.

28. The method of claim 27, further comprising:
encrypting the asset key with the user key;
sending the encrypted asset key to the computing device; and
storing the encrypted asset key at the computing device.

29. The method of claim 28, wherein the security device decrypts the asset key that is encrypted with the user key using the user key stored by the security device.

30. The method of claim 29, wherein the security device transmits the decrypted asset key to the computing device such that the computing device uses the decrypted asset key to decrypt the rented digital asset for use.

* * * * *